(12) United States Patent
Shearer et al.

(10) Patent No.: US 10,284,019 B2
(45) Date of Patent: May 7, 2019

(54) POWERING DEVICES USING RF ENERGY HARVESTING

(71) Applicant: POWERCAST CORPORATION, Ligonier, PA (US)

(72) Inventors: John G. Shearer, Ligonier, PA (US); Charles E. Greene, Cabot, PA (US); Daniel W. Harrist, Carnegie, PA (US)

(73) Assignee: Powercast Corporation, Pittsburgh, PA (US)

( * ) Notice: Subject to any disclaimer, the term of this patent is extended or adjusted under 35 U.S.C. 154(b) by 546 days.

(21) Appl. No.: 14/697,053

(22) Filed: Apr. 27, 2015

(65) Prior Publication Data

US 2015/0236551 A1    Aug. 20, 2015

Related U.S. Application Data

(60) Continuation of application No. 14/143,334, filed on Dec. 30, 2013, now Pat. No. 9,021,277, which is a continuation of application No. 12/499,618, filed on Jul. 8, 2009, now Pat. No. 8,621,245, which is a division of application No. 11/447,412, filed on Jun. 6, 2006, now abandoned.

(60) Provisional application No. 60/688,587, filed on Jun. 8, 2005.

(51) Int. Cl.
| | |
|---|---|
| *H02J 50/00* | (2016.01) |
| *H02J 50/20* | (2016.01) |
| *H02J 7/02* | (2016.01) |
| *G06K 19/07* | (2006.01) |
| *H02J 17/00* | (2006.01) |
| *H04B 1/16* | (2006.01) |
| *H02J 50/90* | (2016.01) |

(52) U.S. Cl.
CPC .......... *H02J 50/20* (2016.02); *G06K 19/0707* (2013.01); *H02J 7/025* (2013.01); *H02J 17/00* (2013.01); *H02J 50/00* (2016.02); *H02J 50/90* (2016.02); *H04B 1/1607* (2013.01)

(58) Field of Classification Search
CPC .......... G06K 19/0702; G06K 19/0707; G06K 19/0708; G06K 19/0715; H02J 17/00; H02J 50/00
See application file for complete search history.

(56) References Cited

U.S. PATENT DOCUMENTS

| | | |
|---|---|---|
| 6,297,618 B2 | 10/2001 | Emori et al. |
| 6,447,448 B1 | 9/2002 | Ishikawa et al. |
| 6,615,074 B2 | 9/2003 | Mickle et al. |
| 6,784,358 B2 | 8/2004 | Kukulka |
| 6,835,501 B2 | 12/2004 | Morishita et al. |

(Continued)

OTHER PUBLICATIONS

Non-Final Office Action for U.S. Appl. No. 11/447,412, dated Jun. 3, 2008.

(Continued)

*Primary Examiner* — Albert Wang

(57) ABSTRACT

Disclosed is an apparatus for an application including a core device for the application. The apparatus includes a power (preferably RF energy) harvester connected to the core device to power the core device. Also disclosed is a method for an application. The method includes the steps of converting RF energy into usable energy. There is the step of powering the core device with the usable energy.

20 Claims, 90 Drawing Sheets

(56) References Cited

U.S. PATENT DOCUMENTS

| | | | |
|---|---|---|---|
| 6,836,095 B2 | 12/2004 | Fogg | |
| 6,858,970 B2 | 2/2005 | Malkin et al. | |
| 6,882,128 B1* | 4/2005 | Rahmel | H02J 17/00 |
| | | | 320/101 |
| 6,894,467 B2 | 5/2005 | Pons et al. | |
| 7,256,695 B2 | 8/2007 | Hamel et al. | |
| 7,268,517 B2 | 9/2007 | Rahmel et al. | |
| 7,561,866 B2 | 7/2009 | Oliver et al. | |
| 7,956,572 B2 | 6/2011 | Zane et al. | |
| 8,621,245 B2 | 12/2013 | Shearer et al. | |
| 2002/0072784 A1 | 6/2002 | Sheppard, Jr. et al. | |
| 2003/0032993 A1* | 2/2003 | Mickle | G06K 7/0008 |
| | | | 607/60 |
| 2004/0150529 A1 | 8/2004 | Benoit et al. | |
| 2004/0259604 A1 | 12/2004 | Mickle et al. | |
| 2005/0052287 A1* | 3/2005 | Whitesmith | G01S 13/751 |
| | | | 340/13.26 |
| 2005/0240778 A1 | 10/2005 | Saito | |
| 2006/0281435 A1 | 12/2006 | Shearer et al. | |

OTHER PUBLICATIONS

Final Office Action for U.S. Appl. No. 11/447,412, dated Jan. 8, 2009.
Office Action for U.S. Appl. No. 12/499,618, dated Jun. 22, 2011.
Office Action for U.S. Appl. No. 12/499,618, dated Apr. 19, 2012.
Final Office Action for U.S. Appl. No. 12/499,618, dated Feb. 21, 2013.
International Search Report and Written Opinion for International Application No. PCT/US06/21940, dated Sep. 25, 2007, 9 pages.
Examination Report for Australian Application No. 2006255054, dated Nov. 27, 2009, 2 pages.
Office Action for Chinese Application No. 200680020092.3, received on Sep. 7, 2009, 5 pages.
Examination Report for Singapore Application No. 200718208-2, dated Sep. 28, 2009, 6 pages.
Office Action for Mexican Patent Application No. MX/a/2007/015229, received on Mar. 4, 2010, 2 pages.
Examination Report for Australian Application No. 2006255054, dated Jul. 7, 2011, 3 pages.
European Search Report for European Patent Application No. 06772310.6, dated Jul. 27, 2011; 7 pages.

* cited by examiner

POWERING DEVICES USING RF ENERGY HARVESTING

CROSS-REFERENCE TO RELATED APPLICATIONS

This application claims priority to and is a continuation application of U.S. patent application Ser. No. 14/143,334, filed Dec. 30, 2013, which claims priority to and is a continuation application of U.S. patent application Ser. No. 12/499,618, filed Jul. 8, 2009 (now U.S. Pat. No. 8,621,245), which is a divisional application of U.S. patent application Ser. No. 11/447,412, filed Jun. 6, 2006, which claims priority to U.S. Provisional Patent Application No. 60/688,587, filed on Jun. 8, 2005; each of which is incorporated herein by reference in its entirety.

BACKGROUND

The present invention is related to the wireless powering of devices. More specifically, the present invention is related to the wireless powering of devices with a power harvester.

As processor capabilities have expanded and power requirements have decreased there has been an ongoing explosion of devices that operate completely independent of wires or power cords. These "untethered" devices range from cell phones, and wireless keyboards to building sensors and active RFID tags.

Engineers and designers of these untethered devices continue to have to deal with the limitations of portable power sources, primarily batteries as the key design parameter. While performance of processors and portable devices have been doubling every 18-24 months driven by Moore's law, battery technology in terms of capacity has only been growing at measly 6% per year. Even with power conscious designs and the latest in battery technology, many devices do not provide the lifetime cost and maintenance requirements for applications that require a large number of untethered devices such as logistics, and building automation. Today's devices that need two-way communication require scheduled maintenance every three to 18 months to replace or recharge the device's power source (typically a battery). One-way devices simply broadcasting their status (one-way) such as automated utility meter readers have a better battery life, typically requiring replacement within 10 years. For both device types, scheduled power-source maintenance is costly and disruptive to the entire system that a device is intended to monitor and/or control. Unscheduled maintenance trips are even more costly and disruptive. On a macro level, the relatively high cost associated with the internal battery also reduces the practical, or economically viable, number of devices that can be deployed.

The ideal solution to the power problem for untethered devices is a device or system that can collect and harness sufficient energy from the external environment. The harnessed energy would then either directly power an untethered device or augment a battery or other storage component. Directly powering an untethered device enables the device to be constructed without the need for a battery. Augmenting a storage component could be along two lines: 1) increasing the overall life of the device or 2) by providing more power to the device to increase the functionality of the device. The other parameters for an ideal solution is that the harnessing device could be used in a wide range of environments including harsh and sealed environments (e.g. nuclear reactors), would be inexpensive to produce, would be safe for humans, and would have a minimal effect on the basic size, weight and other physical characteristics of the untethered device.

SUMMARY

The present invention pertains to an apparatus for an application. The apparatus comprises a core device preferably having an integrated circuit for the application. The apparatus comprises a power harvester (preferably a radio frequency (RF) energy harvester) connected to the core device to power the core device.

The present invention pertains to an apparatus for an application. The apparatus comprises a core device preferably having an integrated circuit for the application. The apparatus comprises means for receiving energy wirelessly and providing power from the energy to the core device to power the integrated circuit of the core device. The receiving means is connected to the core device.

The present invention pertains to a method for an application. The method comprises the steps of converting RF energy into usable energy. There is the step of preferably powering an integrated circuit of the core device with the usable energy.

This invention pertains to a technique that uses radio frequency (RF) energy as a source of energy to directly power a device or augment a power storage component in a device. The present invention meets the requirements described in the previous "Background of the Invention" section.

Traditional RF receiving devices have focused on maximizing selectivity of the frequency to isolate and to be coherent without interference from other sources. In contrast, while the present invention operates at a specific frequency or range of frequencies, the device accepts any interference to supplement the output power of the device. Also, the research related to power harvesting that uses RF energy as a source has primarily focused on devices in close proximity of the source (inductive or near-field energy). In most cases, prior research assumed a dedicated or directed source of RF to power the device.

The invention should not be confused with power transfer by inductive coupling, which requires the device to be relatively close to the power transmission source. The RFID Handbook by the author Klaus Finkenzeller defines the inductive coupling region as distance between the transmitter and receiver of less than 0.16 times lambda where lambda is the wavelength of the RF wave. The invention can be implemented in the near field (sometimes referred to as inductive) region as well as the far-field region. The far-field region is distances greater than 0.16 times lambda.

It is an object of this invention to provide a method and apparatus to
1. remotely energize an untethered device without using direct wiring
2. power or augment the life of the power storage component so it matches the life of the device and, ultimately, powers the off-grid device with or without the use of batteries
3. allow untethered devices to be virtually maintenance free
4. provide augmentation for other energy harvesting technologies (solar, piezoelectric, etc.)
5. provide backup power to tethered devices It is a further object of this invention to directly power a device or augment a power storage component in a device in conjunction with other power harvesting technologies and storage elements.

With this method and apparatus a device's power storage components do not require replacement, thus enabling the device to be permanently placed off-grid, where it may be physically impractical, costly, or dangerous (due to a harsh environment) to provide maintenance.

For devices on-grid (tethered) or with reliable power sources, RF power harvesting can be used as a backup in case the primary power source is lost.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
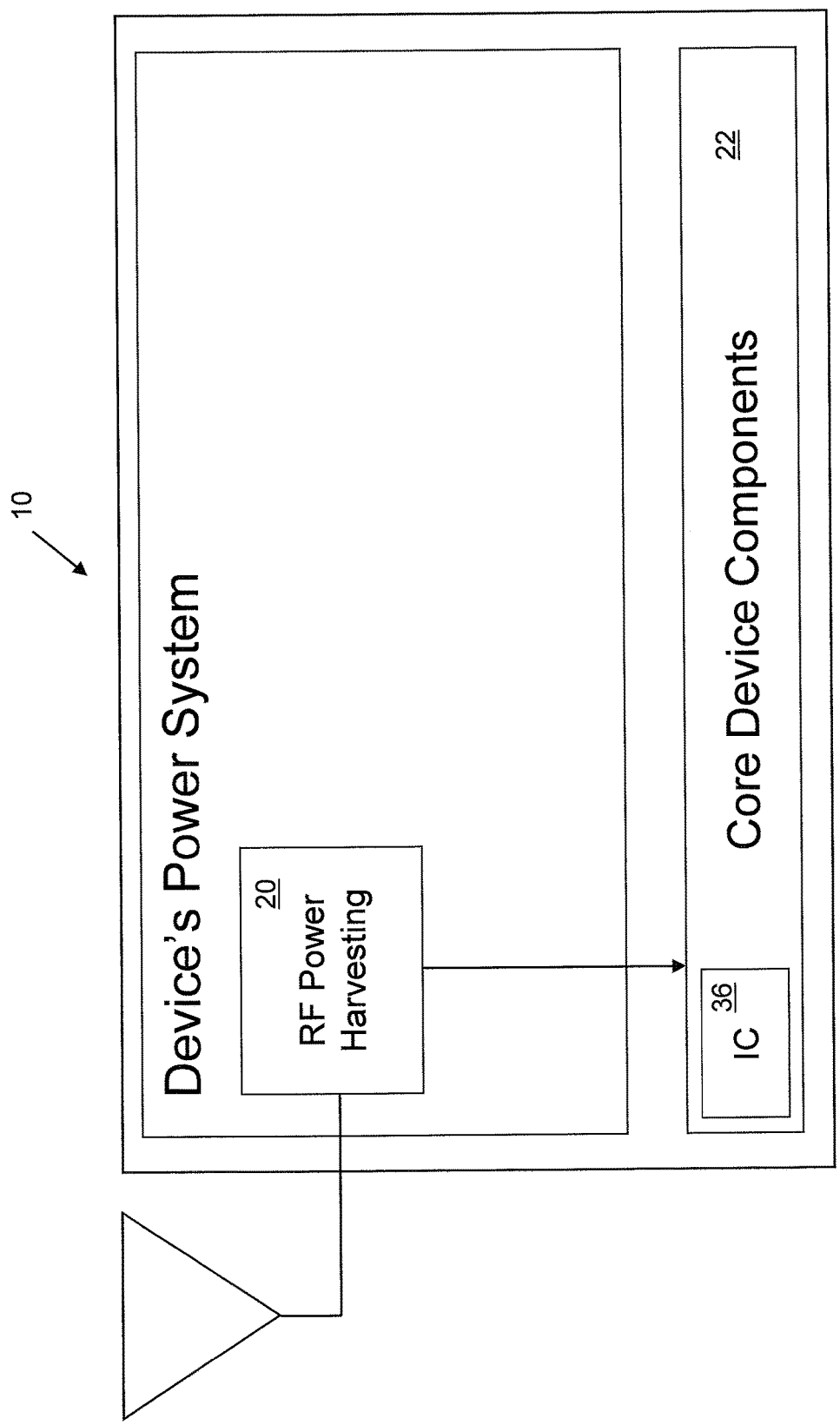
FIG. 1 is a block diagram of an RF Power Harvesting block used to directly supply power to Core Device Components.

A complete understanding of the invention will be obtained from the following description when taken in connection with the accompanying drawing figures wherein like reference characters identify like parts throughout.

There is shown an apparatus 10 for an application. The apparatus 10 comprises a core device 22 preferably having an integrated circuit 36 for the application. The apparatus 10 comprises a power harvester 20 connected to the core device 22 to power the core device 22.

The apparatus 10 preferably includes an alternative power source 24 connected to the core device 22 to power the core device 22 in conjunction with the power harvester 20. Preferably, the apparatus 10 includes a power regulator 26 and/or power storage circuit 28 connected to the power harvester 20. The apparatus 10 preferably includes a power storage charger 30 connected to the power harvester 20. Preferably, the apparatus 10 includes a power storage connected to the power harvester 20.

Preferably, the core device 22 includes a memory 38 connected to the integrated circuit 36 and to the power harvester 20 to power the memory 36.

Figure 89:
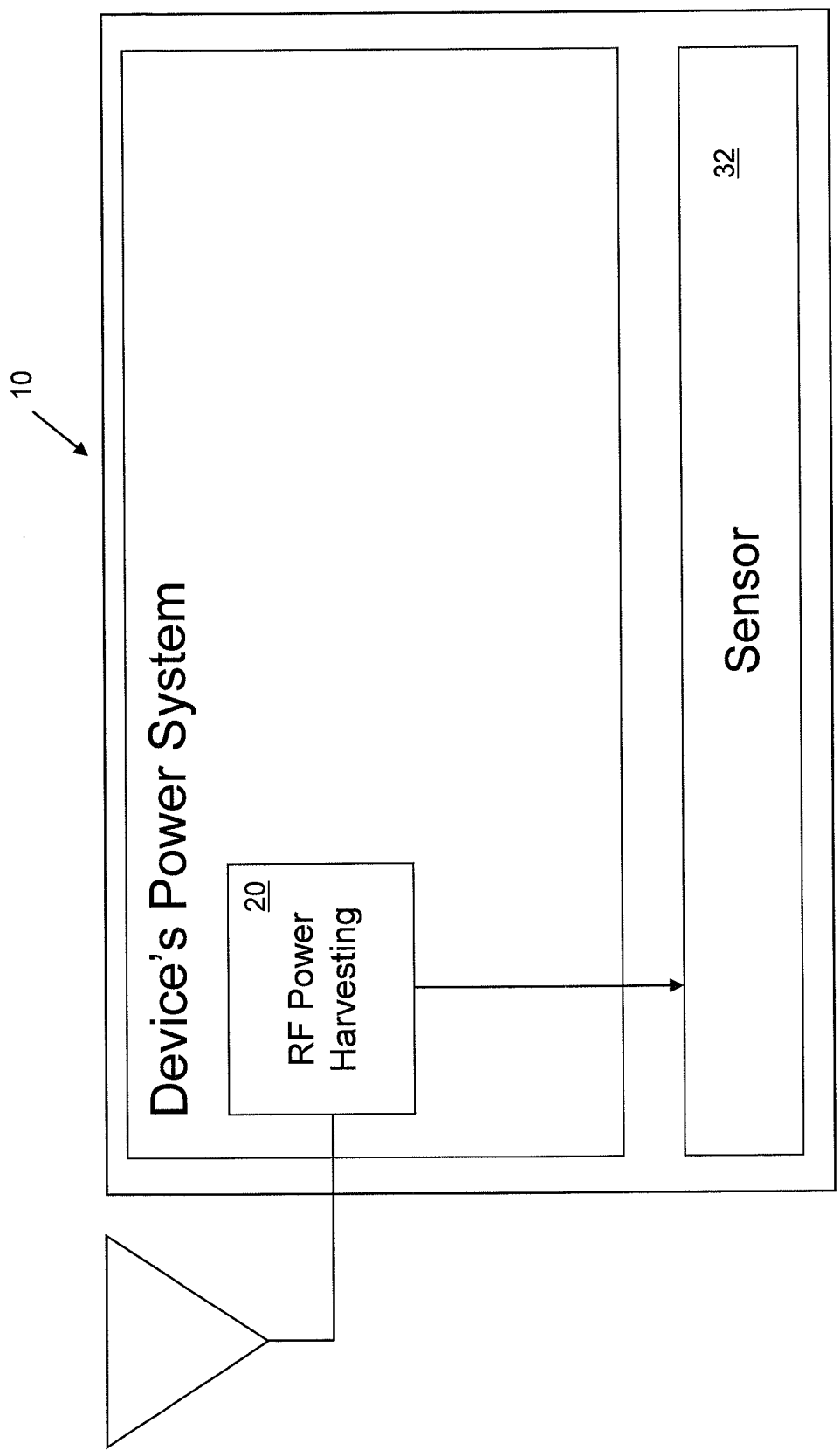
FIG. 89 is a block diagram of a power harvesting block used to supply power to a core device having a sensor.

The core device 22 can include a sensor 32, as shown in FIG. 89. The sensor 32 can include a proximity sensor, an intrusion sensor, an environmental sensor, a chemical sensor, a biological sensor, a sensor in contact with an automobile, an occupancy sensor, a motion sensor, a position sensor, a metal detector, or a sensor 32 in contact with an aircraft. The sensor 32 can include an alarm connected to the power harvester 20 to power the alarm, a display connected to the power harvester 20 to power the display, a sensor 32 disposed in a building, an industrial automation sensor, a sensor 32 in contact with an elevator, a temperature sensor, a fire sensor, or an accelerometer.

The sensor 32 can include a level sensor, a gas level sensor, a fluid level sensor, a light level sensor. The sensor 32 can include a flow sensor, a gas flow sensor, a fluid flow sensor, a light flow sensor, or a plasma flow sensor.

The sensor 32 can include a pressure sensor, a gas pressure sensor, a fluid pressure sensor, a light sensor, an infrared light sensor, an ultraviolet light sensor, an x-ray sensor, a cosmic ray sensor, a visible light sensor, a gamma ray sensor, a stress sensor, a strain sensor, a depth sensor, or an electrical characteristic sensor.

The sensor 32 includes a voltage sensor, a current sensor, a viscosity sensor, an acoustical sensor, a sound sensor, a listening sensor, a thickness sensor, a density sensor, a surface quality sensor, a volume sensor, a physical sensor, a mass sensor, a weight sensor, a conductivity sensor, a distance sensor, an orientation sensor, or a vibration sensor.

The sensor 32 can include a radioactivity sensor, a field strength sensor, an electric field sensor or a magnetic field sensor, a smoke detector, a carbon monoxide detector, a radon detector, an air quality sensor, a humidity sensor, a glass breakage sensor, or a break beam detector. The sensor can include a thermal energy sensor, an electromagnetic sensor, a mechanical sensor, an optical sensor, a radiation sensor, a sensor in contact with a vehicle, or a sensor 32 in contact with a water craft.

The present invention pertains to an apparatus 10 for an application. The apparatus 10 comprises a core device 22 having an integrated circuit 36 for the application. The apparatus 10 comprises means for receiving energy wirelessly and providing power from the energy to the core device 22 to power the integrated circuit 36 of the core device 22. The receiving means is connected to the core device 22. Preferably, the core device 22 includes means for sensing.

The present invention pertains to a method for an application. The method comprises the steps of converting RF energy into usable energy. There is the step of preferably powering an integrated circuit 36 of the core device 22 with the usable energy.

Preferably, there is the step of regulating the usable energy provided to the core device 22. There is preferably the step of storing the usable energy. Preferably, there is the step of providing power to the core device 22 from an alternative power source 24 in conjunction with the usable energy.

Figure 90:
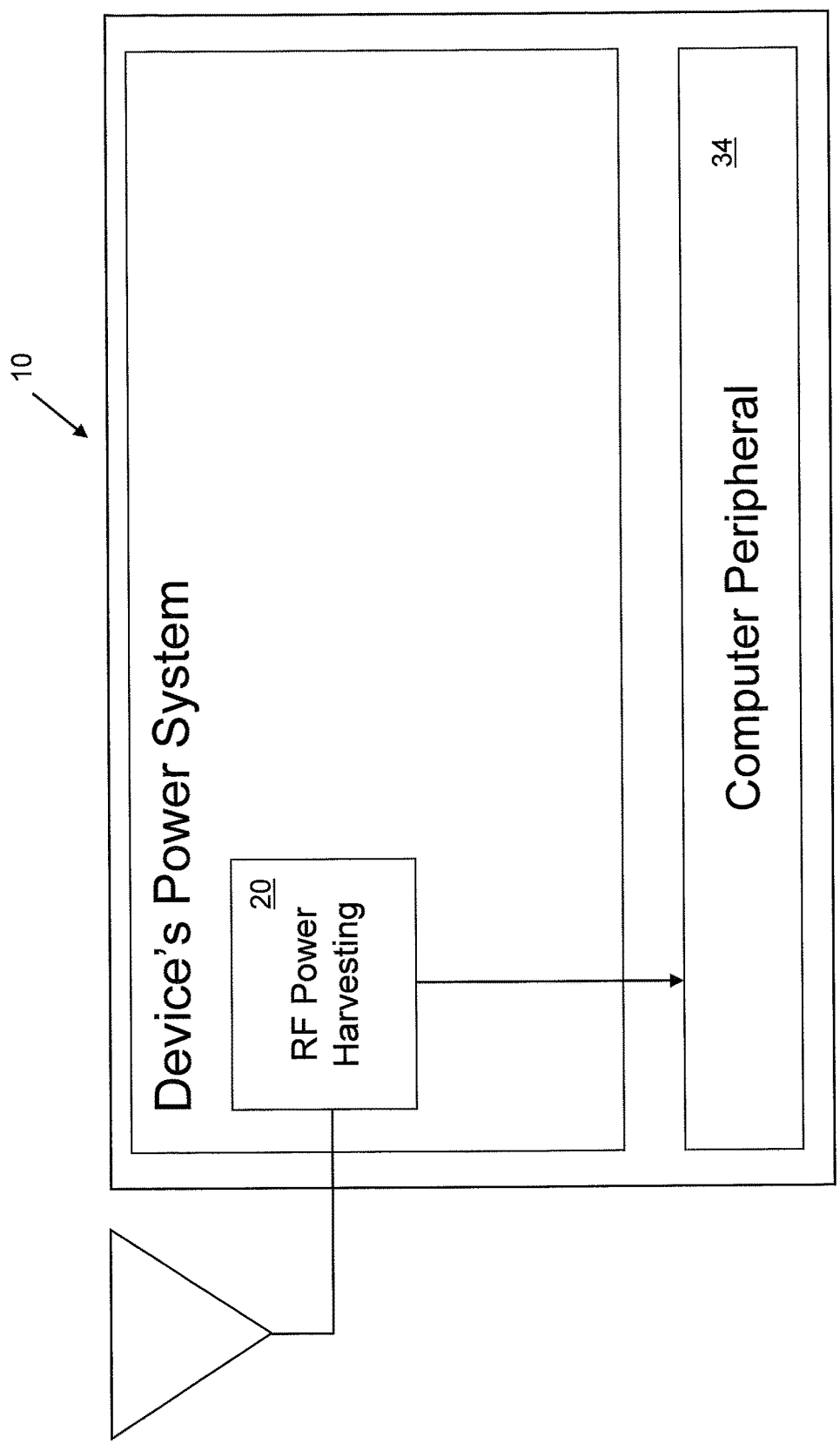
FIG. 90 is a block diagram of a power harvesting block used to supply power to a core device having a computer peripheral.

Alternatively, the core device 22 can include a computer peripheral 34, as shown in FIG. 90. The computer peripheral 34 can include a handheld game, a gaming system, a game controller, a controller, a keyboard, a mouse, a computer terminal, computer storage, or computer equipment.

The present invention can be implemented in numerous ways. A number of these ways are depicted in FIGS. 1-90. These figures contain multiple blocks that are configured in multiple ways.

In the figures, an arrow represents the flow of power unless otherwise stated. Single-headed (one-way) arrows represent that the power is flowing from one block to another. The single-headed arrow may represent multiple wires that provide power from one block to multiple parts in the other block. Two-headed (two-way) arrows represent a single wire that can have power flow in either direction or multiple wires each having power flow in a single direction.

As an example, a two-headed arrow between an RF power harvesting 20 block and a power regulation 26 and/or power storage circuit 28 block can represent a single wire that allows harvested power to flow into a storage device such as a capacitor. The same block diagram can also represent two wires between the two blocks with the first wire allowing harvested power to flow into a voltage regulator 26. The second wire can allow the regulated voltage to feedback to the RF power harvesting 20 block to provide power to internal components such as transistors to increase the performance of the RF power harvesting 20 block.

Each block is described in detail below. Each block represents the functionality described below associated with it. For instance, the RF power harvesting 20 block describes a power harvester 20, and the power regulation 26 and/or power storage circuit 28 block describes a power regulator 26 and a power storage circuit 28.

Device's Power System Block

The device's power system block includes all components/circuitry required to power the device. This block may include an RF power harvesting 20 block, a power regulation 26 and/or power storage circuit 28 block, a power storage block, and/or a power storage charger 30 block (all discussed below).

RF Power Harvesting 20 Block

The RF power harvesting 20 block is connected to an antenna. The antenna may or may not be used as the communications antenna for the core device 22 components. The RF power harvesting 20 block is used to convert the energy captured by the antenna into usable power, such as direct current (DC) voltage.

This block may include antenna matching, rectifying circuitry, voltage transforming circuitry, and/or other performance optimizing circuitry. The rectifying circuitry may include a diode(s), a transistor(s), or some other rectifying device or combination. Examples of the rectifying circuitry include, but are not limited to, half-wave, full-wave, and voltage doubling circuits.

The output of the RF power harvesting 20 block is a DC voltage or current. The RF power harvesting 20 block may accept feedback (or input) from other circuitry or blocks, which may be used to control the harvesting circuitry to improve the performance or vary the output. This feedback may include, but is not limited to, a DC voltage or a clock from the core device 22 components.

U.S. Pat. No. 6,615,074 (FIGS. 8, 9, 12a, 12b, 13, 14), incorporated by reference, herein, shows numerous examples of RF power harvesting circuits that can be used to implement the block and function described.

Power Regulation 26 and/or Power Storage Circuit 28 Block

It may be necessary to regulate the converted power (i.e., hold the power at a constant level) for specific devices. The devices that would need this block require a fairly constant voltage or current. Deviations from the required values may cause the device to not perform within its specifications.

The regulation can be implemented in many different ways. The block can be as simple as using a Zener diode, or as complicated as using an integrated circuit such as a linear voltage regulator 26 or switching regulator 26 to hold the voltage at a constant level.

Certain devices have a more tolerable power requirement. For these devices, the regulation stage may be excluded.

This block may also include, with or without the regulation, a storage device such as a capacitor, a battery, or some other device able to store charge. The output from the power regulation 26 and/or power storage circuit 28 block may be used as feedback to other blocks within the device's power system block or to the alternative power sources 24 block (described below), if they require a regulated supply voltage or stored power.

U.S. Pat. No. 6,894,467 (FIGS. 1, 3), Linear Voltage Regulator, incorporated by reference, herein, is an example of a practical application of implementing the regulation described in the block. U.S. Pat. No. 6,297,618 (FIGS. 1-4), Power storage device and method of measuring voltage of storage battery, incorporated by reference, herein, is an example of a practical application of implementing the storage described in the block.

Power Storage Charger 30 Block

The power storage charger 30 block may be needed if a power storage component of the device requires a special charging mechanism, such as pulse charging or trickle charging. This block controls how the captured and converted power is supplied to the power storage component.

U.S. Pat. No. 6,836,095 (FIGS. 1-3), Battery Charging Method and Apparatus, incorporated by reference herein, is an example of a practical application of implementing the special charging mechanism described in the block.

Power Storage Block

If a device has intermittent power requirements, it may be necessary to store the captured power for use at a later time. The power can be stored in the power storage block, which could include a battery, a capacitor, and/or another type of power storage component. Power storage components include, but are not limited to, batteries (rechargeable and non-rechargeable), capacitors, inductors, fuel cells, and other power storage elements.

The output from the power storage block may be used as feedback to other blocks within the device's power system or to the alternative power sources 24 block, if they require a dedicated and predictable supply voltage.

U.S. Pat. No. 6,297,618 (FIGS. 1-4), Power Storage Device and Method of Measuring Voltage of Storage Battery, incorporated by reference herein, is an example of a practical application of implementing the storage described in the block. U.S. Pat. No. 6,835,501, Alkaline Rechargeable Battery, incorporated by reference herein, is also an example of a practical application of implementing the storage described in the block.

Core Device 22 Components Block

The core device 22 components block is the portion of the device that is receiving power from the device's power system. This block may be, but is not limited to, the devices listed in the subsequent pages of this document. It may be advantageous for the core device 22 components block to communicate with any of the blocks that are supplying power to it. This communication can include, but is not limited to, a feedback control signal such as a clock or an ON/OFF command. As an example, the device may want to turn off the alternative power sources 24 block if it is receiving sufficient power from the RF power harvesting 20 block.

Alternative Power Sources 24 Block

RF energy harvesting also has the ability to be augmented by other types of power harvesting, storage components, or dedicated sources (e.g. power line). The alternative power sources 24 block shows how this type of system could be implemented. The augmenting power harvesting technologies include, but are not limited to, solar, light (visible and non-visible), piezoelectric, vibration, acoustic, thermal, microgenerators, wind, and other environmental elements. This block can work independently or have communication with other blocks.

U.S. Pat. No. 6,784,358, Solar Cell Structure Utilizing an Amorphous Silicon Discrete By-Pass Diode, incorporated by reference herein, is an example of a practical application of implementing an alternative power source 24 described by the block. U.S. Pat. No. 6,858,970, Multi-Frequency Piezoelectric Energy Harvester, incorporated by reference herein, is also an example of a practical application of implementing an alternative power source 24 described by the block.

Power Regulation 26, Storage 28 and/or Storage Charging 30 Block

The power regulation 26, storage 28 and/or storage charging 30 block contains all the combinations of the power regulation 26 and/or power storage circuit 28 block, power storage charger 30 block, and power storage block. This block is used in the later figures to reduce the number of figures needed to show how the blocks can interconnect.

The disclosed invention is an apparatus and method for an application for retrieving radio frequency (RF) energy by an antenna, converting that energy into direct current (DC) power, regulating that energy using an optimized circuit, storing that energy in an optimized component, and/or supplying the power for a specific device.

Retrieval of RF Energy

Figure 54:
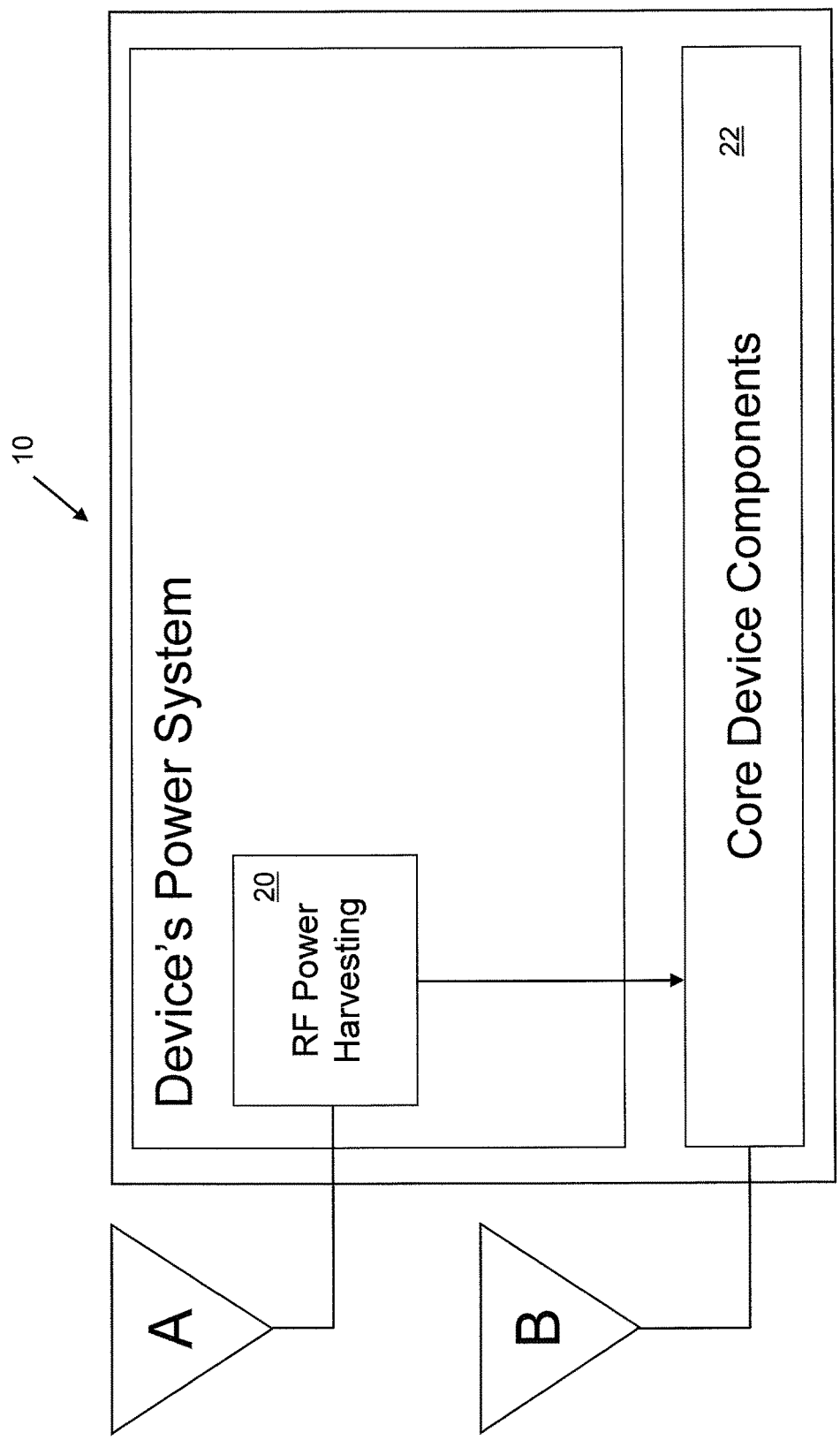
FIG. 54 is a block diagram of an RF Power Harvesting block using Antenna A to directly supply power to Core Device Components.
Figure 55:
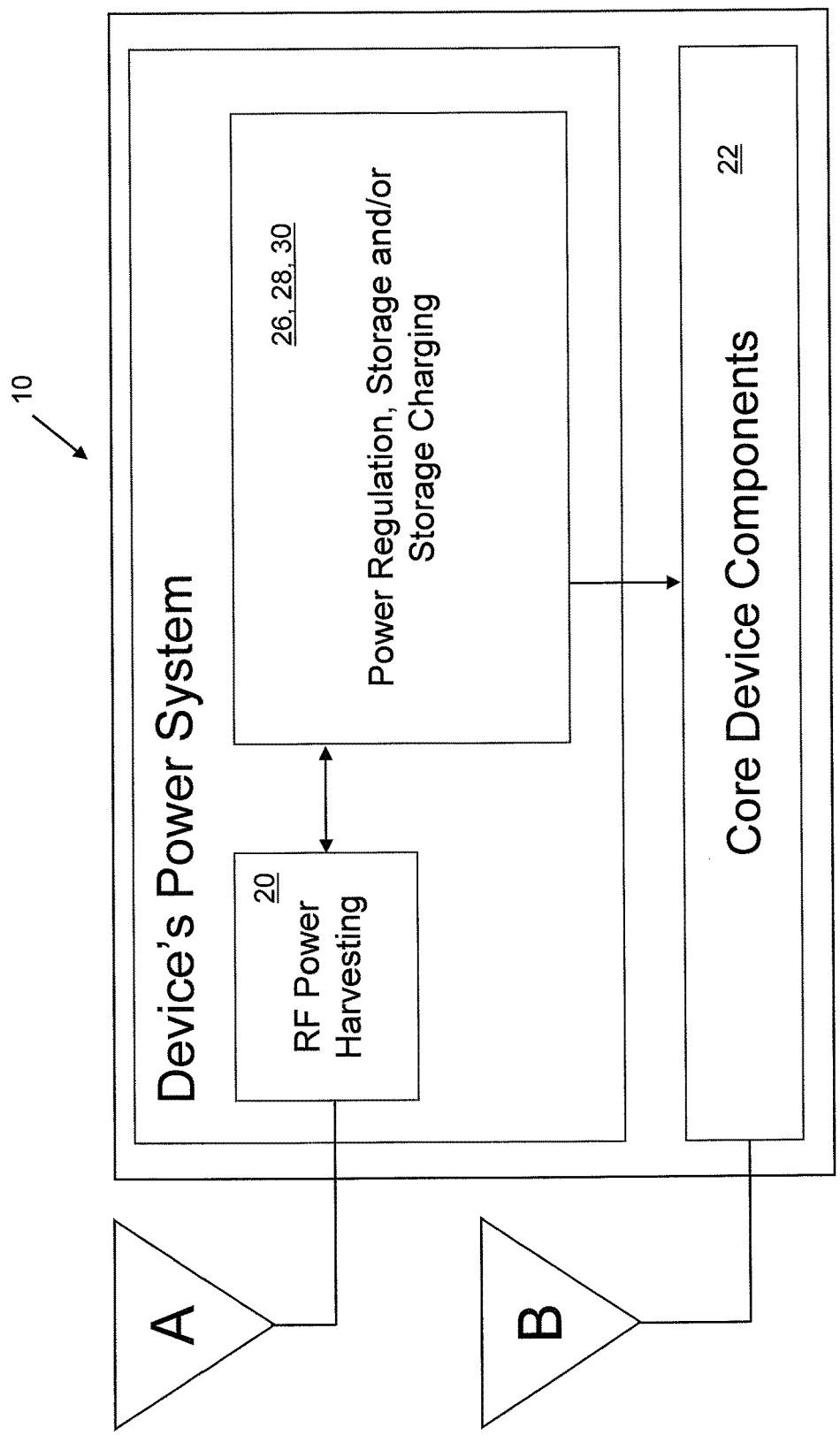
FIG. 55 is a block diagram of an RF Power Harvesting block using Antenna A to supply power to a Power Regulation, Storage and/or Storage Charging block.
Figure 56:
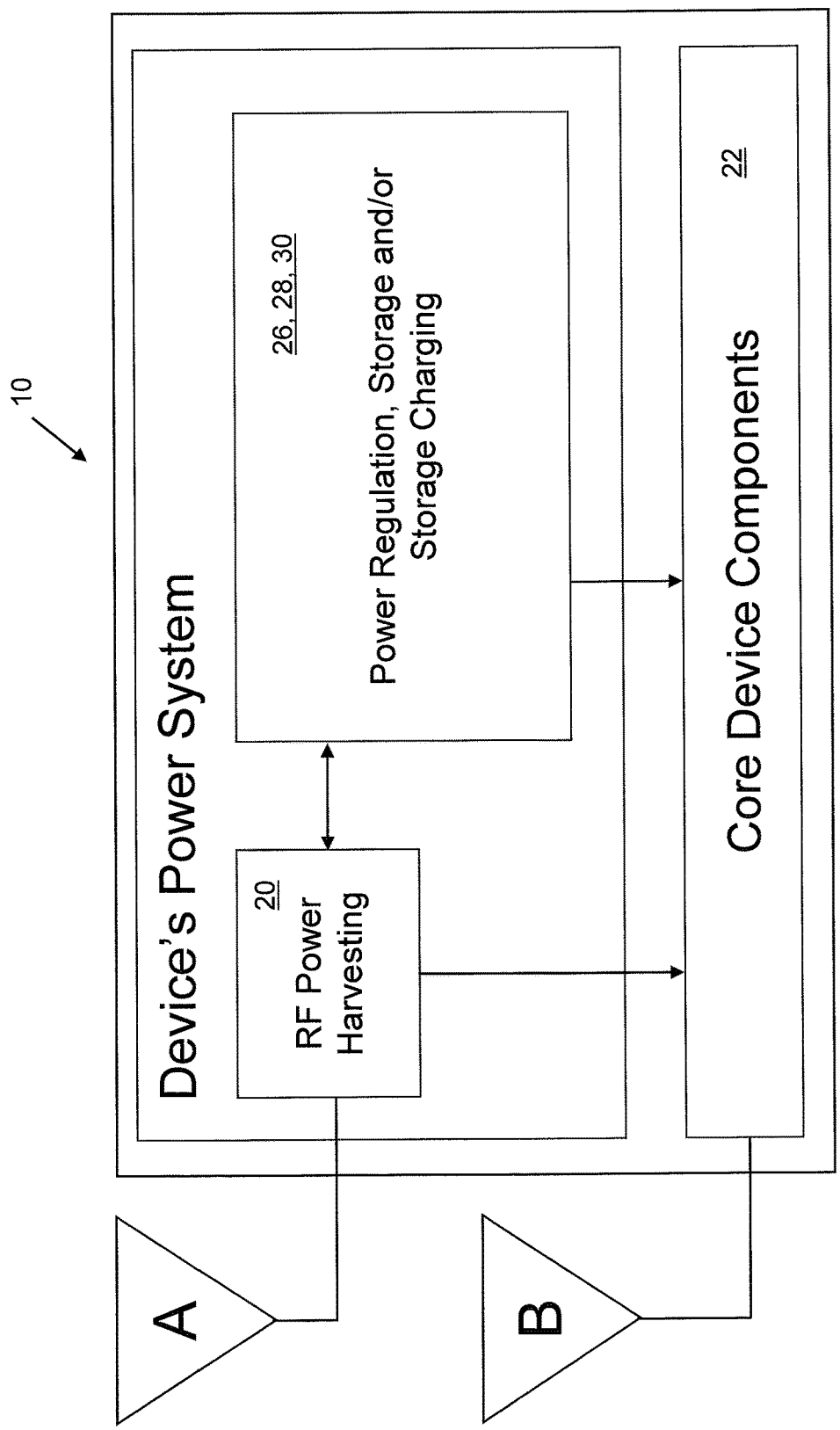
FIG. 56 is a block diagram of an RF Power Harvesting block using Antenna A to supply power to a Power Regulation, Storage and/or Storage Charging block and used to supply power to Core Device Components.
Figure 57:
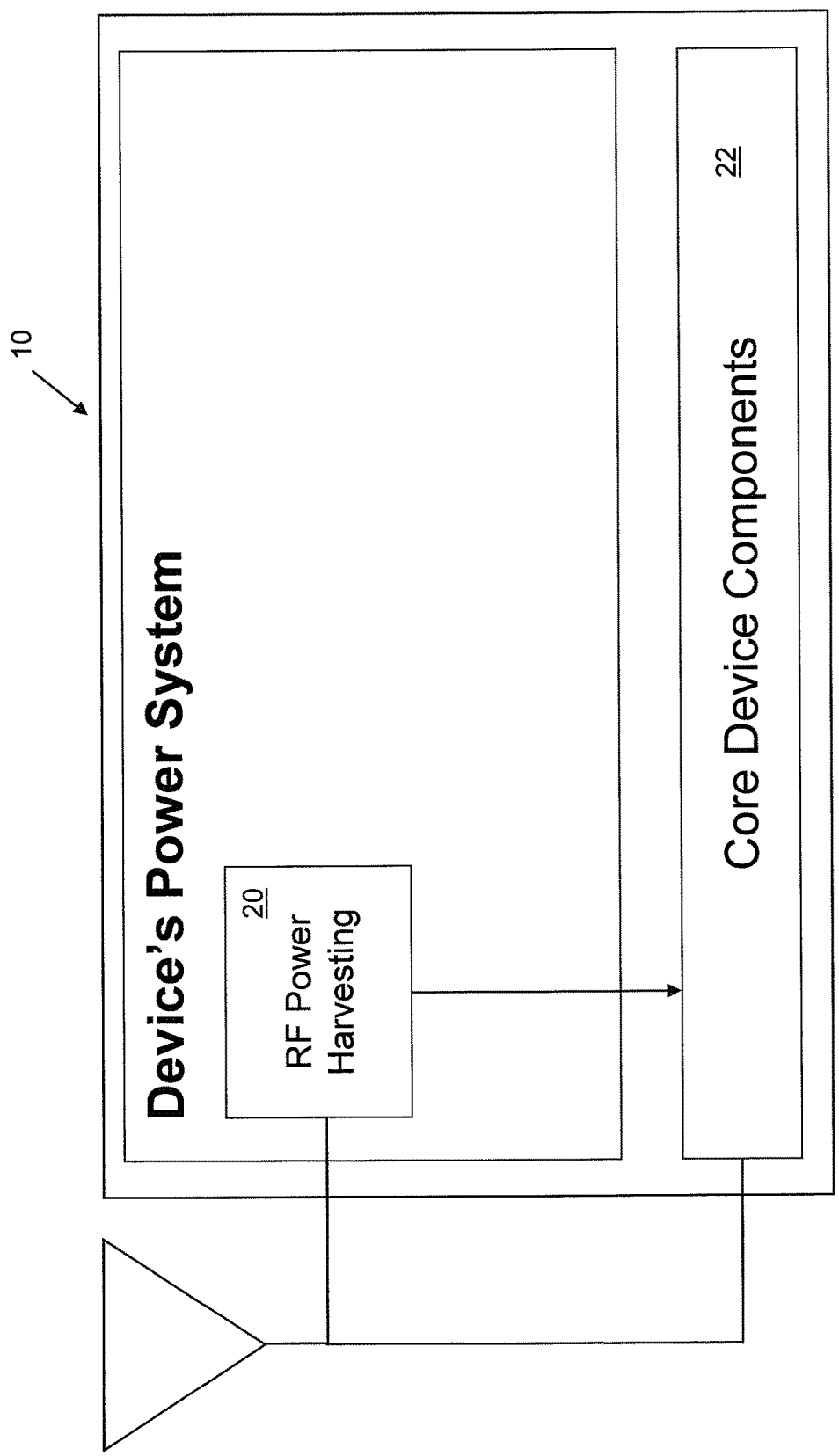
FIG. 57 is a block diagram of an RF Power Harvesting block used to directly supply power to Core Device Components.
Figure 58:
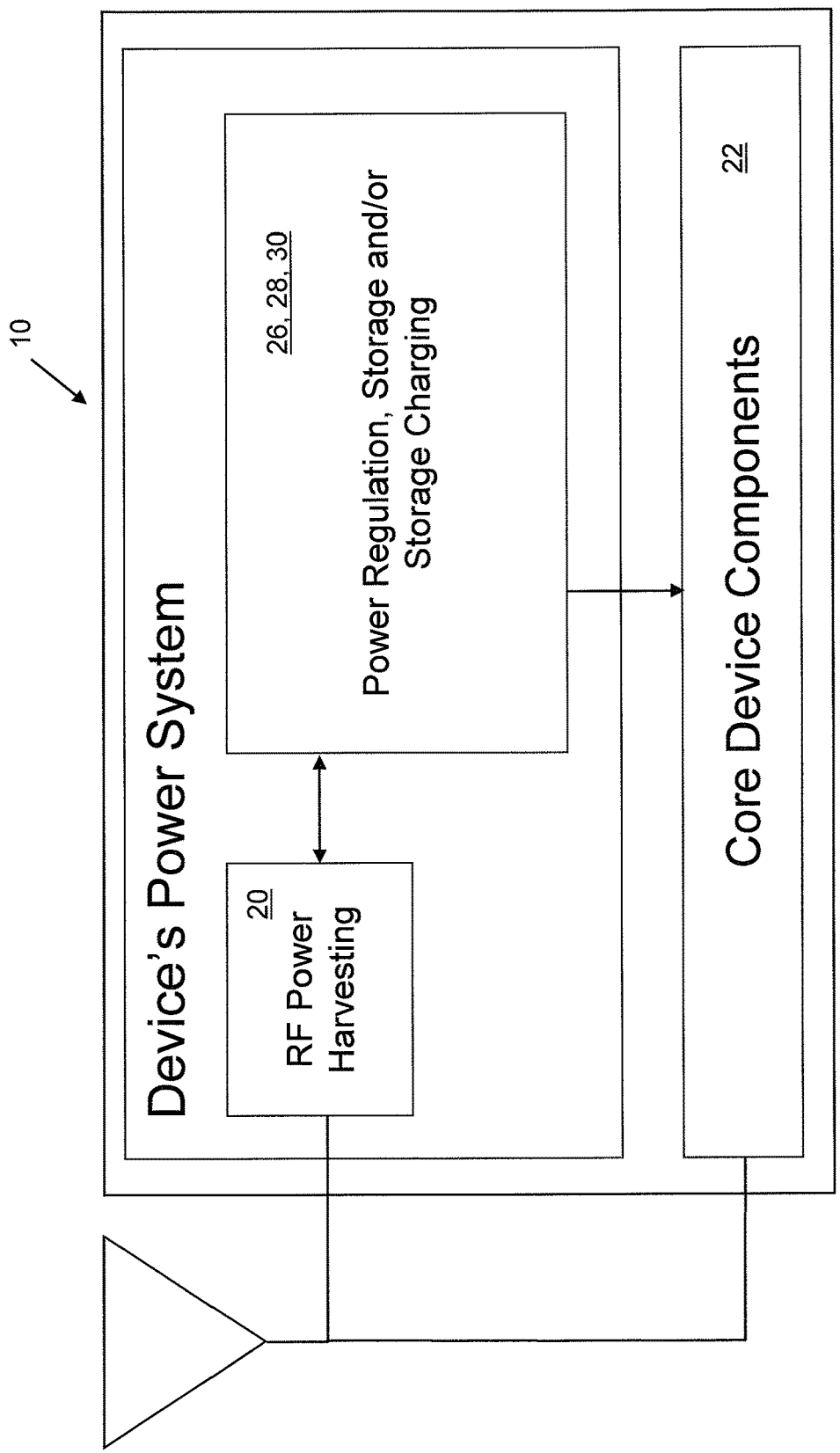
FIG. 58 is a block diagram of an RF Power Harvesting block used to supply power to a Power Regulation, Storage and/or Storage Charging block.
Figure 59:
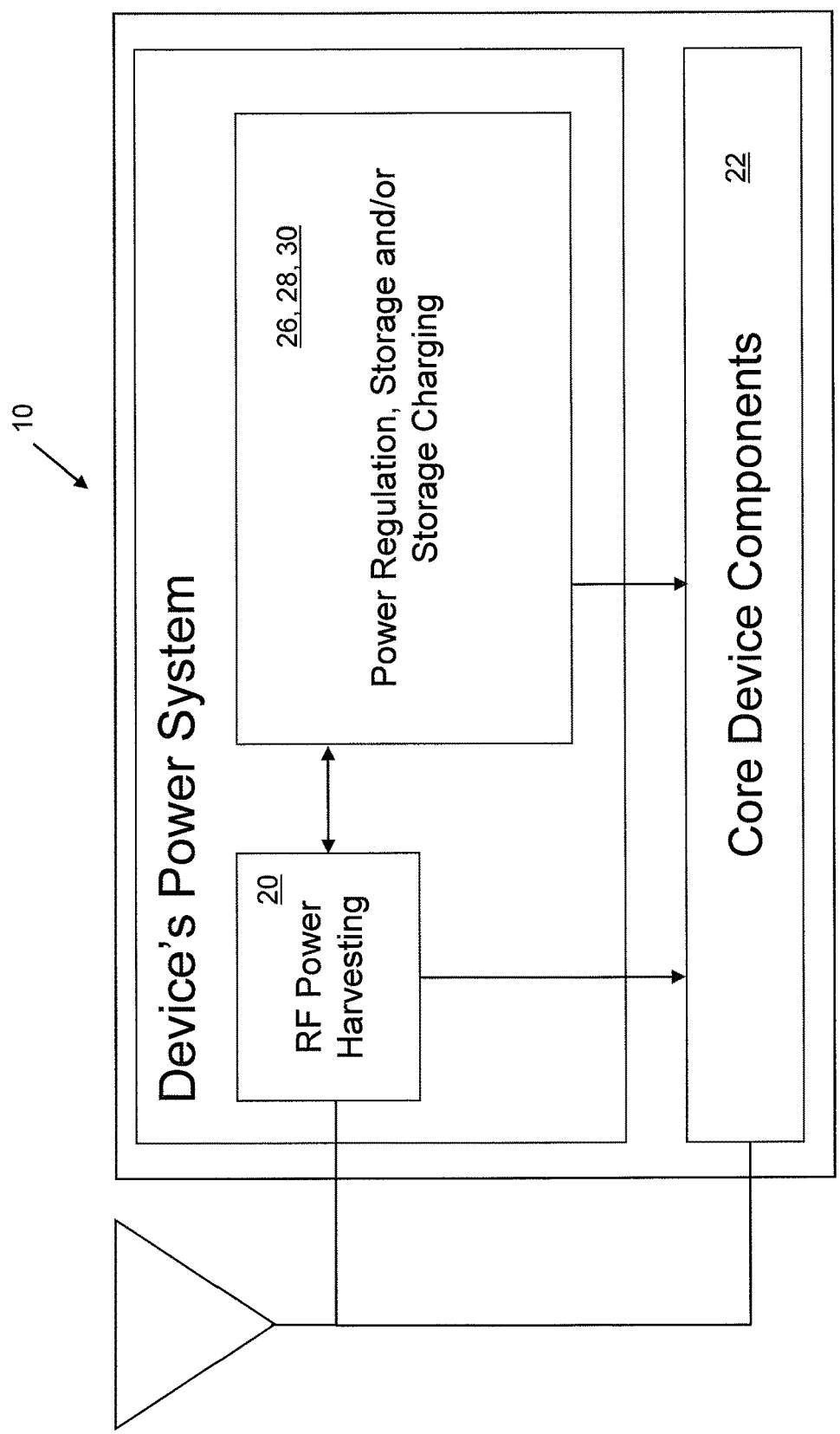
FIG. 59 is a block diagram of an RF Power Harvesting block used to supply power to a Power Regulation, Storage and/or Storage Charging block and used to supply power to Core Device Components.

The RF energy is retrieved from the environment by the use of the antenna. The antenna can be shared or standalone with respect to an antenna used for the device's wireless communication. FIGS. 54-56 show a device that has an antenna A for use by the RF power harvester 20 and an antenna B used for wireless one-way or two-way communication. FIGS. 57-59 show a device where the antenna is shared by both a device's communication module (within the core device 22 components) and the RF power harvester 20. In terms of form factor, the antenna used by the apparatus 10 can be a separate component or integrated directly into the form factor of the device.

The antenna is able to capture two types of available RF energy. The first type of energy exists as ambient RF energy. This type of RF surrounds us in our day-to-day lives and is usually generated to carry one way or two-way combinations of voice, video and data communications. The sources that the antenna can harvest from include, but are not limited to, medium-frequency AM radio broadcast, very-high-frequency (VHF) FM radio broadcast and television broadcast, ultra-high-frequency (UHF) broadcast, cellular base stations, wireless data access points, super-high-frequency (SHF) frequencies, and the industrial, scientific, and medical (ISM) bands. These sources cover transmission frequencies from 300 kHz to 30 GHz.

The second type of energy available is directed RF energy. This type of RF energy is directed from a transmitter specifically designed to deliver RF energy for harvesting by the antenna. The transmitter can be configured as a standalone device or integrated into an existing device.

Conversion of the Energy into DC

The RF energy captured by the antenna must be converted into a useful form of energy for the specific device. This conversion is shown in block form in all FIGS. 1-90) as the RF power harvesting 20 block. The most common form of useable energy is DC energy. To perform this conversion, the block includes circuitry to rectify the captured alternating current (AC) energy to create DC energy. The rectification in this block can be done with a diode(s), a transistor(s), or some other rectifying device or combination.

Regulation of the Energy

It may be necessary to regulate the converted power (hold the power at a constant level) for specific devices. FIGS. 2-7, 10-17, and 22-53 show how this regulation can be implemented using a power regulation 26 and/or power storage circuit 28 block. The devices that would need this block require a fairly constant voltage or current. Deviations from the required values may cause the device to not perform within its specifications. The regulation can be implemented in many different ways. The block can be as simple as using a Zener diode, or as complicated as using an integrated circuit such as a linear voltage regulator 26 or a switching regulator 26 to hold the voltage at a constant level. Certain devices have a more tolerable power requirement. For these devices, the regulation stage may be excluded.

Storage of the Energy

Figure 2:
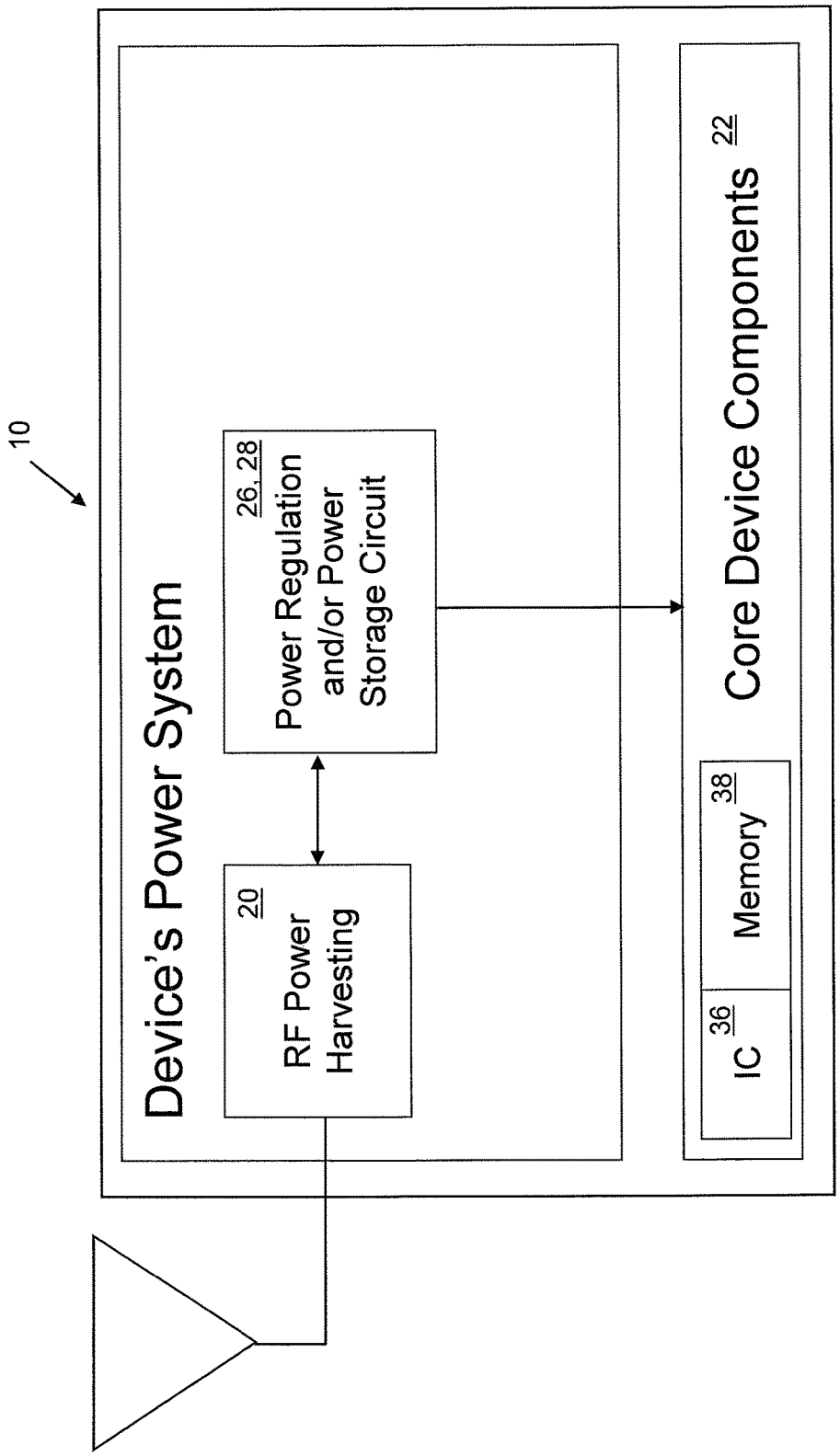
FIG. 2 is a block diagram of an RF Power Harvesting block in communication with a Power Regulation and/or Power Storage Circuit.
Figure 3:
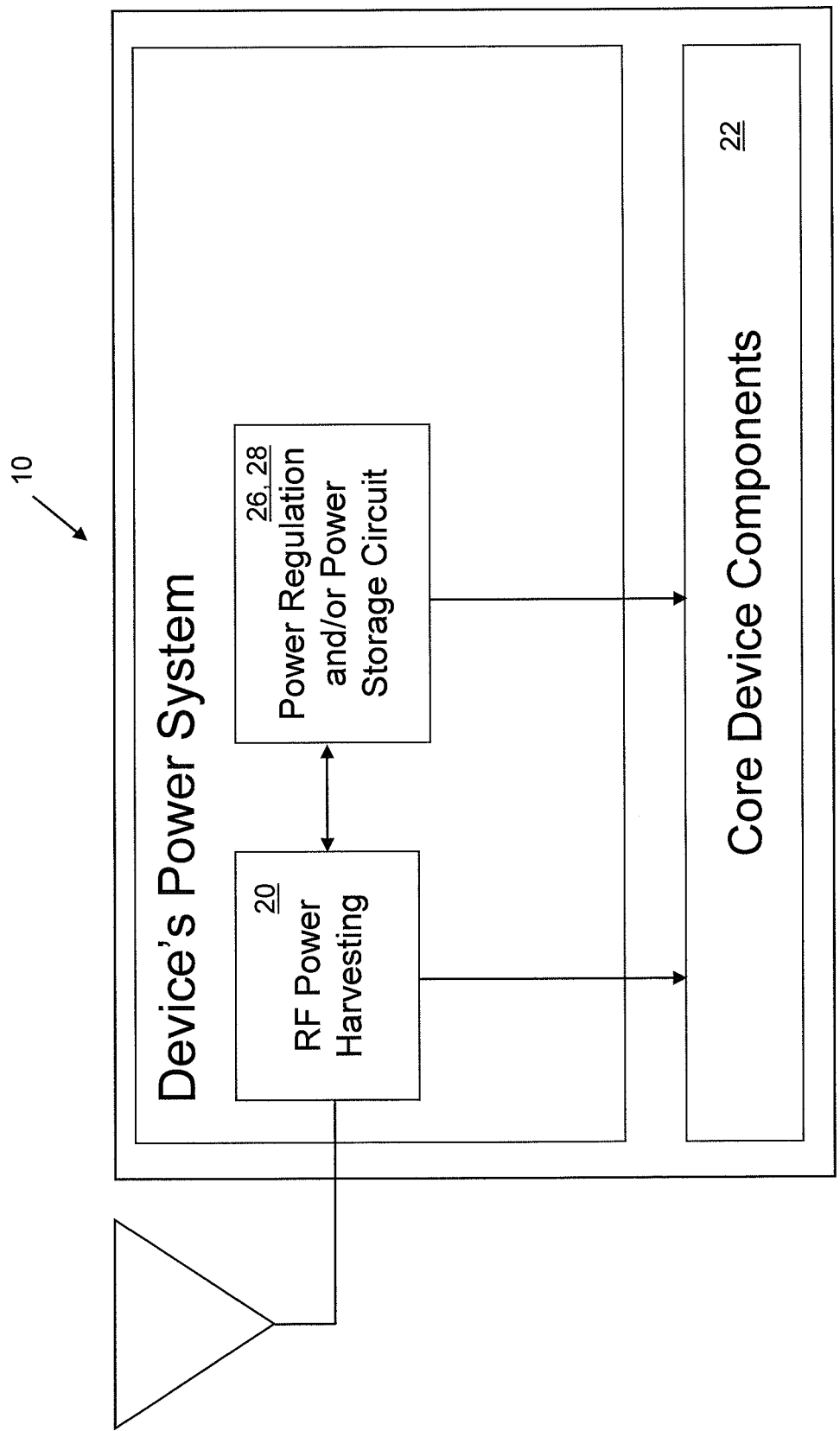
FIG. 3 is a block diagram of an RF Power Harvesting block in communication with a Power Regulation and/or Power Storage Circuit and used to supply power to Core Device Components.
Figure 4:
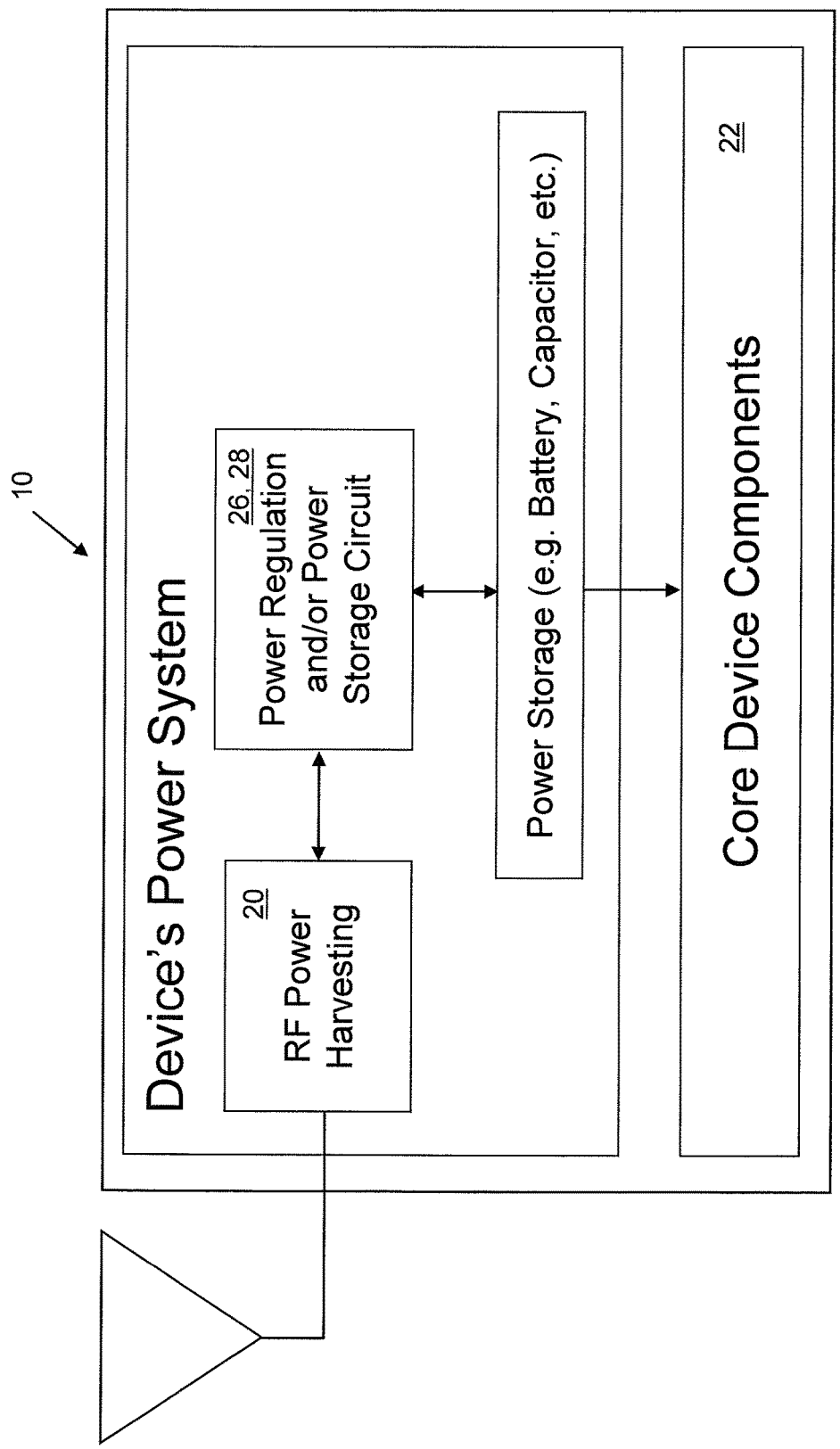
FIG. 4 is a block diagram of an RF Power Harvesting block in communication with a Power Regulation and/or Power Storage Circuit.
Figure 5:
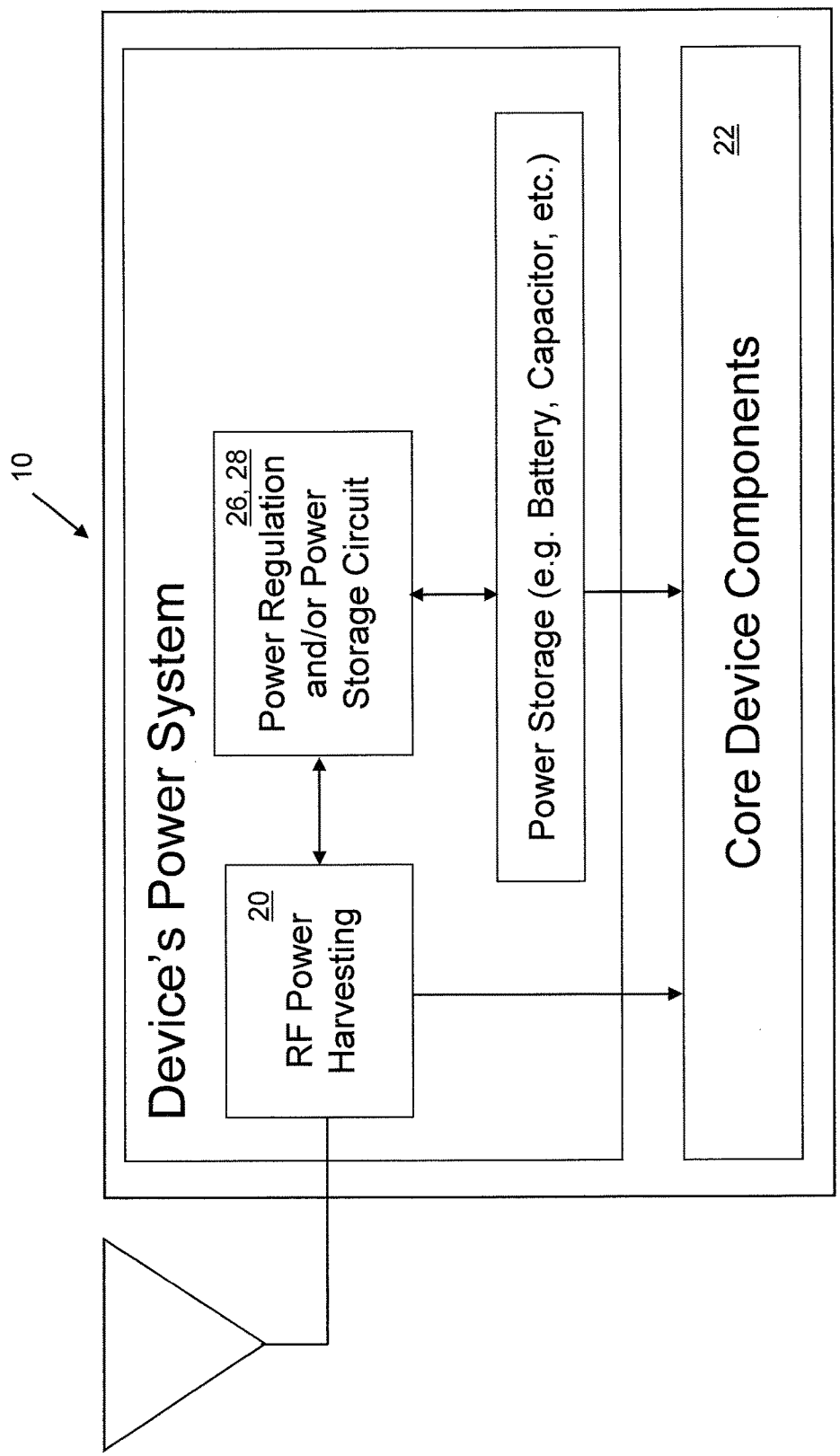
FIG. 5 is a block diagram of an RF Power Harvesting block in communication with a Power Regulation and/or Power Storage Circuit and used to supply power to Core Device Components.
Figure 6:
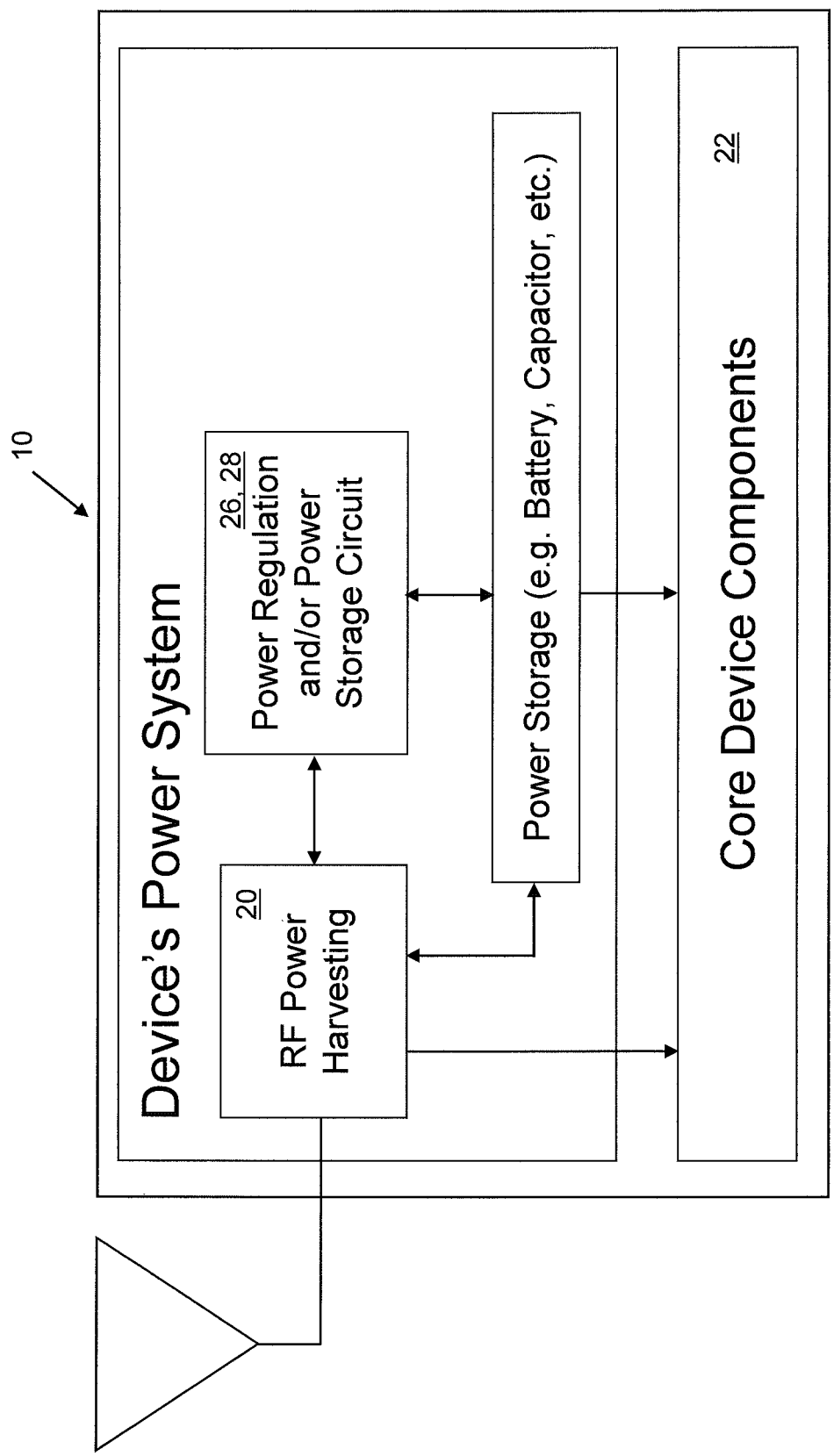
FIG. 6 is a block diagram of an RF Power Harvesting block in communication with a Power Regulation and/or Power Storage Circuit and a Power Storage block and used to supply power to Core Device Components.
Figure 7:
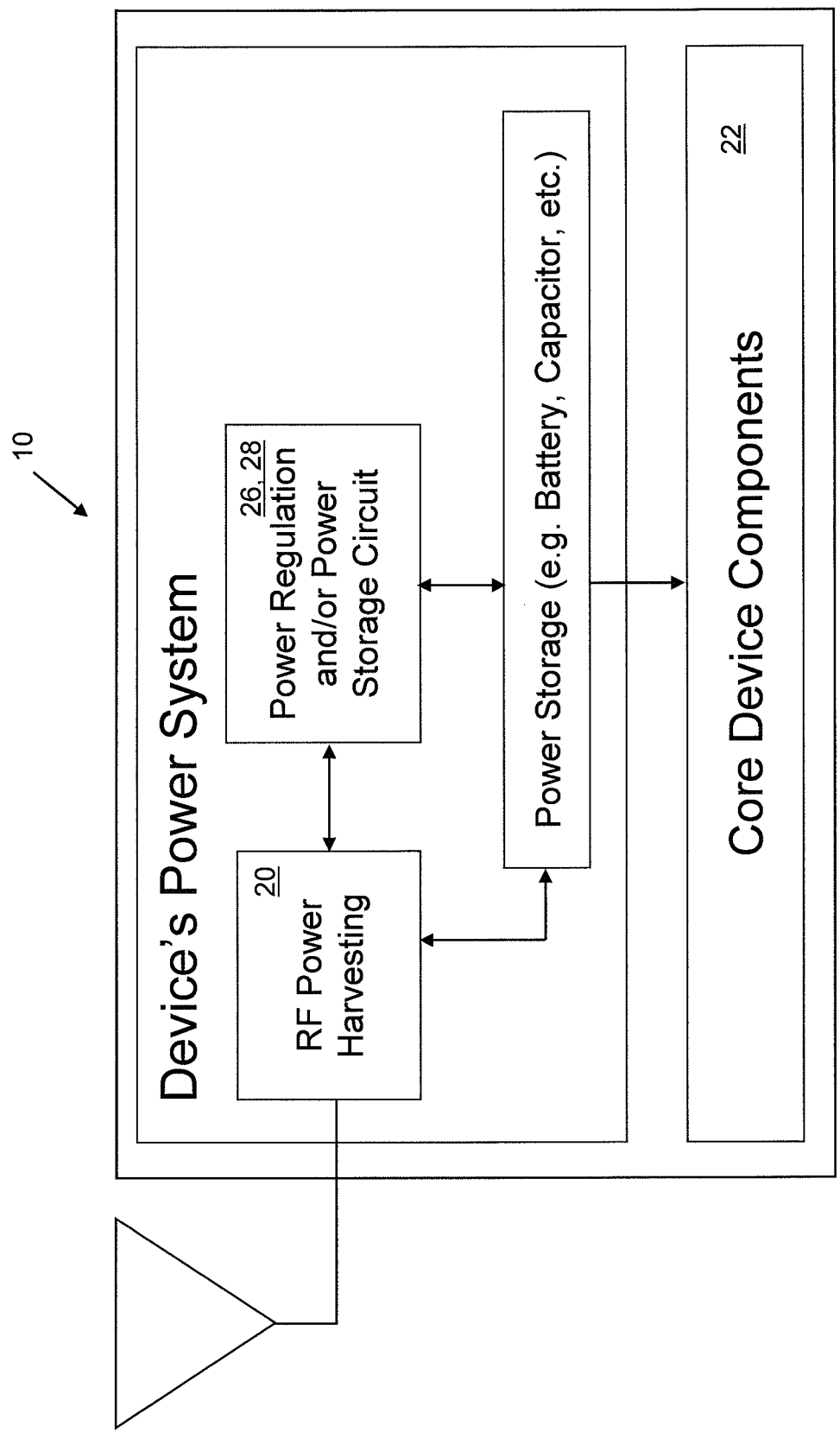
FIG. 7 is a block diagram of an RF Power Harvesting block in communication with a Power Regulation and/or Power Storage Circuit and a Power Storage block.
Figure 8:
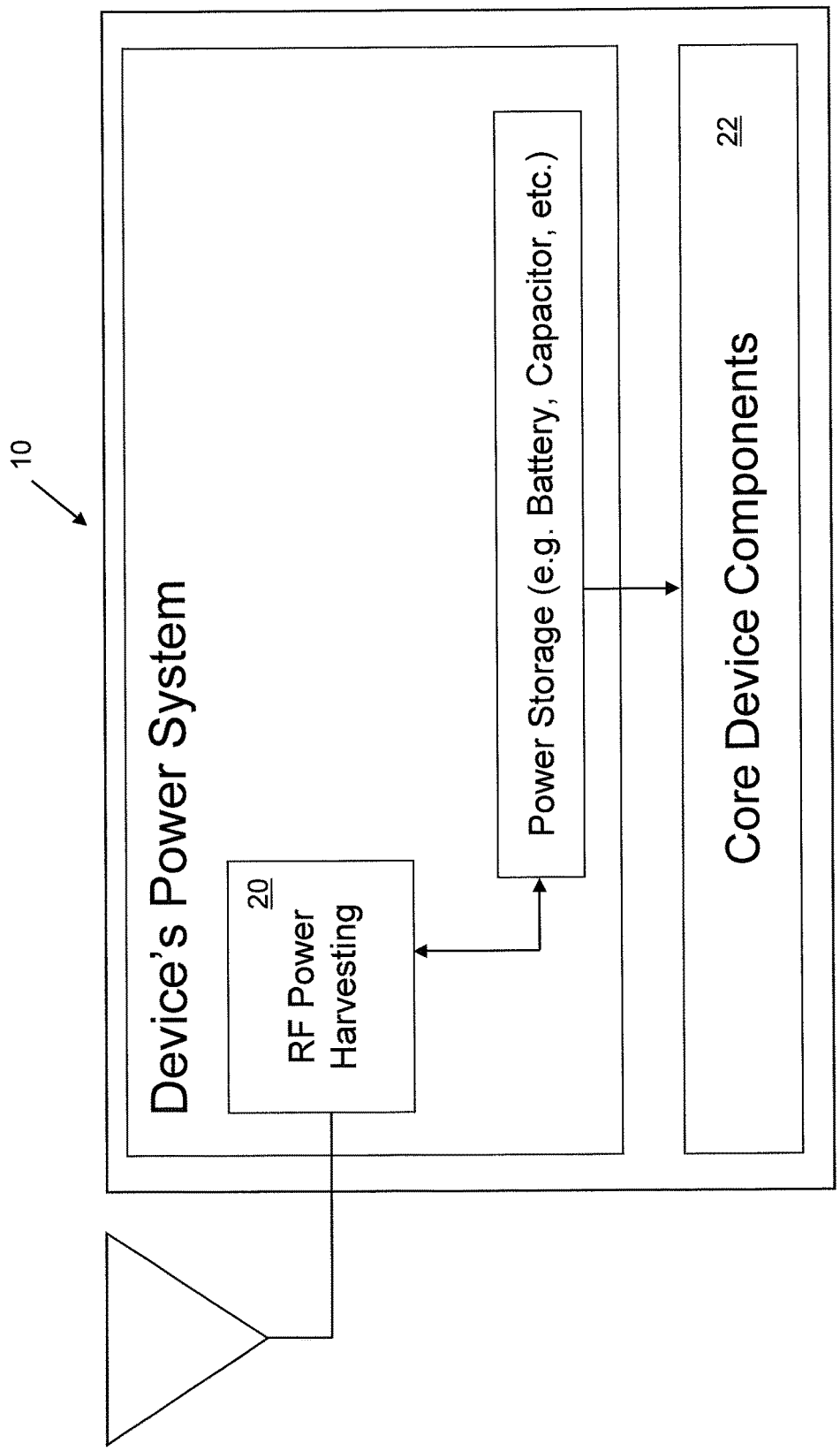
FIG. 8 is a block diagram of an RF Power Harvesting block in communication with a Power Storage block.
Figure 9:
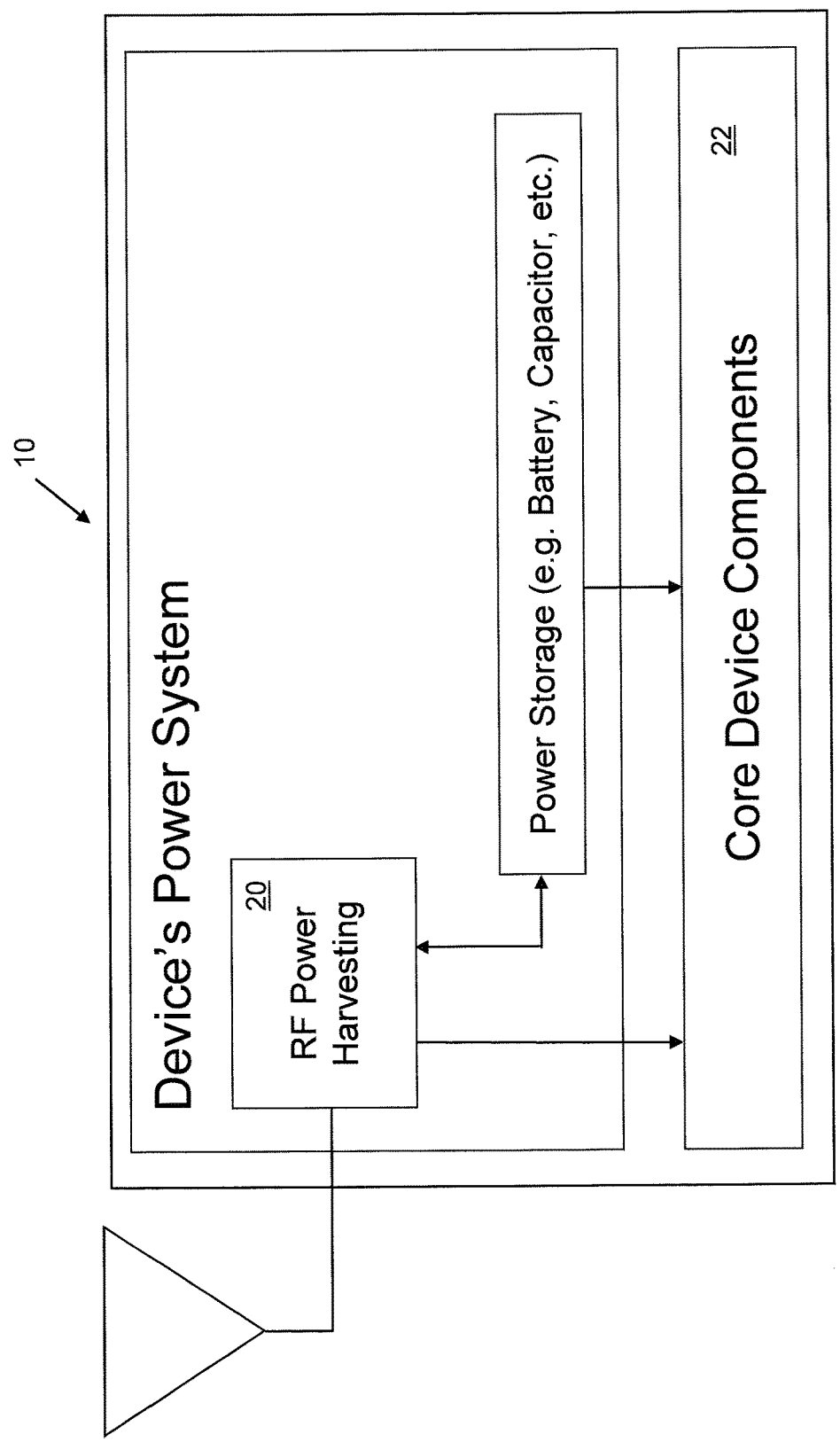
FIG. 9 is a block diagram of an RF Power Harvesting block in communication with a Power Storage block and used to supply power to Core Device Components.
Figure 10:
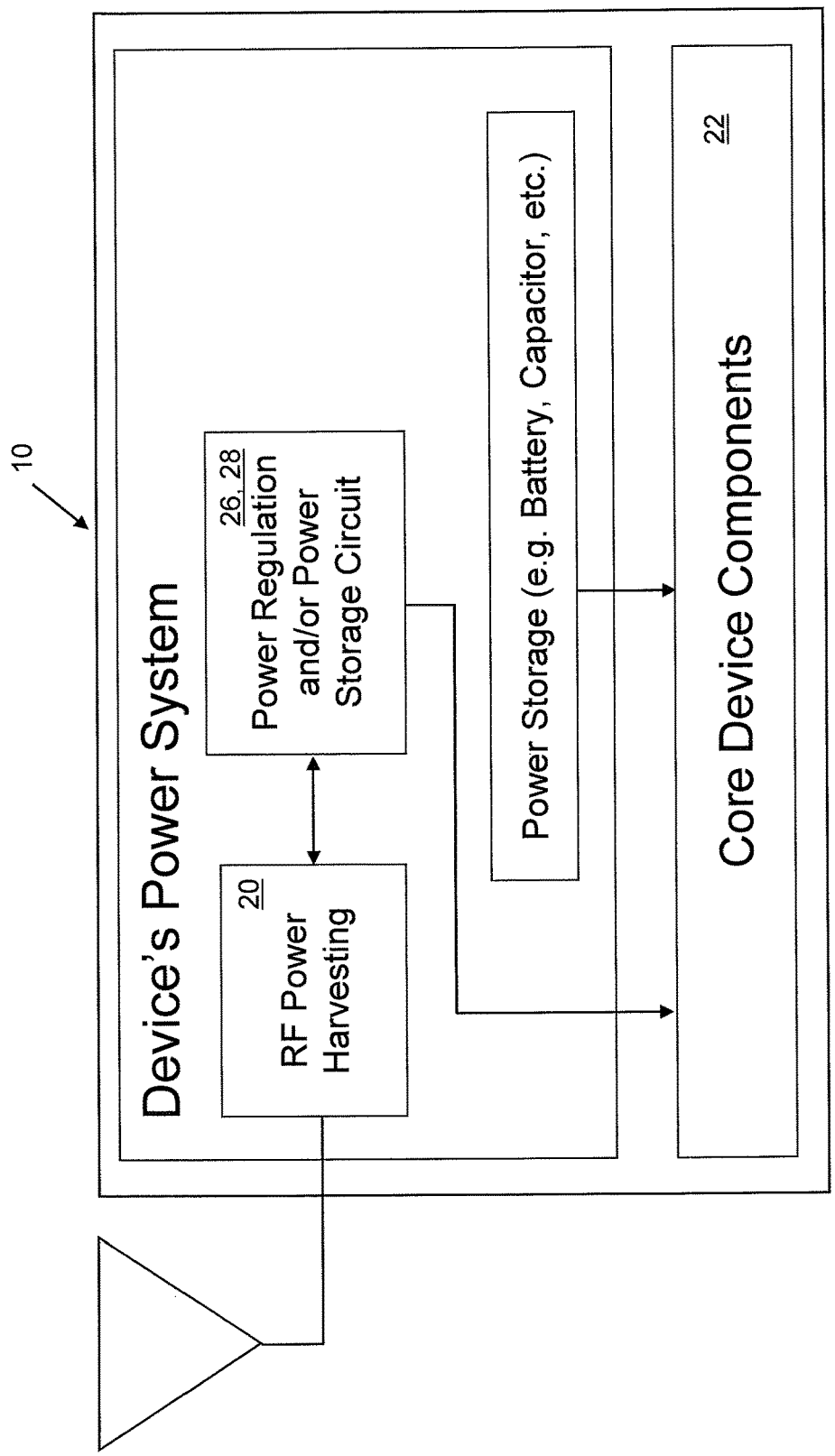
FIG. 10 is a block diagram of an RF Power Harvesting block in communication with a Power Regulation and/or Power Storage Circuit.
Figure 11:
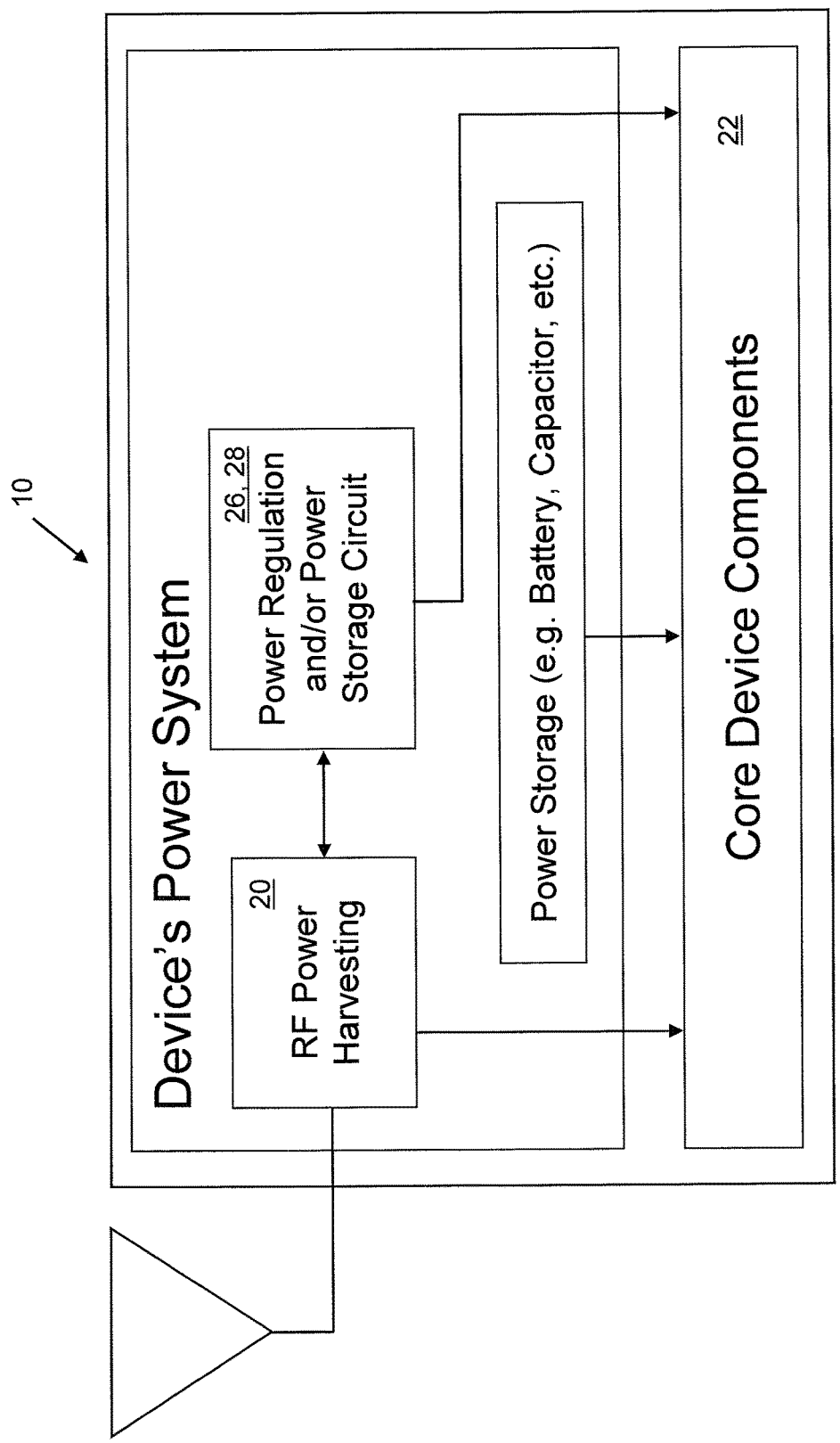
FIG. 11 is a block diagram of an RF Power Harvesting block in communication with a Power Regulation and/or Power Storage Circuit and used to supply power to Core Device Components.
Figure 12:
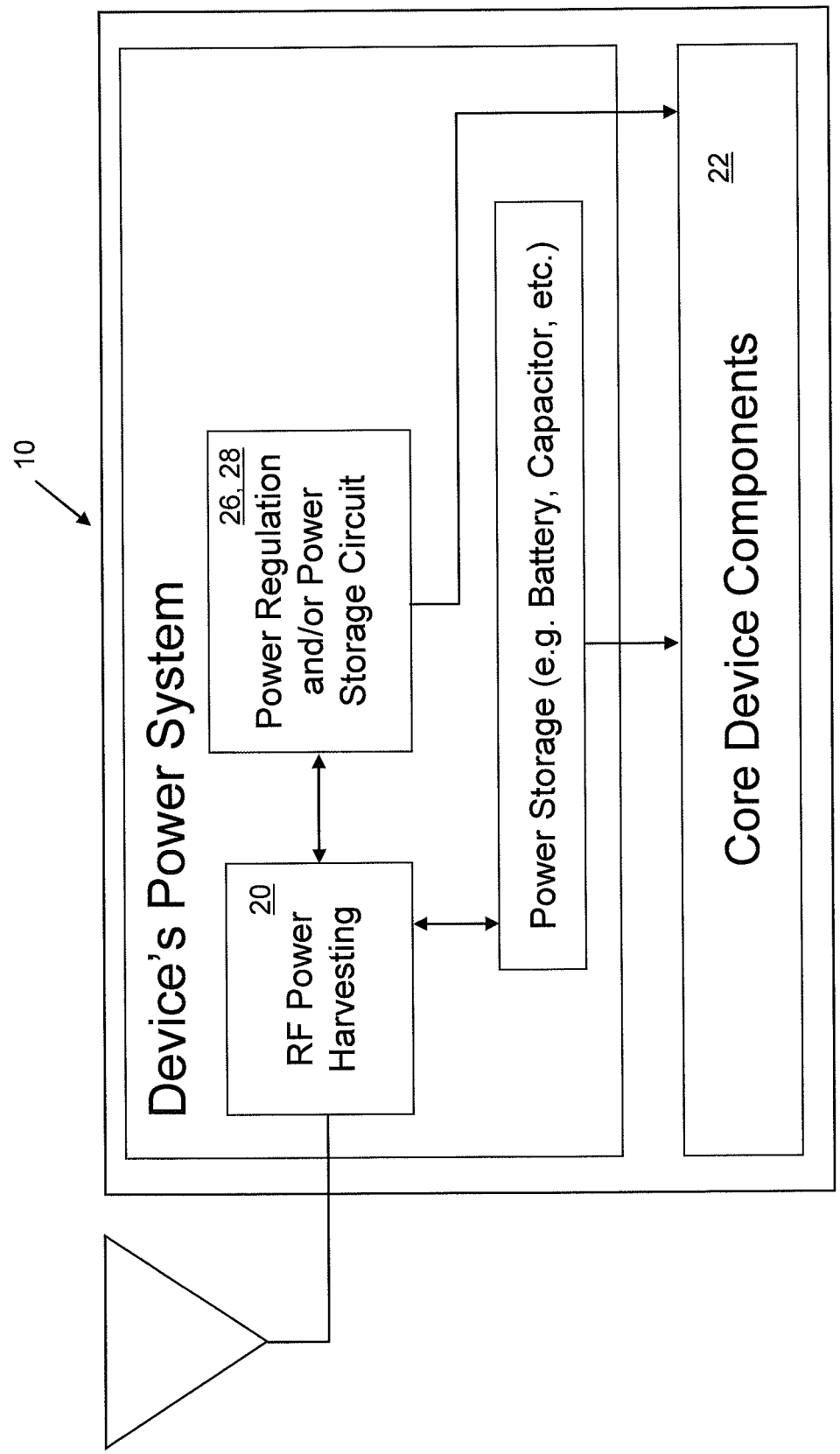
FIG. 12 is a block diagram of an RF Power Harvesting block in communication with a Power Regulation and/or Power Storage Circuit and Power Storage block.
Figure 53:
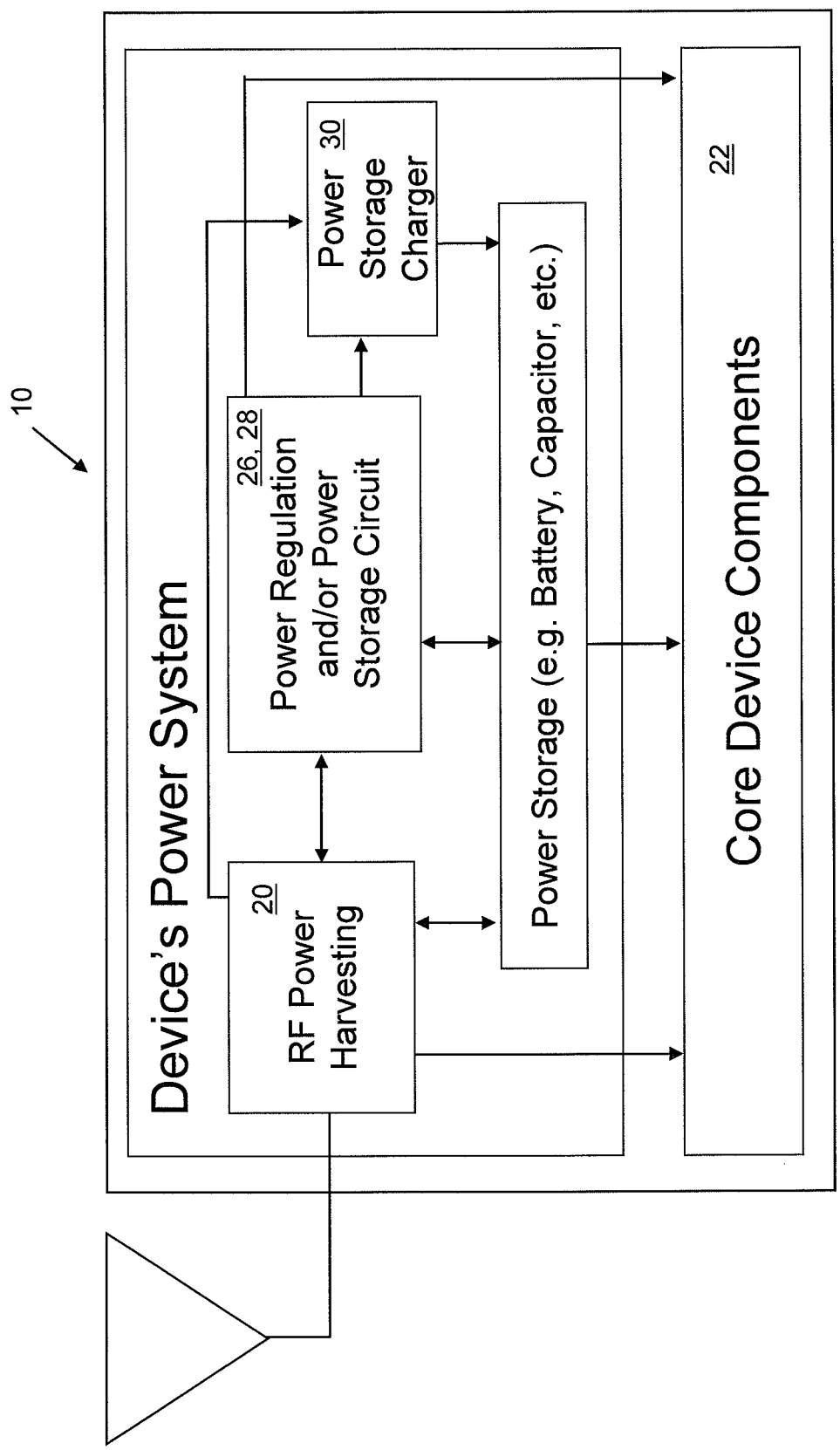
FIG. 53 is a block diagram of an RF Power Harvesting block in communication with a Power Regulation and/or Power Storage Circuit and a Power Storage block and used to supply power to Core Device Components and used to supply power to a Power Storage Charger.

If a device has intermittent power requirements, such as the devices exampled by FIGS. 2-53, it may be necessary to store the captured power for use at a later time. The power can be stored in the power storage block or the power regulation 26 and/or power storage circuit 28 block. Storage devices can include, but are not limited to, a battery, a capacitor, or another type of power storage component. In certain applications, it may be necessary to include additional circuitry that controls how the power is transferred to the storage device. The power storage charger 30 block is shown in FIGS. 18-53. This may be needed if the power storage component requires a special charging mechanism such as pulse charging or trickle charging. Power storage components include, but are not limited to, batteries (rechargeable and non-rechargeable), capacitors, inductors, fuel cells, and other storage elements. There are devices that will not require storage. These devices can run directly off of the converted power. These devices also may or may not require regulation of the captured power.

Supplying the Power

The captured DC power, which may or may not be regulated and/or stored, is supplied to the device, which is represented by the core device 22 components block in the figures. This may be a single connection or it may supply multiple parts of the device with power.

RF energy harvesting also has the ability to be augmented by other types of power harvesting or storage components. Other power harvesting technologies include, but are not limited to, solar, light (visible and non-visible), piezoelectric, vibration, acoustic, thermal, microgenerators, wind, and other environmental elements. Power storage components include, but are not limited to, batteries (rechargeable and non-rechargeable), capacitors, inductors, fuel cells, and other storage elements. FIGS. 60-88 show how the alternative power sources 24 block can be connected to an RF energy harvesting system. These figure show how the RF energy harvesting 20 block and the alternative power sources 24 block can work independently or have communication with each other. The antenna configurations shown in FIGS. 54-59 are still applicable with the addition of an alternative power sources 24 block. These antenna configurations can be applied to FIGS. 60-88.

RF energy harvesting also has the ability to provide a backup to devices on-grid (tethered) or with reliable power sources, which can be used in case the primary power source is lost. As an example, it may be mandated by regulations that a sensor has auxiliary power in case the primary supply is lost. It could be possible to use a rechargeable battery that obtains its charge from the primary supply when in operation. However, if the primary supply is lost for a time greater than the life of the rechargeable battery, the specification of uninterrupted power is not met. RF energy could be used to supply power to the described device while the primary supply is not available. The primary supply could include, but is not limited to, an on-grid connection, a generator, a battery, or other reliable power supply.

RF energy harvesting with or without alternative source augmentation is applicable to provide electric power directly or indirectly to a range of electronic components contained in any specific electrical or electronic device and includes, but is not limited to:

Passive electronic components, active electronic components;

Resistors, fixed resistors, variable resistors, thermistors, thyristor, thermocouple;

Capacitors, Electrolytic Capacitors, Tantalum Capacitors, Ceramic Capacitors, Multilayer Ceramic Capacitors, Polystyrene Film Capacitors, Electric Double Layer Capacitors (Super Capacitors), Polyester Film Capacitors, Polypropylene Capacitors, Mica Capacitors, Metallized Polyester Film Capacitors, Variable Capacitors;

Diodes, Voltage regulation diodes, light-emitting diodes, organic light-emitting diodes, Variable capacitance diodes, Rectification diodes, Switching diodes, Regulation Diodes, Diode bridges, Schottky barrier diodes, tunnel diodes, PIN diodes, Zener diodes, Avalanche diodes, TVSs;

Integrated circuits, microcontroller unit (MCU), microprocessor unit (MPU), logic circuits, memory, printed circuits, circuit boards, printed wiring boards;

Transistors, MOSFETs, FETs, BJTs, JFETs, IGBTs, Relays, Antennas, semiconductors, conductors, inductors, relays, diacs, triacs, SCRs, MOVs;

Fuses, circuit breakers;

Batteries, Non-rechargeable batteries, rechargeable batteries, coin cell batteries, button cell batteries, alkaline batteries, lithium batteries, lithium ion batteries, lithium polymer batteries, NIMH batteries, NICAD batteries, Lead acid batteries, Zinc air batteries, Manganese Lithium batteries, Niobium Titanium Lithium batteries, Vanadium Pentoxide Lithium batteries, Carbon Zinc batteries, Zinc Chloride batteries, Lithium Thionyl Chloride batteries, Manganese Dioxide batteries, Lithium Poly-Carbonmonofluoride batteries, Lithium Manganese Dioxide batteries, Lithium Chloride batteries, Lead Acid Calcium batteries, Lead Acid Tin batteries, Oxy Nickel batteries, Silver Oxide batteries, Magnesium batteries;

Inductors, Coils, High Frequency Coils, Toroidal Coils, Transformers, switches, chokes;

Motors, DC motors, stepper motor, AC motors, Fans;

Crystals, Oscillators, Clocks, Timers; and

Displays, LCDs, LED displays.

RF energy harvesting with or without alternative source augmentation is applicable across a range of markets and specific devices and includes but is not limited to:

Consumer electronics:

Electronic equipment, wired devices, battery powered devices, wireless communication devices, cell phones, telephones, phones, cordless phones, portable phones, Bluetooth devices, Bluetooth headsets, hands-free headsets, headsets, headphones, Wireless headsets, radios, AM/FM radios, shortwave radios, weather radios, Two-way radios, portable radio, lights, lanterns, portable lights, flashlights, nightlights, spotlights, search lights, calculators, graphing calculators, desk calculators, clocks, alarm clocks, wall clocks, desk clocks, travel clocks, watches, wristwatches, pocket watches, stop watches, timers, voice recorders, Dictaphones, laser pointers, power tools, cordless power tools, electronic razors, electric razors, handheld games, gaming systems, game controllers, wireless game controllers, remote controls, battery chargers, computers, portable computers, keyless entry, toys, toy guns, toy laser guns, games, microphones, musical instruments, musical effects processors, musical instrument tuners, metronomes, electronic chord charts, door openers, garage door openers, PDA, Cameras, Video recorders, Multi-meter, electronic test equipment, hand-held electronics, portable electronics, wireless pens, sound generators, noise generators, language translators, electric toothbrushes, portable televisions, pagers, transceivers, toy vehicles, remote control vehicles, toy planes, remote control planes, pet containment systems, invisible fence pet sensors, memory backup, base station battery backups, appliance battery backups, uninterrupted power supplies, GPS devices, memory retention power supplies, metal detectors, stud finders, metal stud finders, stun guns, tazers, wearable devices, baby monitors, intercoms, doorbells, wireless doorbells, electronic office supplies, electronic staplers, radar jammers, radar detectors, digital scales, microfilm cassettes, video head testers, compasses, noise canceling headphones, air samplers, depth finders, barometers, weather measurement instruments, data transfer devices, automatic distress signaling unit, Wireless audio speakers, Satellite radios, Police scanners, Car navigation systems (GPS devices), Decorative lights, Christmas lights, garden lights, lawn lights, ornamental lights, porch lights;

Multi-media players: MP3, DVD, analog music players, CD players, tape players, digital music players, digital video players, minidisc; and Computer: keyboards, mice, peripherals, computer equipment, electronic computers, computer storage, computer terminals;

Building/Industrial Automation:

Sensors: Position, elevator, temperature, fire, accelerometers, level, gas level, fluid level, light level, flow, gas flow, fluid flow, light flow, plasma flow, pressure, gas pressure, fluid pressure, motion, light, infrared light, ultraviolet light, X-rays, cosmic rays, visible light, gamma rays, chemical, stress, strain, depth, electrical characteristics, voltage, current, viscosity, acoustical, sound, listening, thickness, density, surface quality, volume, physical, mass, weight, force, conductivity, distance, orientation, vibration, radioactivity, field strength, electric field strength, magnetic field strength, occupancy, smoke detector, carbon monoxide detector, radon detector, air quality, humidity, glass breakage, break beam detector;

Controls: Position, elevator, temperature, fire, accelerometers, level, gas level, fluid level, light level, flow, gas flow, fluid flow, light flow, plasma flow, pressure, gas pressure, fluid pressure, motion, light, infrared light, ultraviolet light, X-rays, cosmic rays, visible light, gamma rays, chemical, stress, strain, depth, electrical characteristics, voltage, current, viscosity, acoustical, sound, listening, thickness, density, surface quality, volume, physical, mass, weight, force, conductivity, distance, orientation, vibration, radioactivity, field strength, electric field strength, magnetic field strength, occupancy, smoke detector, carbon monoxide detector, radon detector, air quality, humidity; and Devices: Thermostats, light switches, door locks, smartcard door locks, lighting, emergency lighting, motion lighting, safety lighting, highway lighting, construction lighting, sign lighting, roadway sign lighting, construction sign lighting, automatic flushing units, automatic soap dispenser, automatic paper towel dispenser, automatic faucets, automatic door sensors, identification reader, fingerprint reader, credit card readers, card readers, valve actuators, gauges, analog gauges, digital gauges, fire extinguishers, wireless switches, remotely operated inspection equipment, gas/oil pipeline monitoring systems, robotic pipeline inspection gauges, "auto-reclosers" for electric power lines, sonar buoys, telemetry systems, electronic record tracking systems, robbery tracking devices, interrogators, programmers, emergency exit alarms, alarms, flood alarms, gas alarms, electronic entry systems, security keypads, silo transducers, data recorders, signal tracers, anti-static strap testers, radiosonde weather balloons, utilities load controllers, profilometers, noise cancellation equipment, infrared beacons;

Military/Government:

Tracking tags: Weapons, vehicle, soldier, gear/assets, staff, general population, security access badges;

Sensors: Proximity, intrusion, environmental, chemical/biological; and

Equipment: Battery charger, surveillance, card readers, identification reader, fingerprint reader, retinal scanners, satellites, rockets, space vehicles, search and rescue transponders (SARTs), emergency position-indicating rescue beacons (EPIRBs), emergency locator transmitters (ELTs), military radios, electronic toll collection systems, postal tracking systems, communications, thermal imaging, night vision, training targets, field medical equipment, house arrest monitors, laser tags, electronic parking meters, multiple integrated laser engagement system, munitions and mines, ship sensors;

Utility:

Gas consumption meters, water consumption meters, and electric consumption meters;

Logistics & Supply Chain Management:

Radio-frequency identification devices (RFID), RFID readers;

Tracking: Asset tags, cargo container location beacons, transponders, transceivers; and Devices: Smart price tags, smart shelving, handheld barcode scanner, barcode scanners, credit card readers, card readers, retail signage, hotel door locks;

Homeland Security:

Sensors: Occupancy, proximity, environmental, chemical/biological, motion, position; and Metal detector wand;

Medical:

Implantable: cochlear implants, neural stimulators, pace makers, medication administration, defibrillator;

Body function monitors: pressure, temperature, respiration, blood oxygenation, insulin, hearing aid, pulse, EKG, heart, Holter;

Tracking tags: Patient, baby identification, assets, supplies, staff, medication, instruments;

Devices: Home healthcare equipment, ambulatory infusion pumps, blood analyzers, biofeedback systems, bone growth stimulators, thermometers, digital thermometers, stimulators, galvanic stimulators, muscle stimulators, pediatric scales; and Agriculture—livestock tracking and asset tracking:

Tracking: livestock, asset, wildlife tracking devices; and

Equipment: cattle prods;

Automotive:

Automotive antennas, Automotive Audio Systems, Automotive Lighting, Automotive Video Systems, Computers, Processors, Controls, Switches, Electric Motors, Actuators, Ignition Systems, Starter Systems, Injection Systems, Powertrain Electronics, Radar Detectors, Proximity Detectors, Safety Systems, Security Systems, Sensors, Regulators, Distributors, Vehicle Control, Wiper Systems, Washer Systems, Radio, Video Systems, Entertainment Systems, Navigation Systems, GPS systems, Power Mirror Systems, Emission control systems;

Appliances:

Monitoring systems and control systems for major and small appliances including washing machines, dryers, refrigerators, freezers, coolers, air conditioners, humidifiers, dehumidifiers, air purifiers, air filters, fans, furnaces, water heaters, boilers, space heaters, sowing machines, ice makers, microwave ovens, convection ovens, ovens, toaster ovens, ranges, range hoods, cooktops, stoves, stovetops, crock pots, hot plates, dishwashers, garbage disposals, can openers, vacuum cleaners, blenders, mixers, food processors, irons, coffee makers, toasters, grills, hair dryers, electric tooth brushes, electric razors, electric drills, electric screwdrivers, chainsaws, lawnmowers, push mowers, riding mowers, trimmers, brush cutters, pruners, edgers, vending machines;

Ventilation, Heating, Air-Conditioning, and Commercial Refrigeration Equipment:
Monitoring systems, control systems;
Engine, Turbine, and Power Transmission Equipment;
Monitoring systems, control systems;
Other General Purpose Machinery Manufacturing:
Monitoring systems, control systems;
Telecommunications:
Monitoring systems, control systems;
Portable;
Aircraft:
Monitoring systems, control systems, actuator systems, sensors.

It should be noted that devices within a specific category may be applicable across multiple areas even if they are not specifically listed. (e.g., temperature sensors apply to Industrial and Building Automation and Appliances).

To retrofit or redesign the devices listed, it is possible to implement the described systems in numerous ways. It may be advantageous to leave the device design as-is including the existing power supply. As an example, a device may use non-rechargeable batteries to operate. The device will most likely have a protection circuit to prevent damage if the batteries are installed incorrectly. The protection mechanism is commonly a diode inline with the positive terminal of the battery. In this case, the RF power harvester 20 with or without the alternative power source 24 could be inserted, with an antenna, into the device. The power generated by the RF power harvester 20 (and the alternative power source 24, if applicable) could be connected to the device after the protection mechanism described to avoid potential charging of a non-rechargeable battery.

Another way to configure the device's power system is to replace the non-rechargeable batteries with rechargeable batteries. In this instance, the output from the RF power harvester 20 (and alternative power source 24) could be connected to either side of the protections device. If the connection is before the protection mechanism, the RF power harvester 20 (and the alternative power source 24, if applicable) will recharge the battery and supply power to the device. If the connection is after the protection mechanism, the RF power harvester 20 (and the alternative power source 24, if applicable) will supply power to the device and the battery will supply any extra power needed that could not be supplied by the RF power harvester 20 (and the alternative power source 24, if applicable). It should be noted that the protection device in this case is not needed for proper operation. Its only function would be to protect the batteries from being installed incorrectly. An antenna could be contained inside or placed on the outside of the device.

Another configuration of the device's power system is to remove the existing batteries and install the RF power harvester 20 (and the alternative power source 24) in the enclosure provided for the batteries. An antenna could be contained inside or placed on the outside of the device.

Yet another method of configuring the device's power system would be to reduce the number of batteries and replace them with the RF power harvester 20 (and the alternative power source 24). In this case, the output from the system would be connected to the batteries in series or parallel depending on the original battery configuration. An antenna could be contained inside or placed on the outside of the device.

An additional option, would be to completely redesign the product and integrate the required circuitry and storage components into the device. This method is probably the most advantageous because it can fully take advantage of the benefits offered by the RF power harvester 20 (and the alternative power source 24). An antenna could be contained inside or placed on the outside of the device.

If the RF power harvester 20 (and the alternative power source 24) is used as a backup to the primary power supply, a switch could be implemented into the system in order to switch the RF power harvester 20 (and the alternative power source 24) on when the primary source is lost. In this case, an antenna could be contained inside or placed on the outside of the device.

To show the flexibility of RF energy harvesting, several products were retrofitted to include an RF power harvester 20 (energy harvesting circuitry). These products include a wireless keyboard, a wall clock, and a desk calculator.

Figure 13:
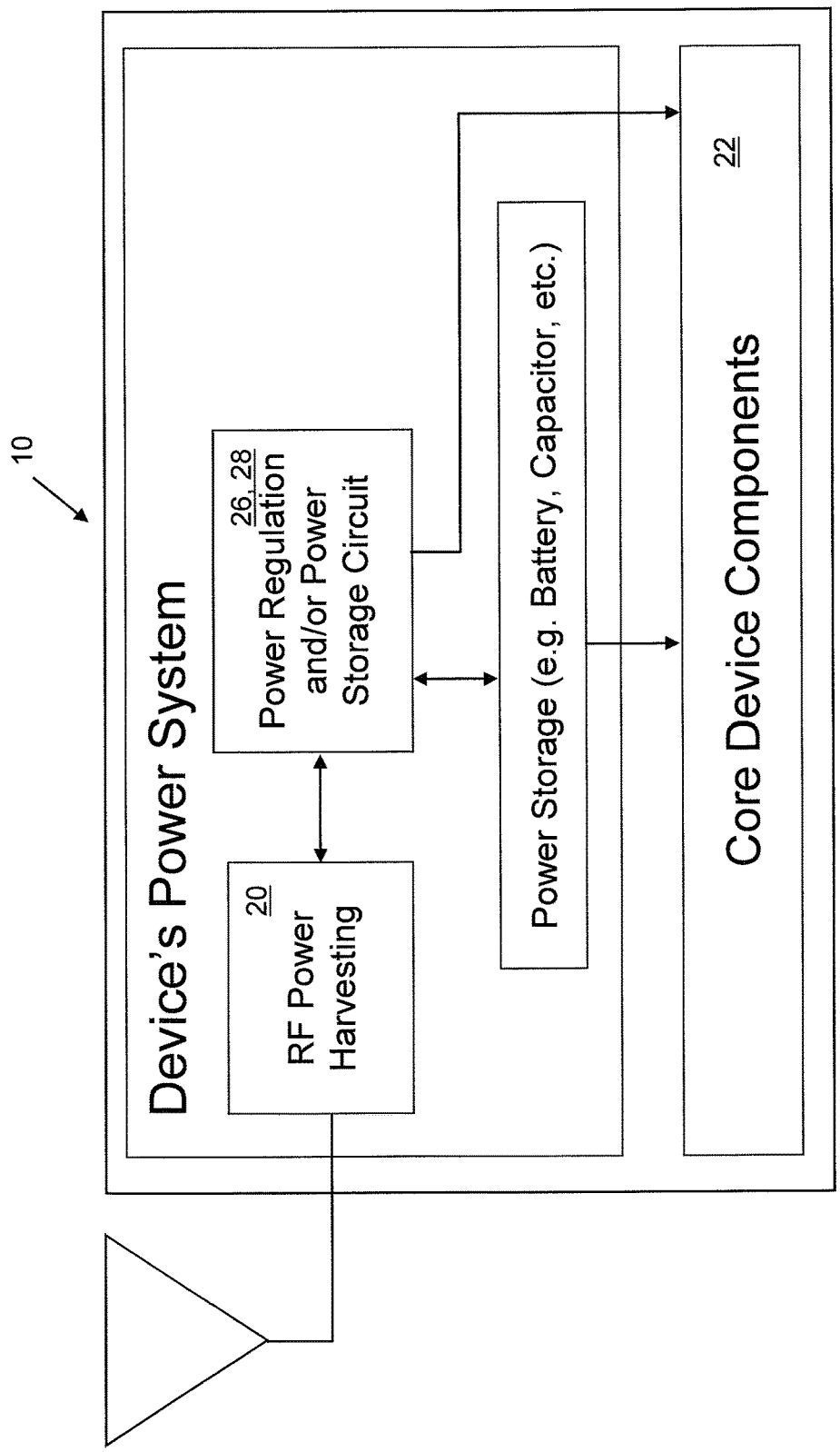
FIG. 13 is a block diagram of an RF Power Harvesting block in communication with a Power Regulation and/or Power Storage Circuit.
Figure 14:
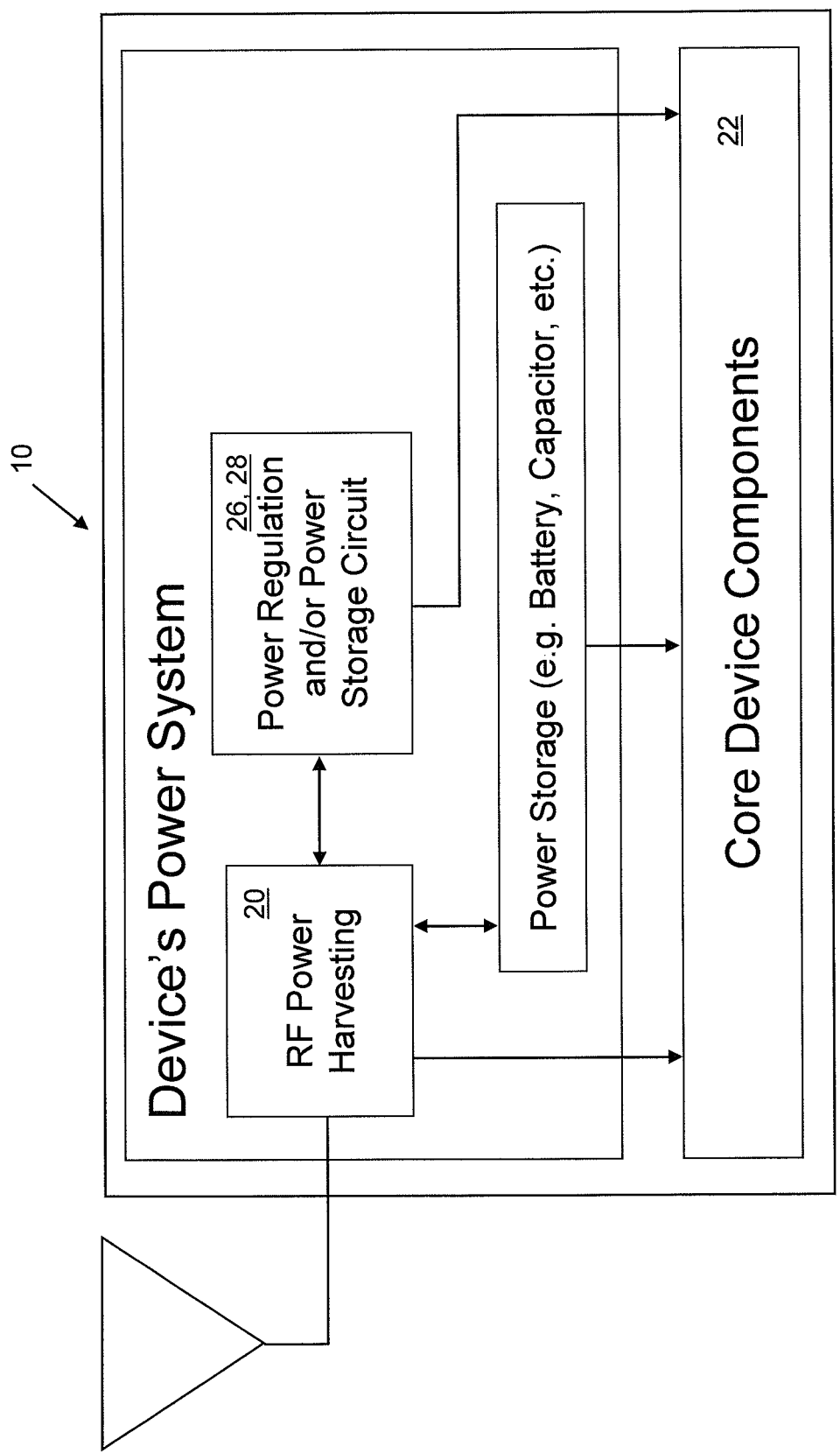
FIG. 14 is a block diagram of an RF Power Harvesting block in communication with a Power Regulation and/or Power Storage Circuit and Power Storage block and used to supply power to Core Device Components.
Figure 15:
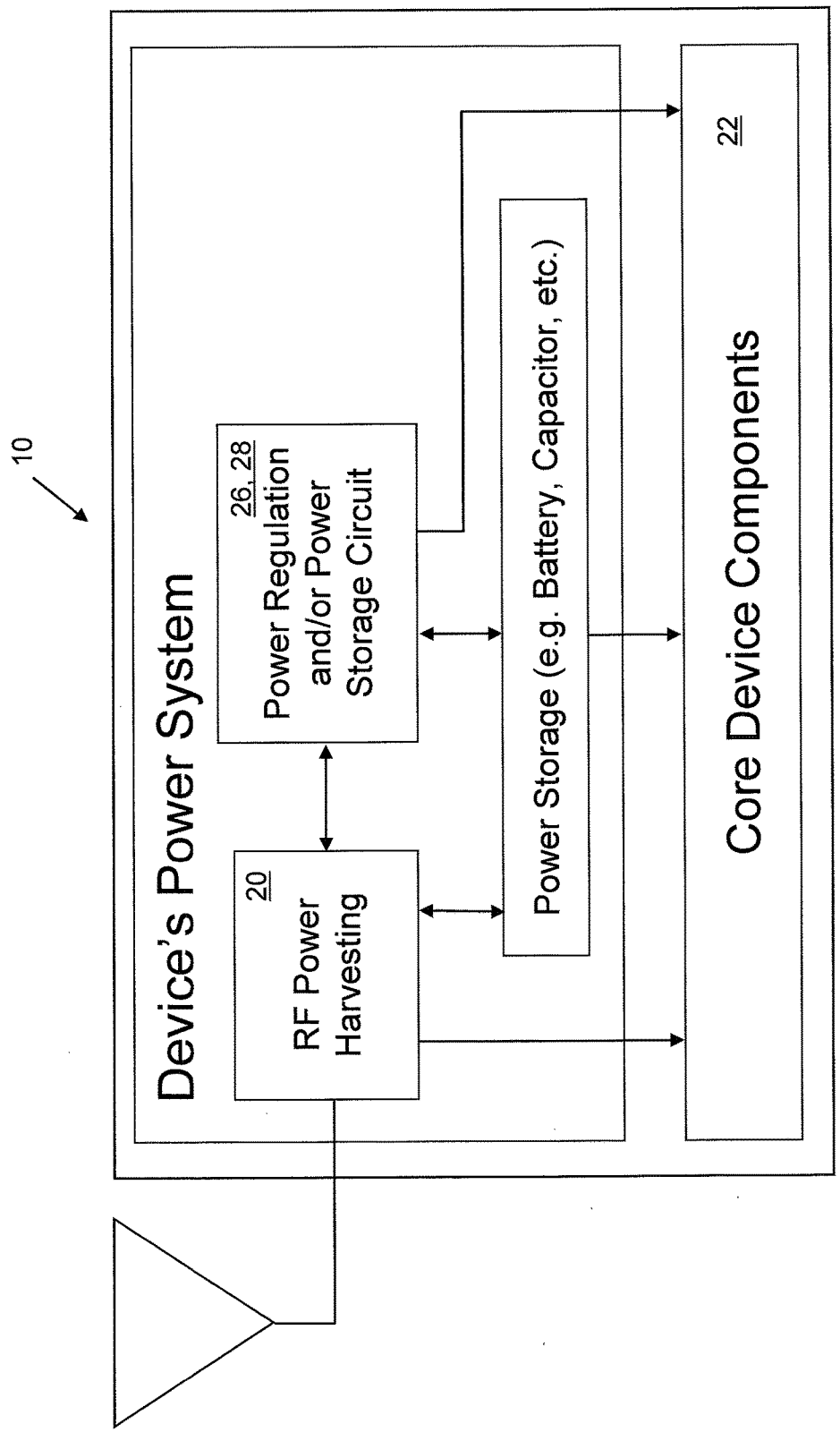
FIG. 15 is a block diagram of an RF Power Harvesting block in communication with a Power Regulation and/or Power Storage Circuit and Power Storage block and used to supply power to Core Device Components.
Figure 16:
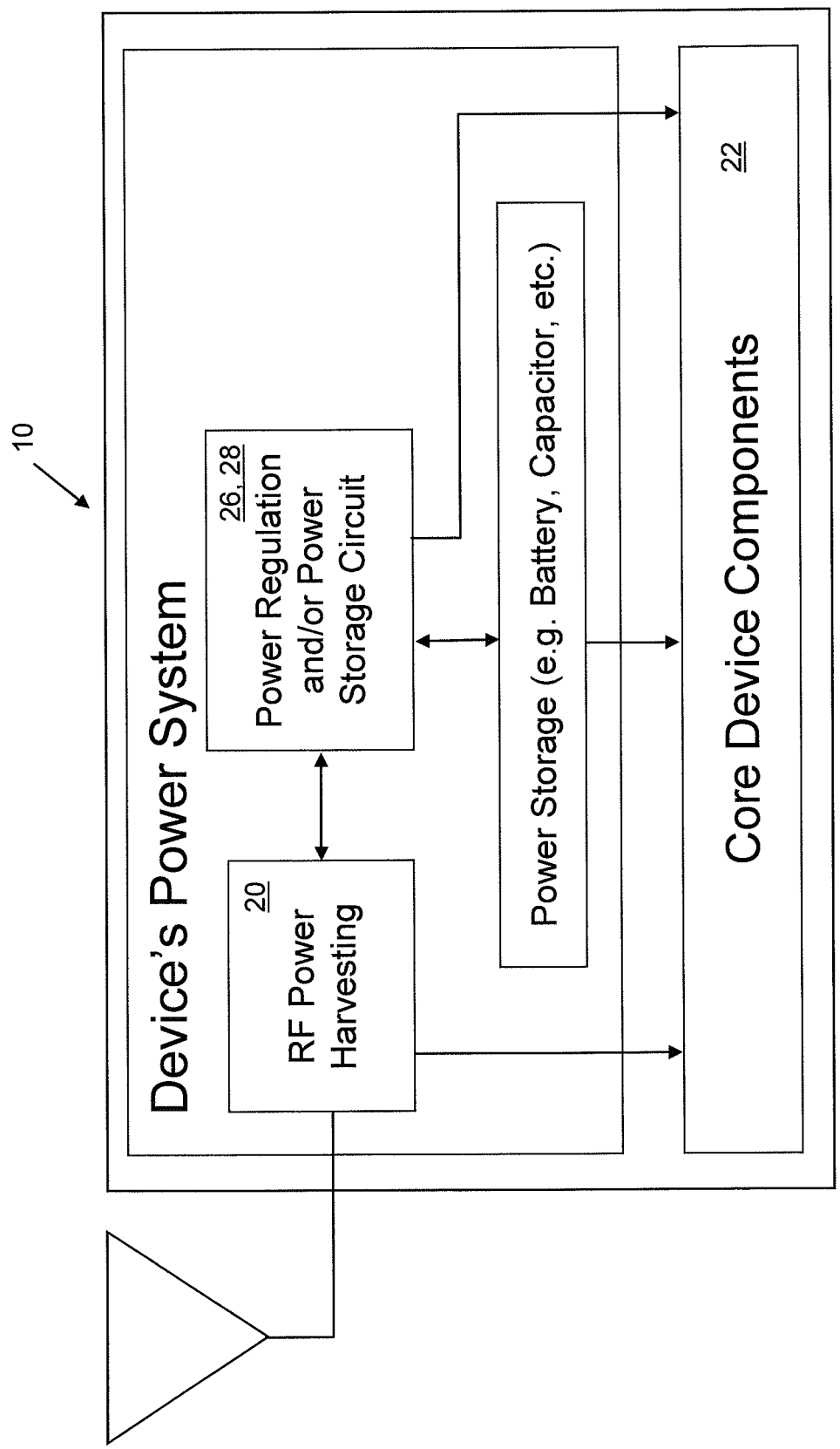
FIG. 16 is a block diagram of an RF Power Harvesting block in communication with a Power Regulation and/or Power Storage Circuit and used to supply power to Core Device Components.
Figure 17:
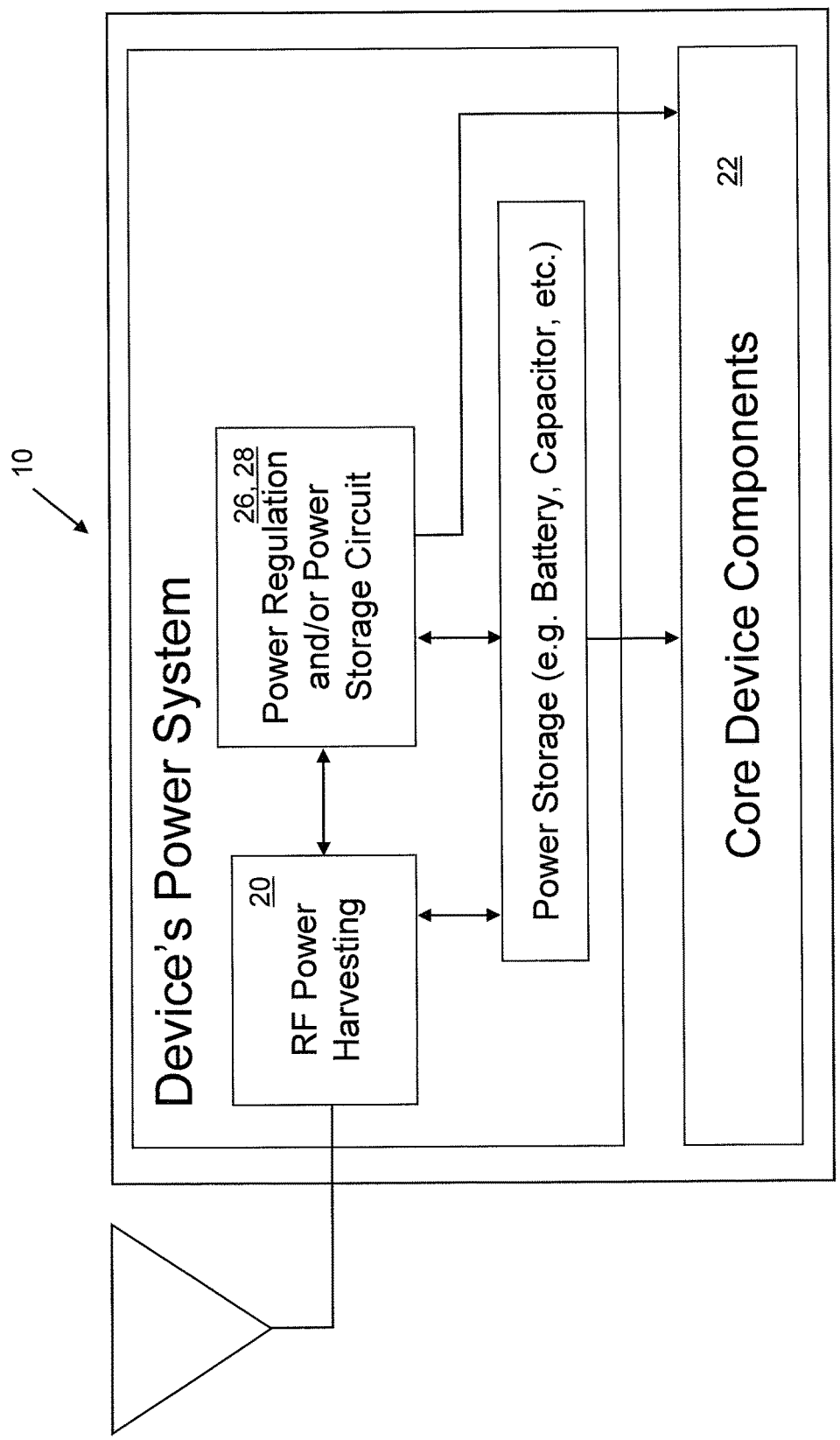
FIG. 17 is a block diagram of an RF Power Harvesting block in communication with a Power Regulation and/or Power Storage Circuit and Power Storage block.
Figure 18:
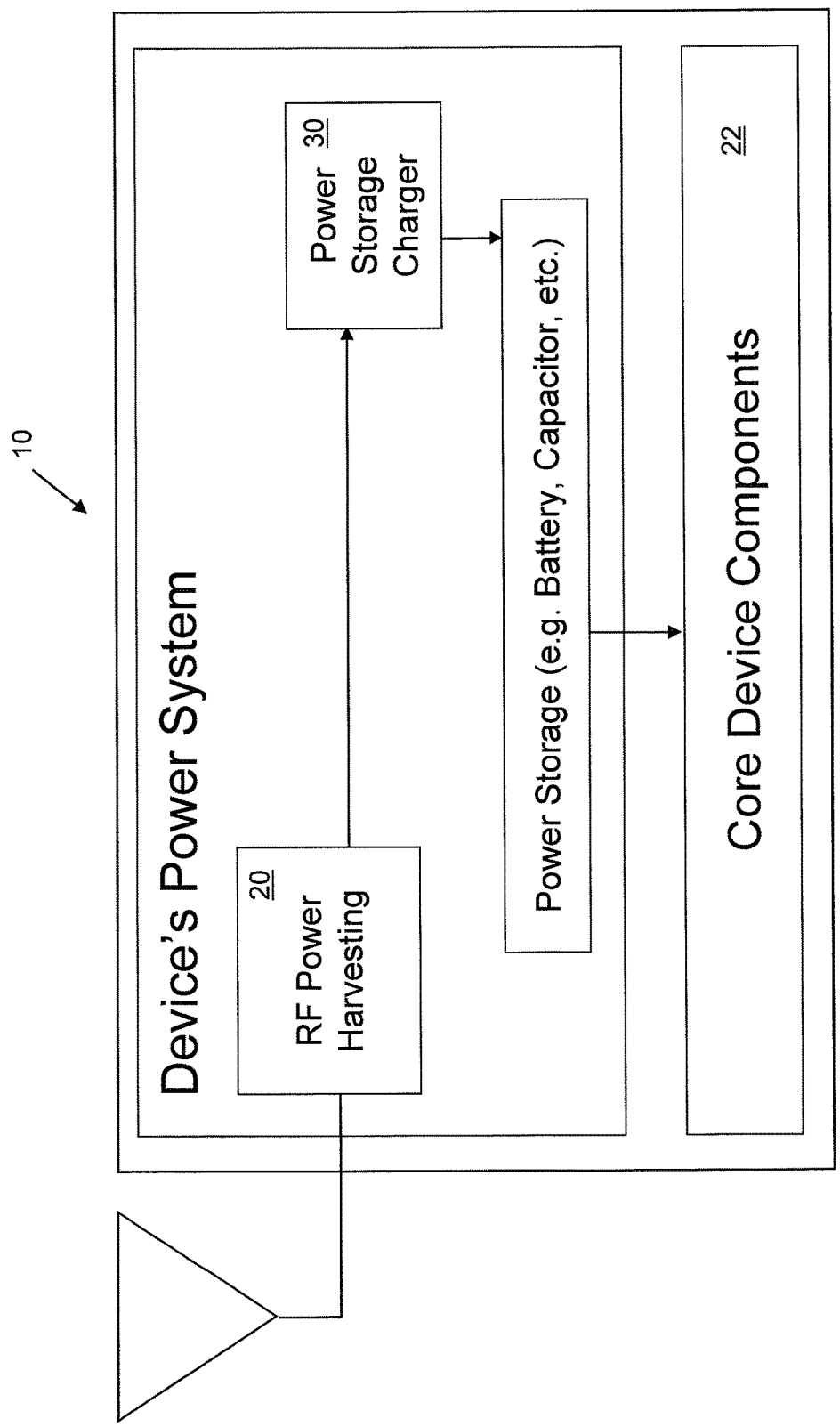
FIG. 18 is a block diagram of an RF Power Harvesting block supplying power to a Power Storage Charger.
Figure 19:
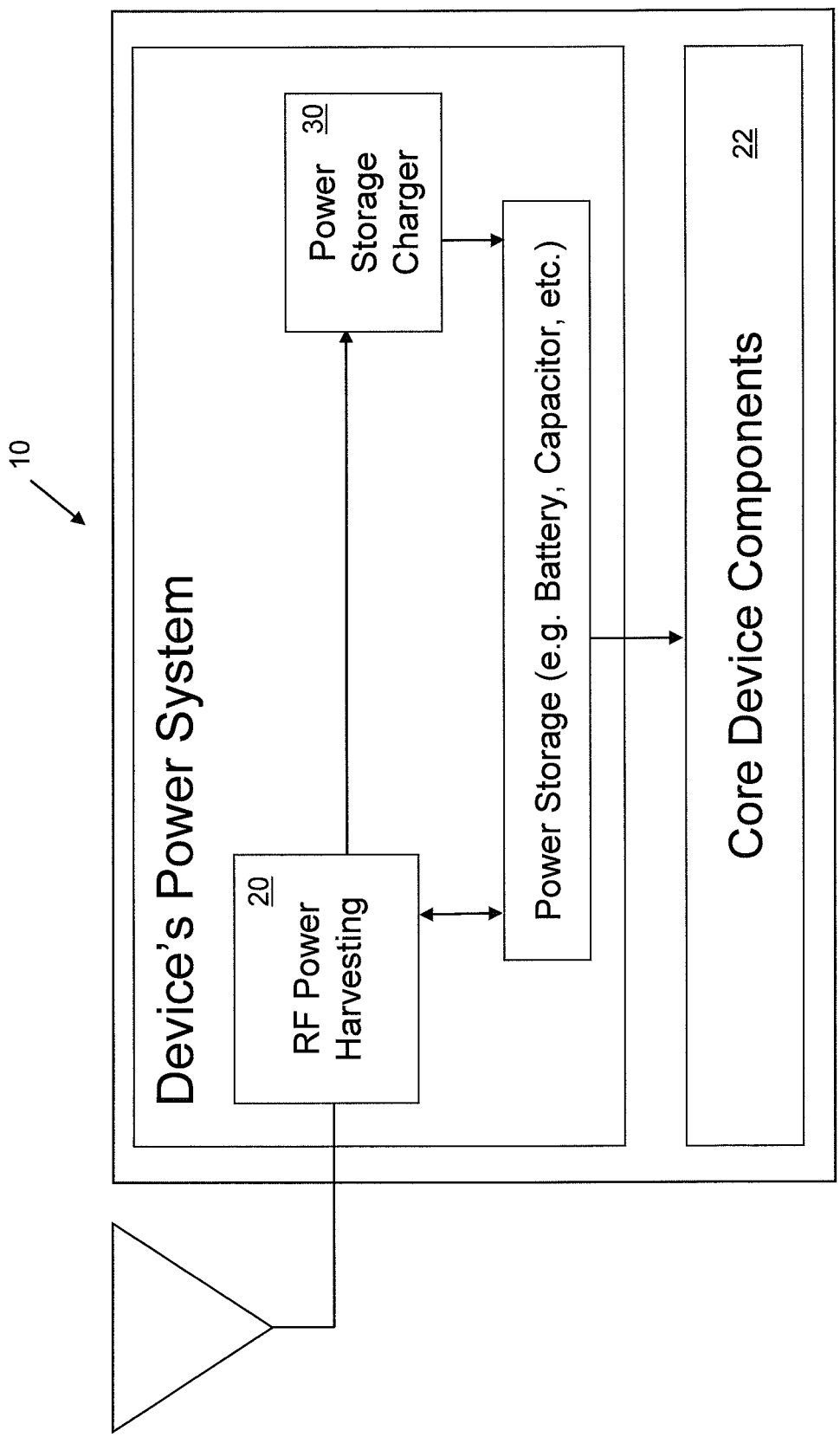
FIG. 19 is a block diagram of an RF Power Harvesting block supplying power to a Power Storage Charger and the RF Power Harvesting block in communication with a Power Storage block.
Figure 20:
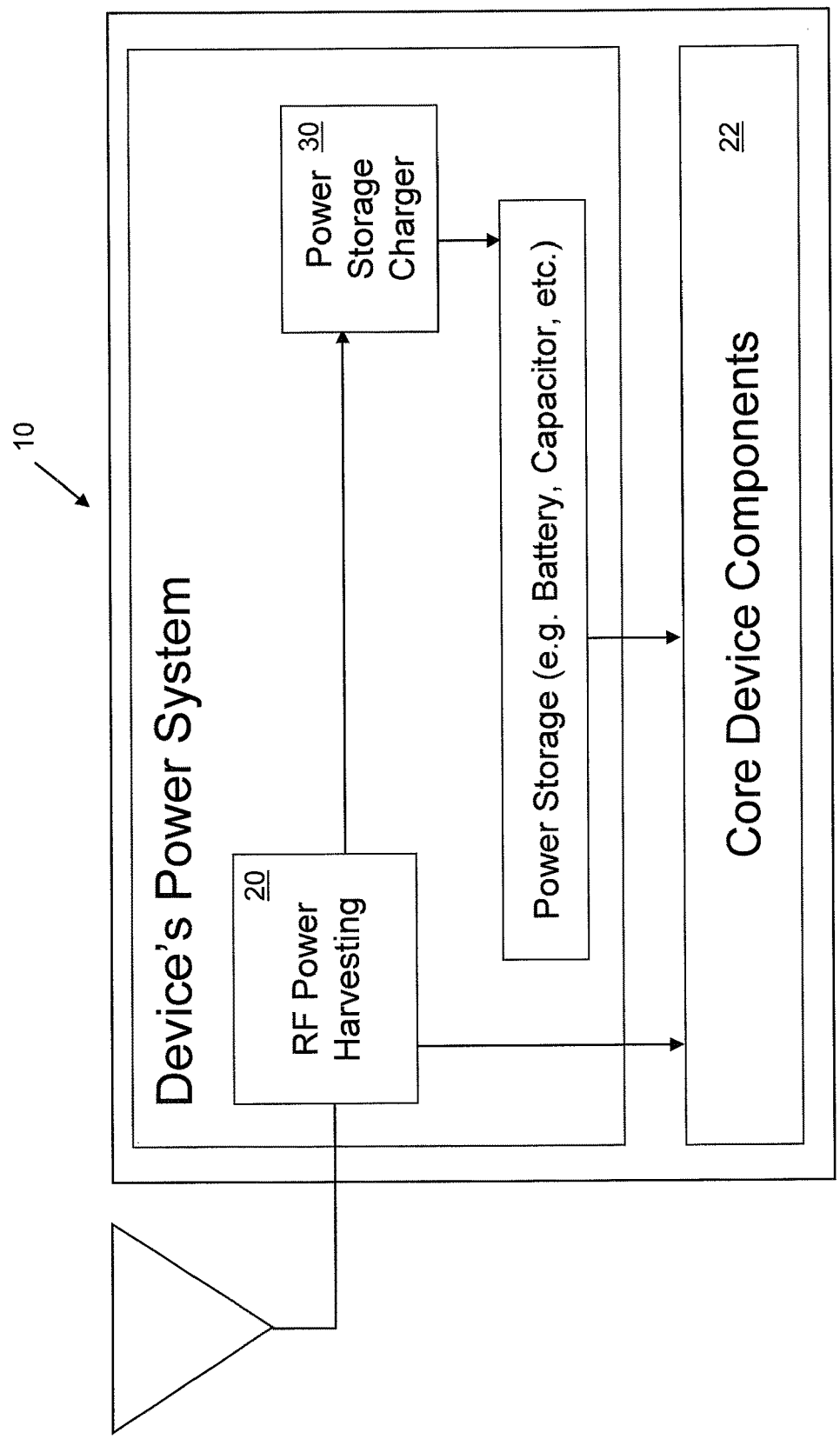
FIG. 20 is a block diagram of an RF Power Harvesting block supplying power to a Power Storage Charger and Core Device Components.
Figure 21:
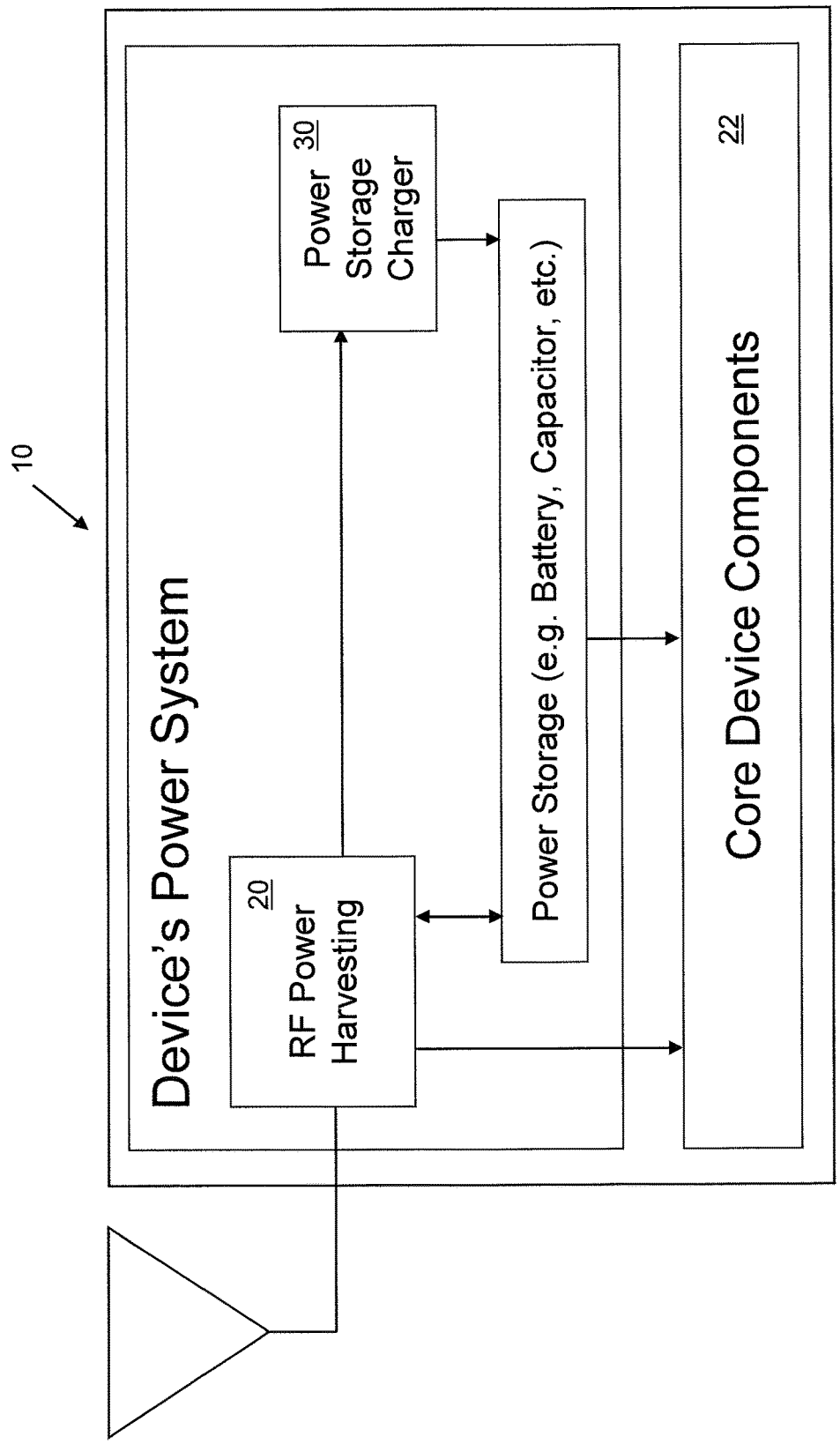
FIG. 21 is a block diagram of an RF Power Harvesting block supplying power to a Power Storage Charger and Core Device Components and the RF Power Harvesting block in communication with a Power Storage block.
Figure 22:
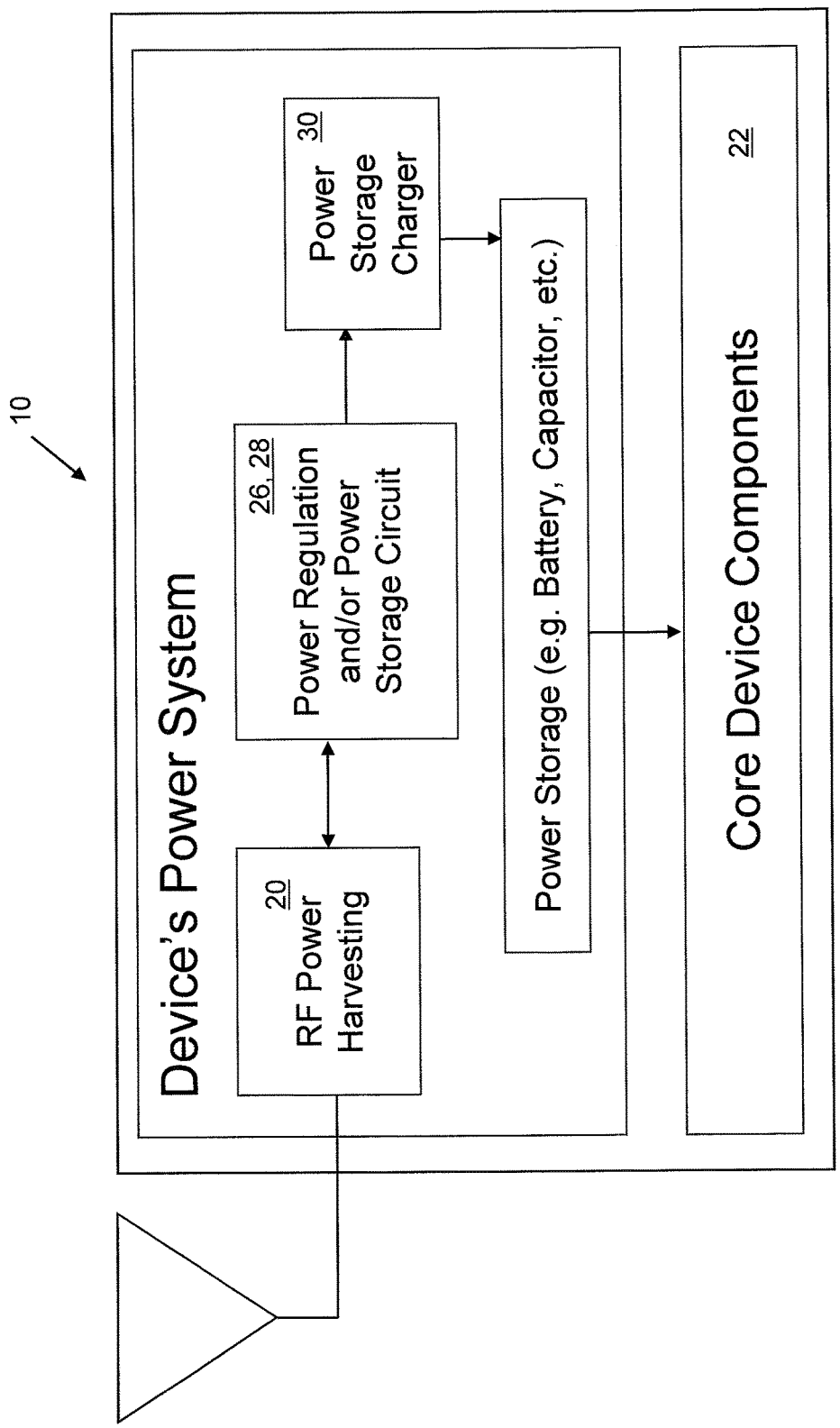
FIG. 22 is a block diagram of an RF Power Harvesting block in communication with a Power Regulation and/or Power Storage Circuit.
Figure 23:
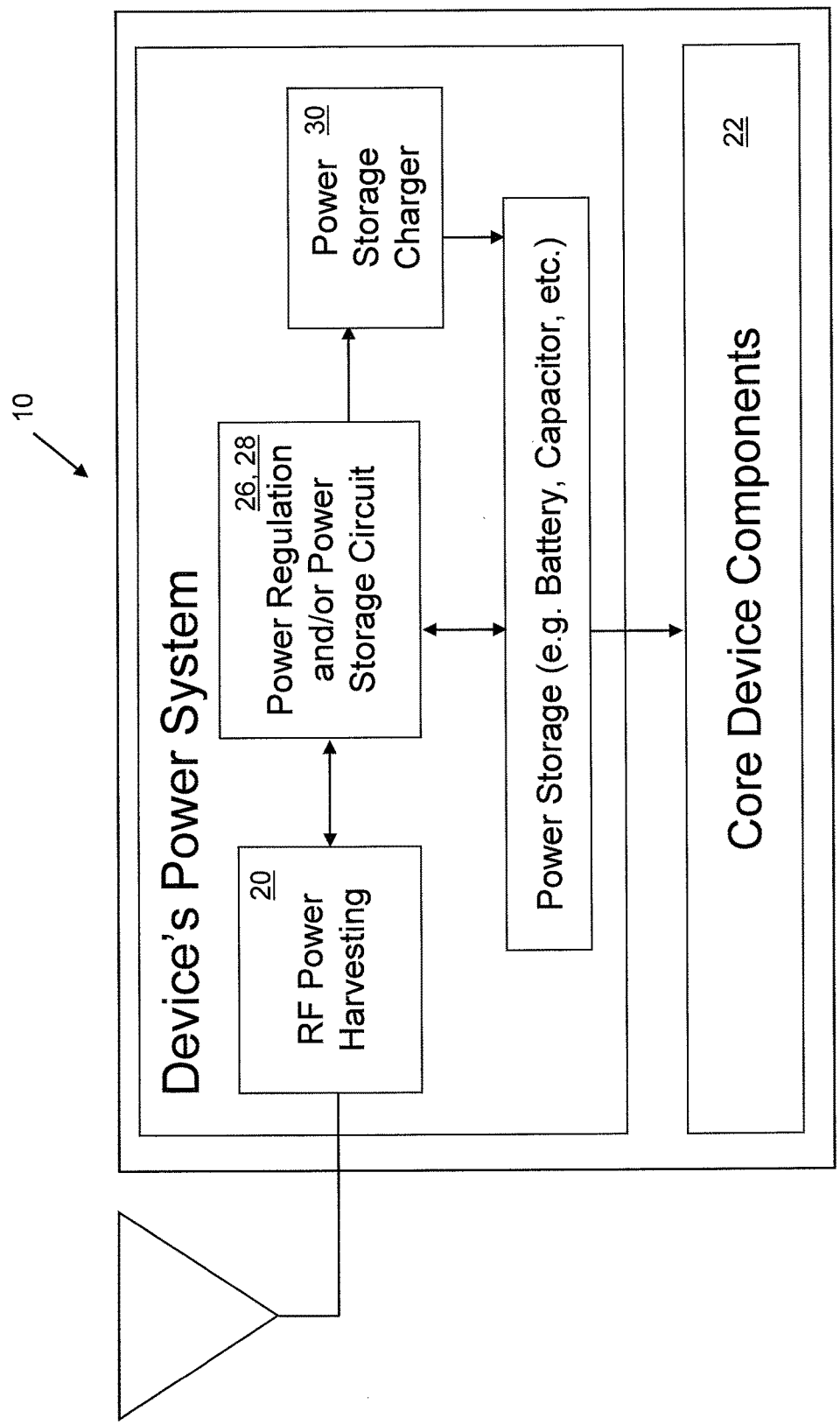
FIG. 23 is a block diagram of an RF Power Harvesting block in communication with a Power Regulation and/or Power Storage Circuit.
Figure 24:
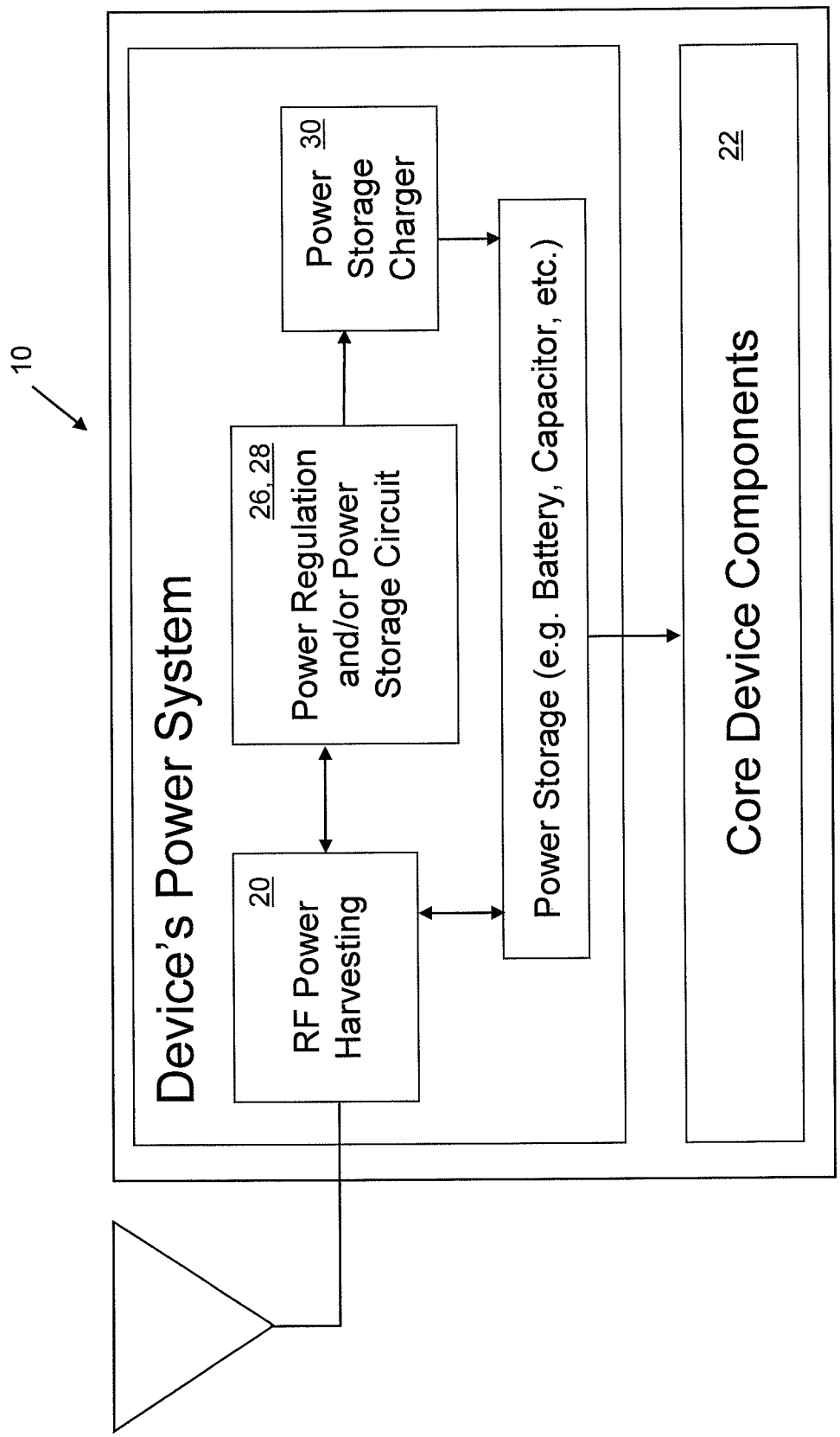
FIG. 24 is a block diagram of an RF Power Harvesting block in communication with a Power Regulation and/or Power Storage Circuit and a Power Storage block.
Figure 25:
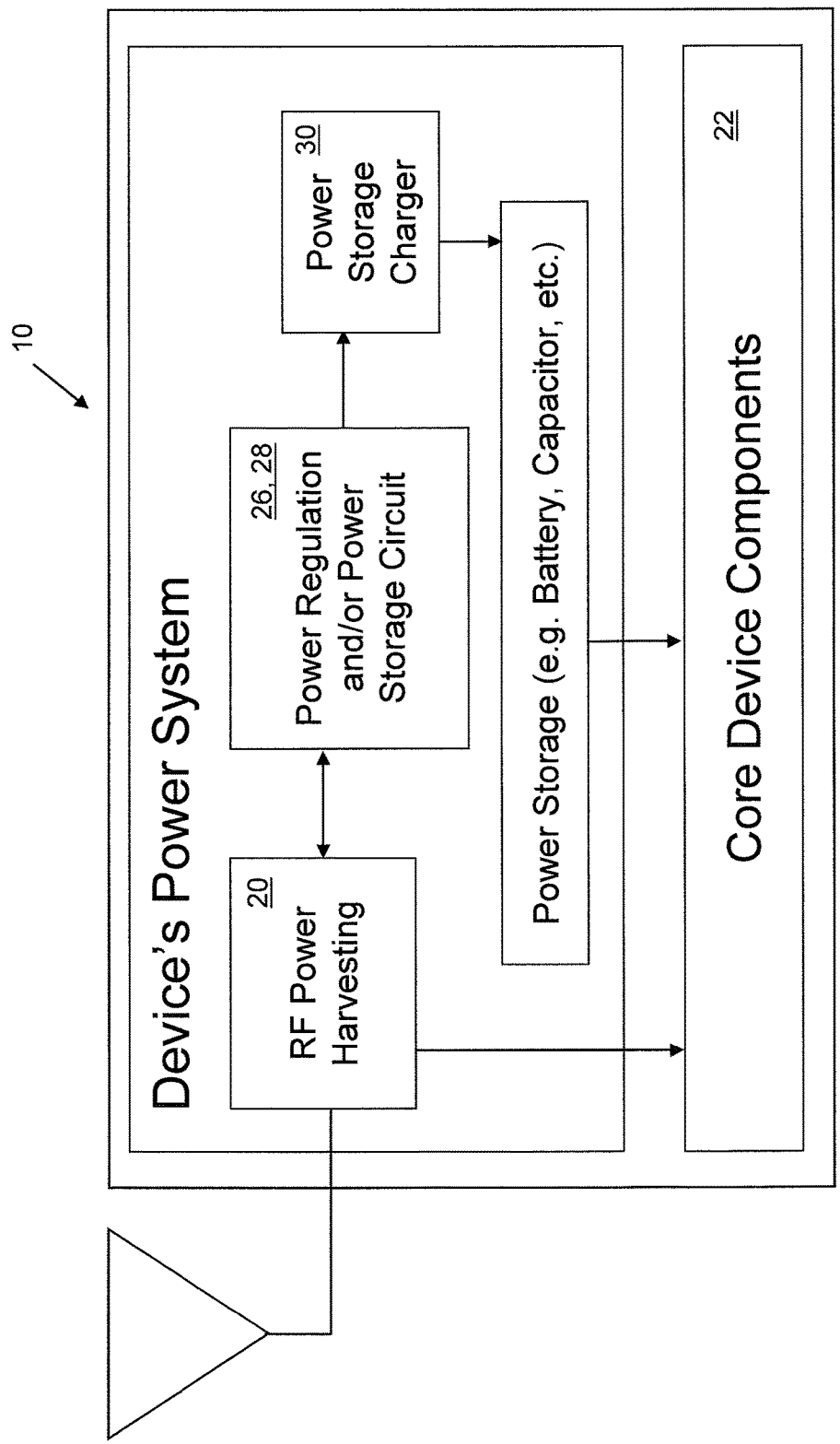
FIG. 25 is a block diagram of an RF Power Harvesting block in communication with a Power Regulation and/or Power Storage Circuit and used to supply power to Core Device Components.
Figure 26:
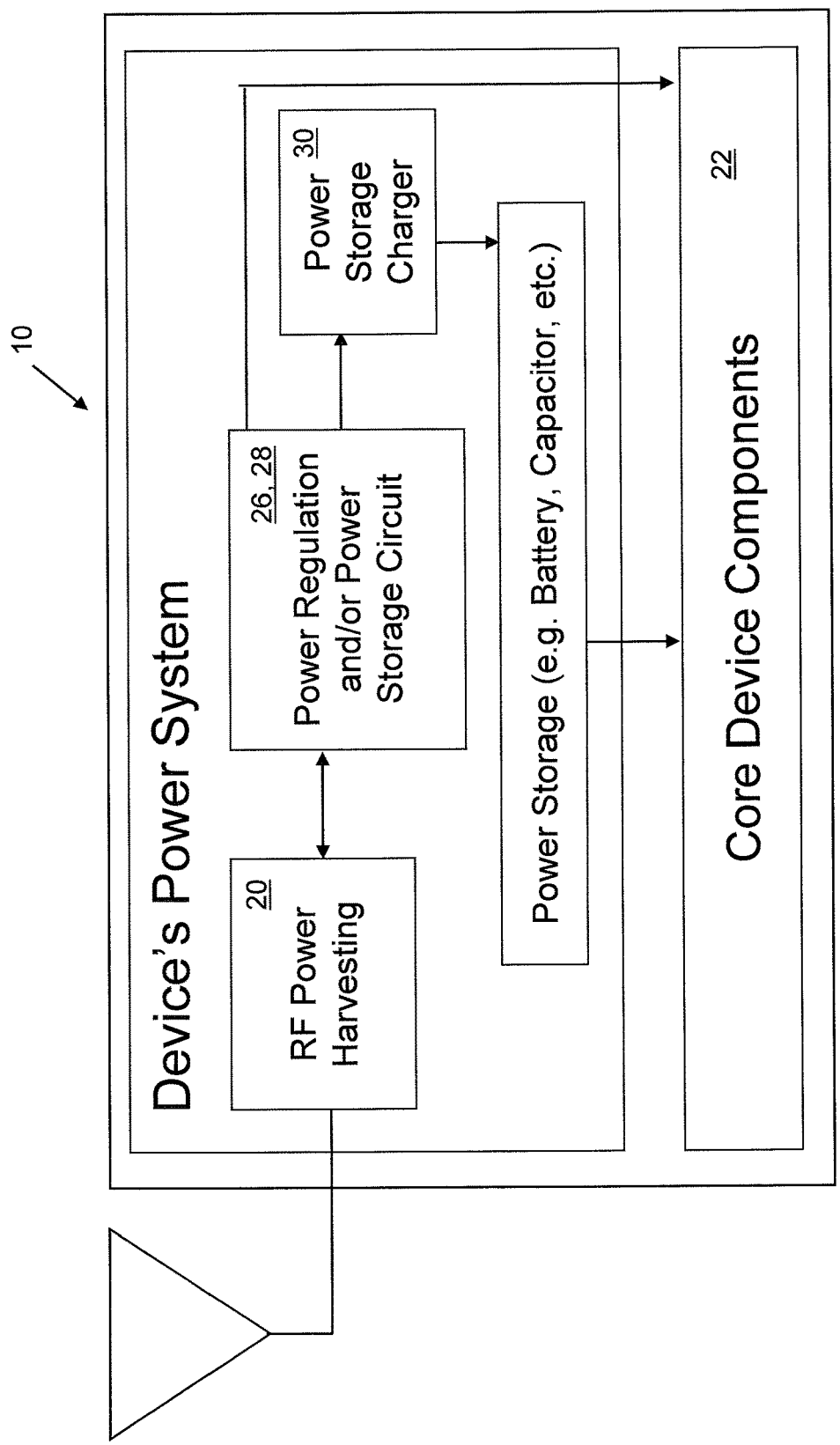
FIG. 26 is a block diagram of an RF Power Harvesting block in communication with a Power Regulation and/or Power Storage Circuit.
Figure 27:
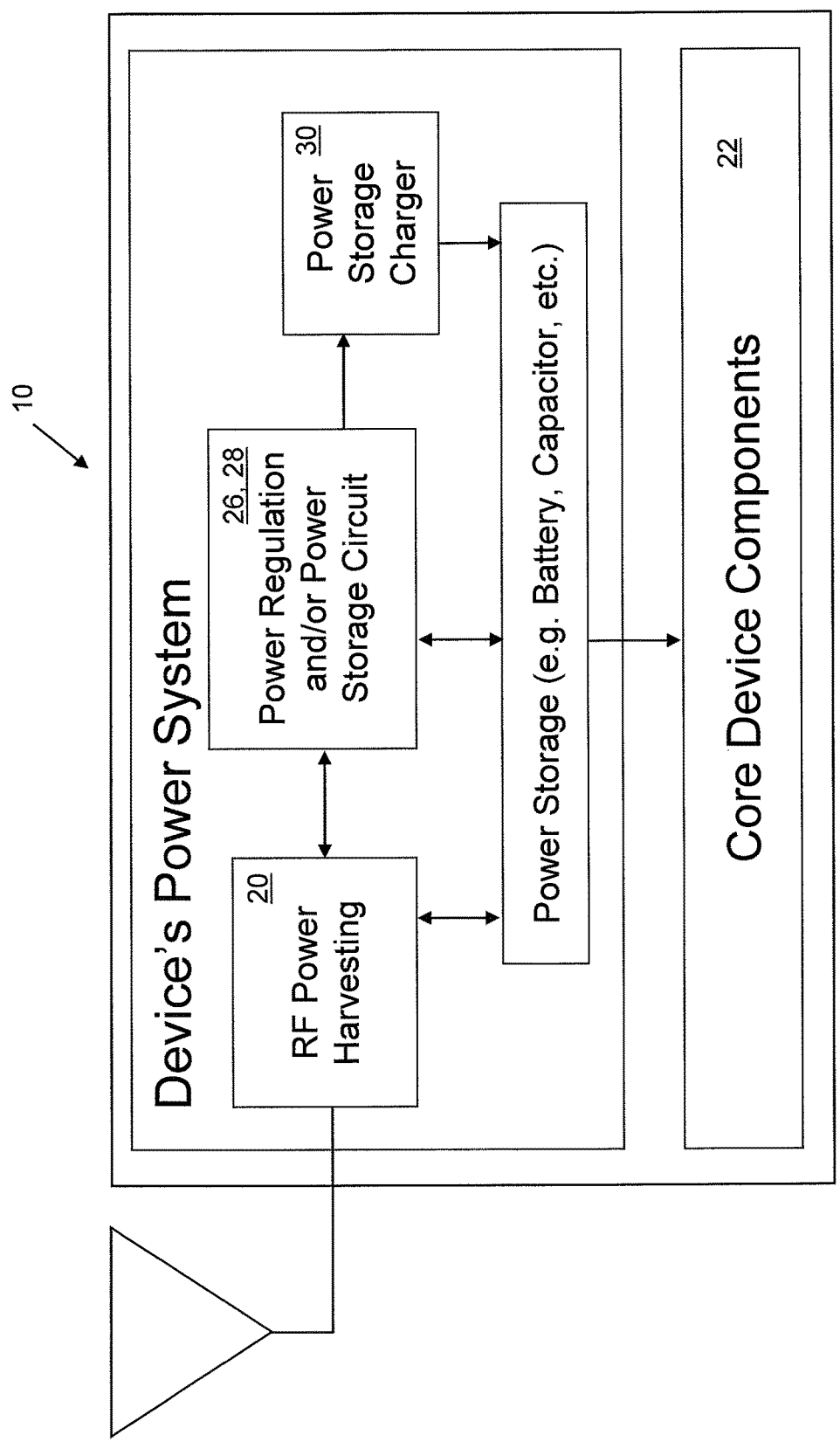
FIG. 27 is a block diagram of an RF Power Harvesting block in communication with a Power Regulation and/or Power Storage Circuit and a Power Storage block.
Figure 28:
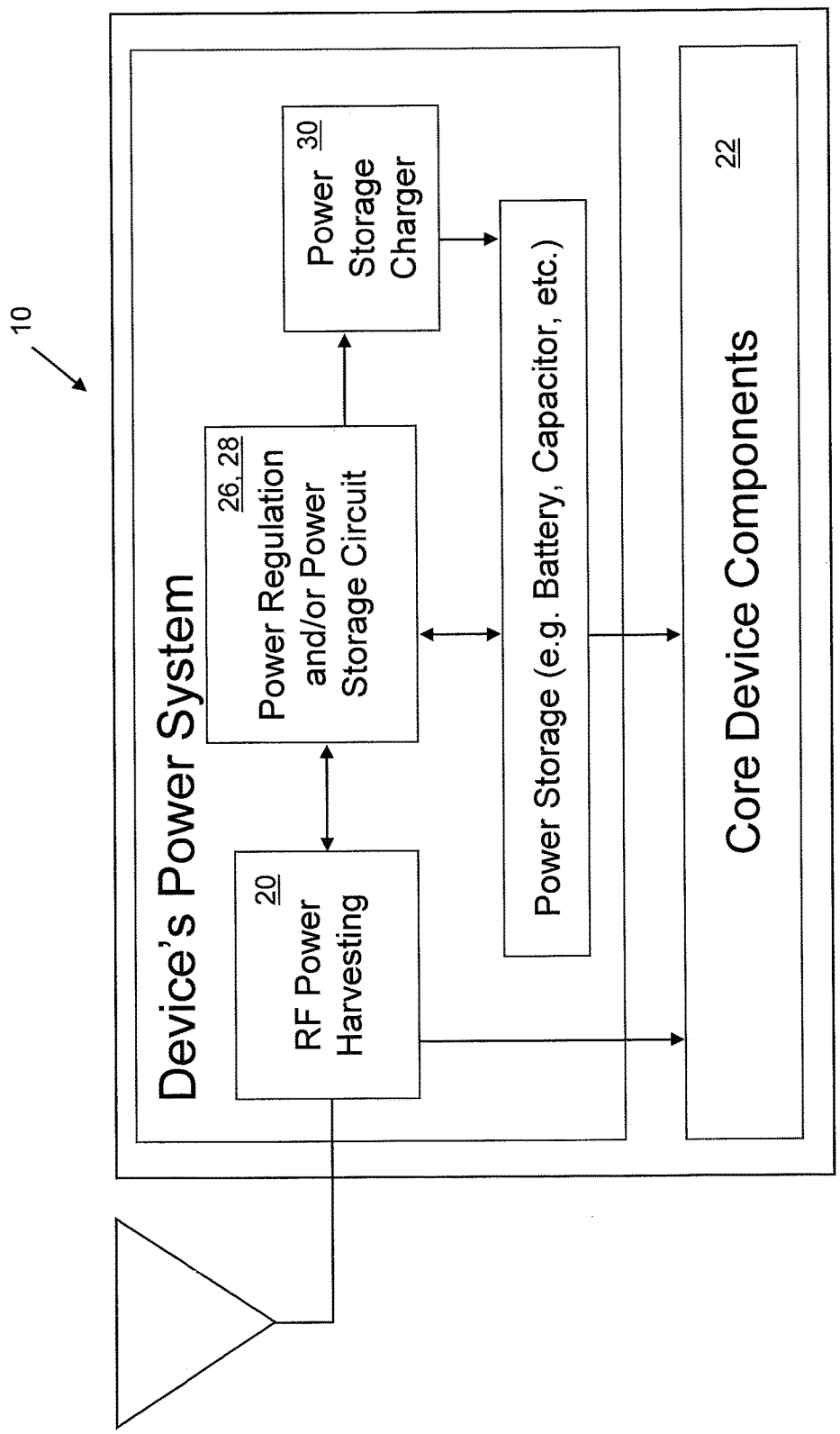
FIG. 28 is a block diagram of an RF Power Harvesting block in communication with a Power Regulation and/or Power Storage Circuit and the RF Power Harvesting block supplying power to Core Device Components.
Figure 29:
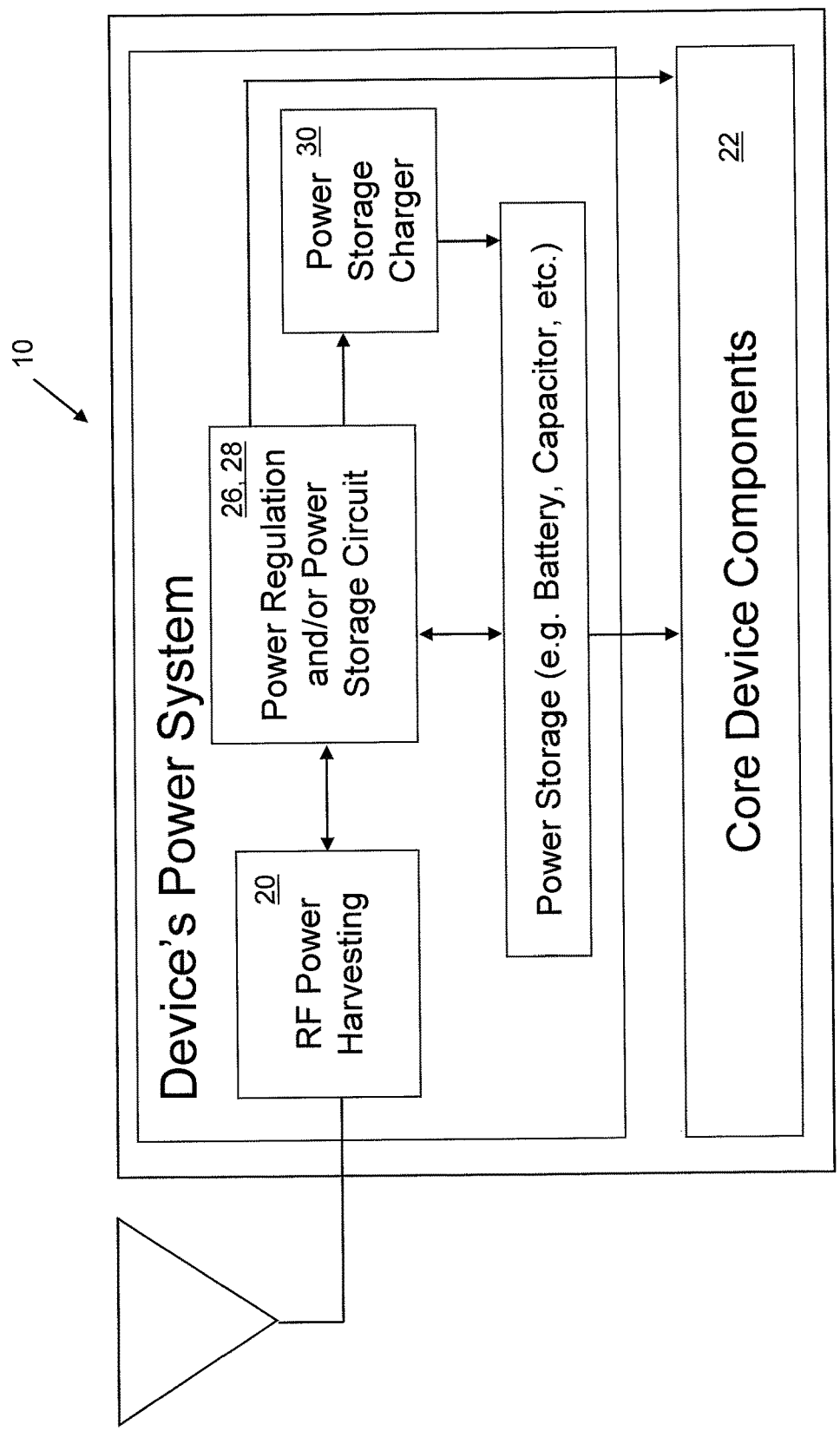
FIG. 29 is a block diagram of an RF Power Harvesting block in communication with a Power Regulation and/or Power Storage Circuit.
Figure 30:
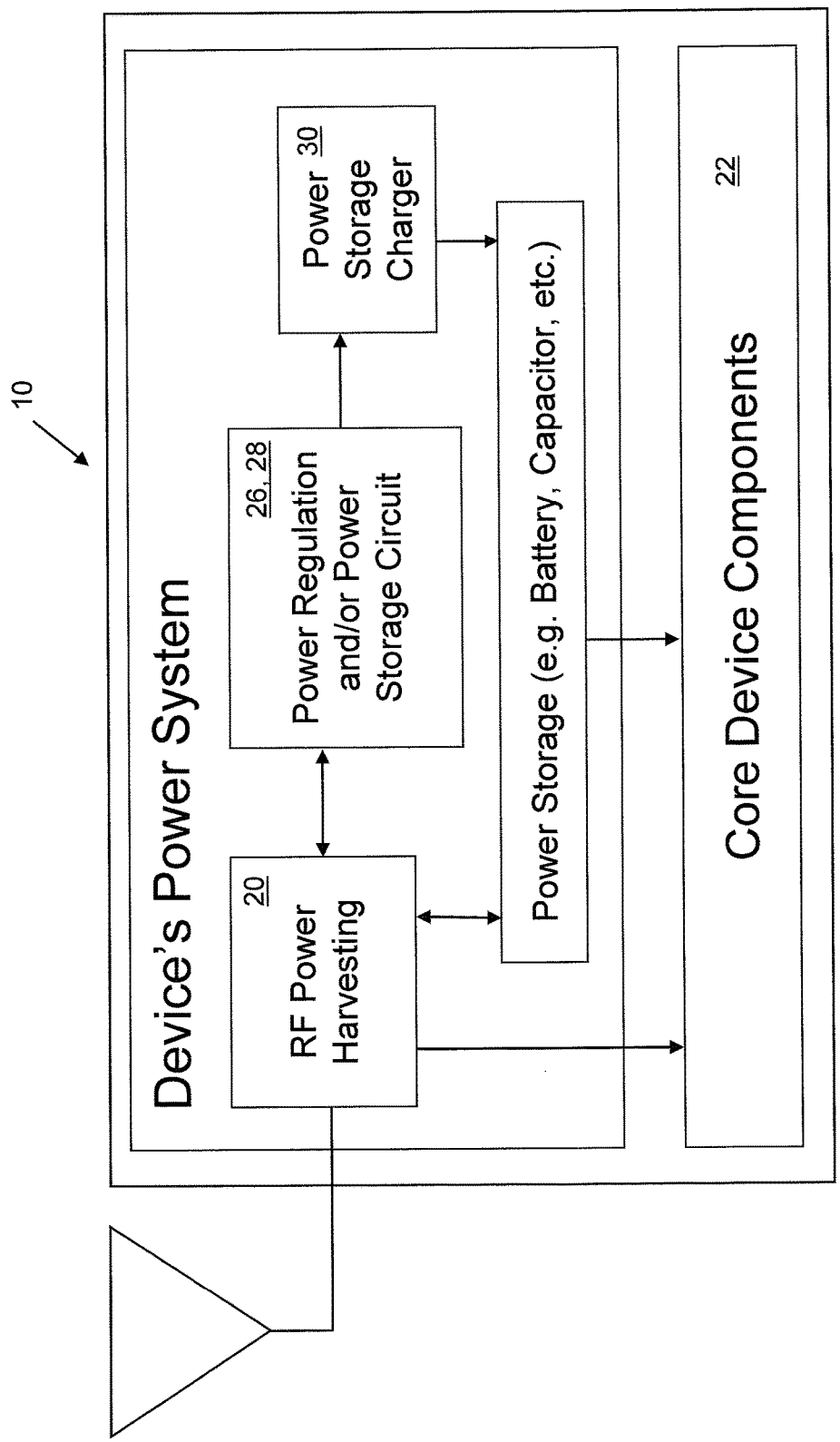
FIG. 30 is a block diagram of an RF Power Harvesting block in communication with a Power Regulation and/or Power Storage Circuit and Power Storage block and used to supply power to Core Device Components.
Figure 31:
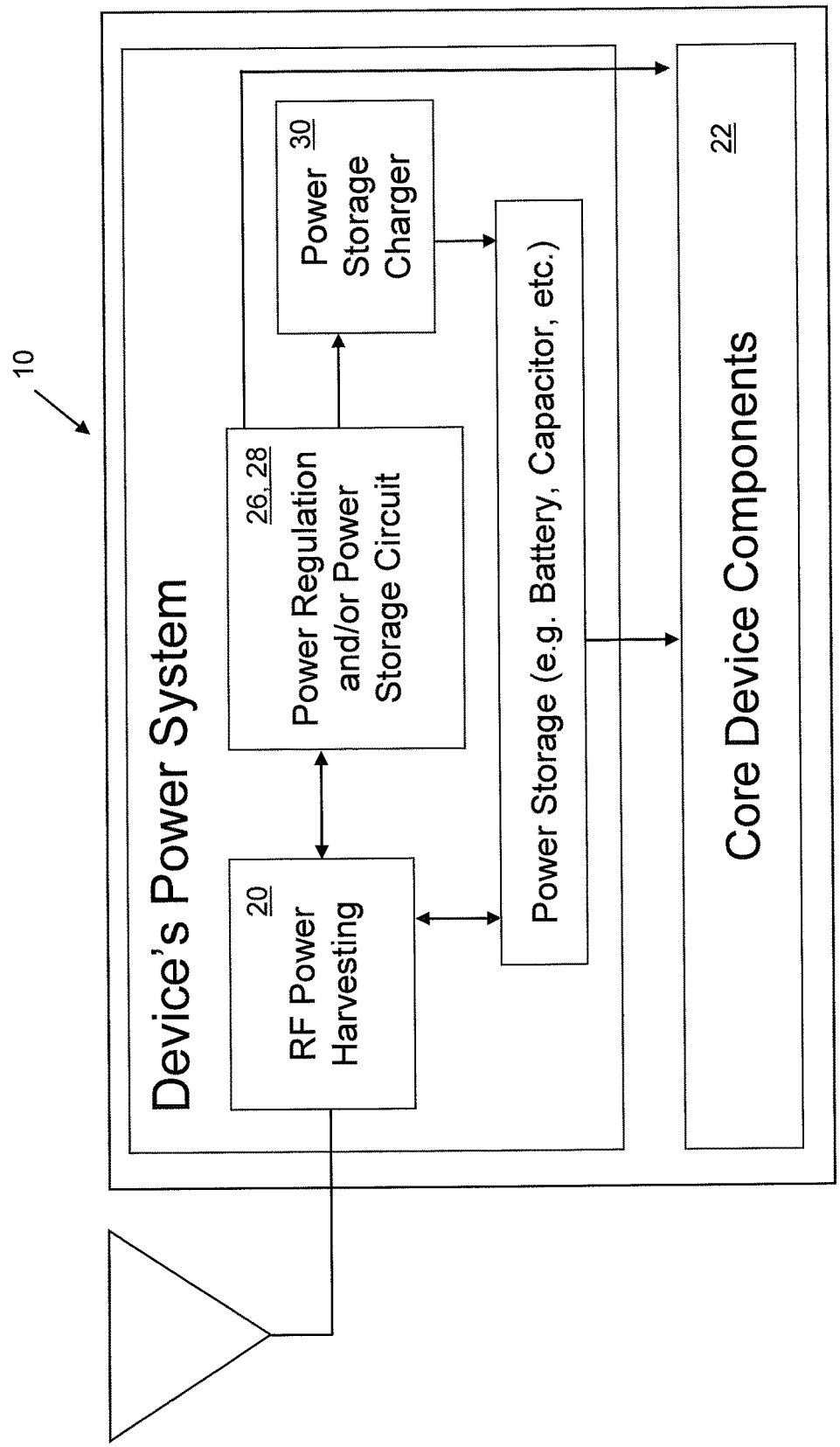
FIG. 31 is a block diagram of an RF Power Harvesting block in communication with a Power Regulation and/or Power Storage Circuit and a Power Storage block.
Figure 32:
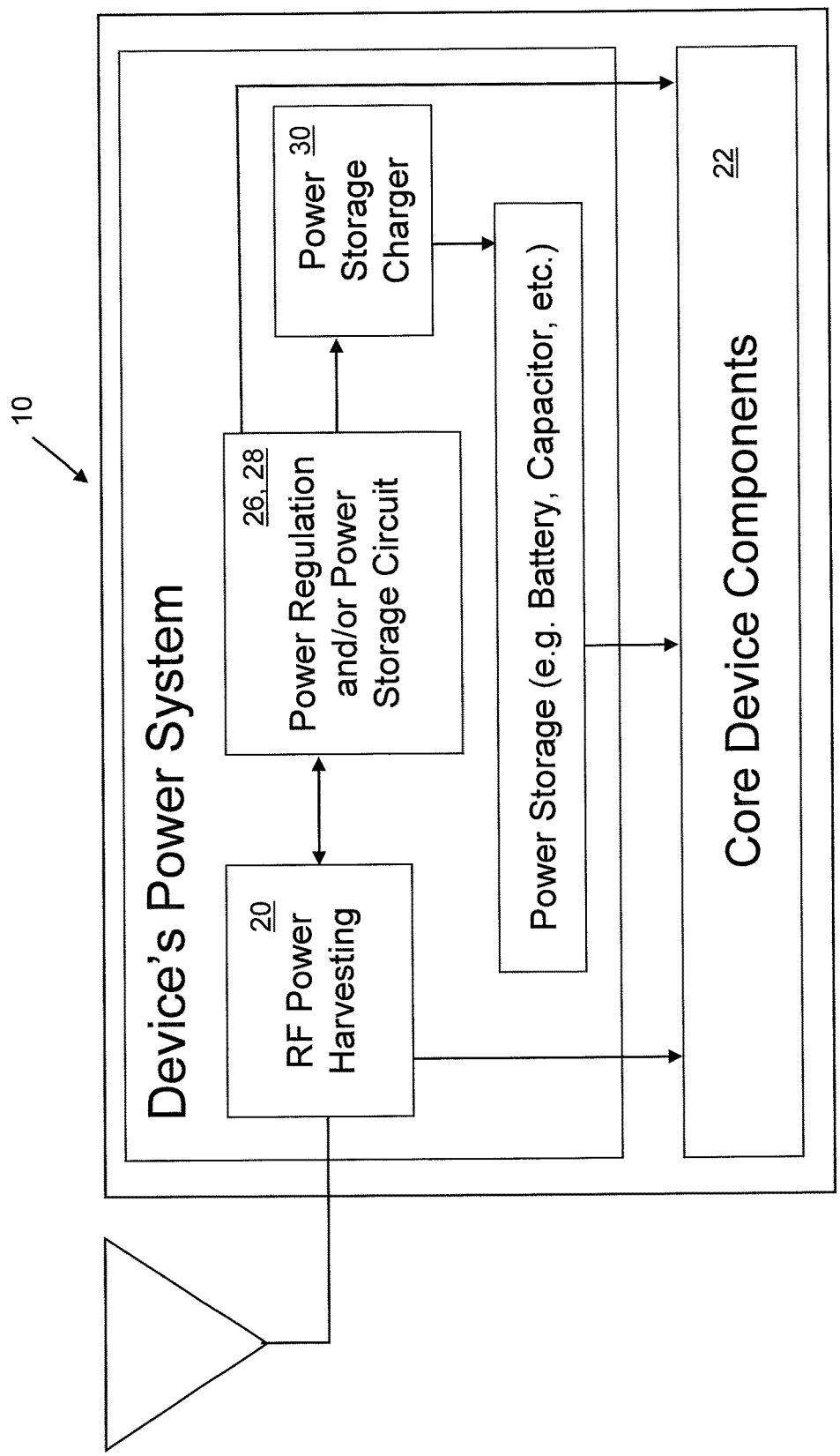
FIG. 32 is a block diagram of an RF Power Harvesting block in communication with a Power Regulation and/or Power Storage Circuit and used to supply power Core Device Components.
Figure 33:
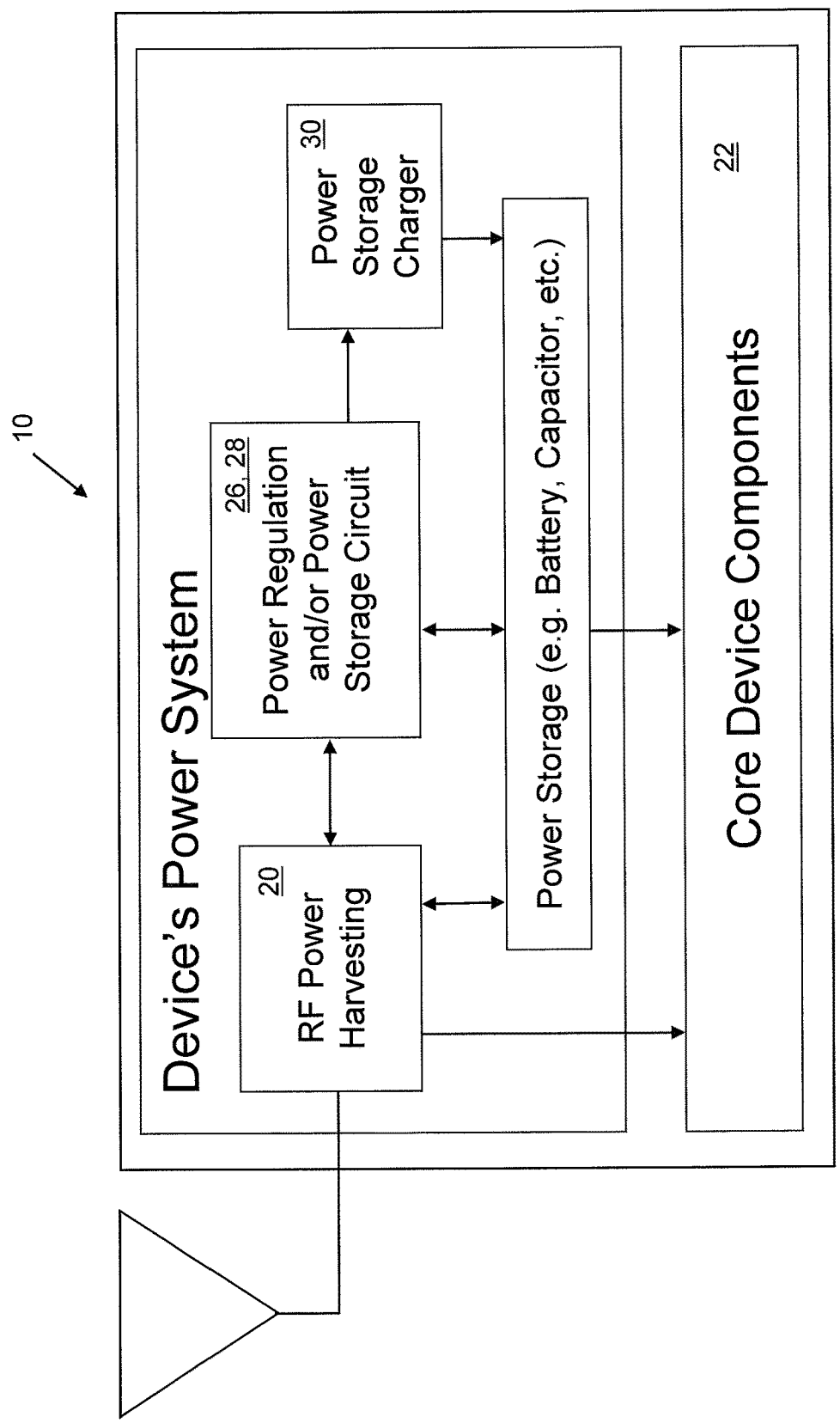
FIG. 33 is a block diagram of an RF Power Harvesting block in communication with a Power Regulation and/or Power Storage Circuit and a Power Storage block and used to supply power to Core Device Components.
Figure 34:
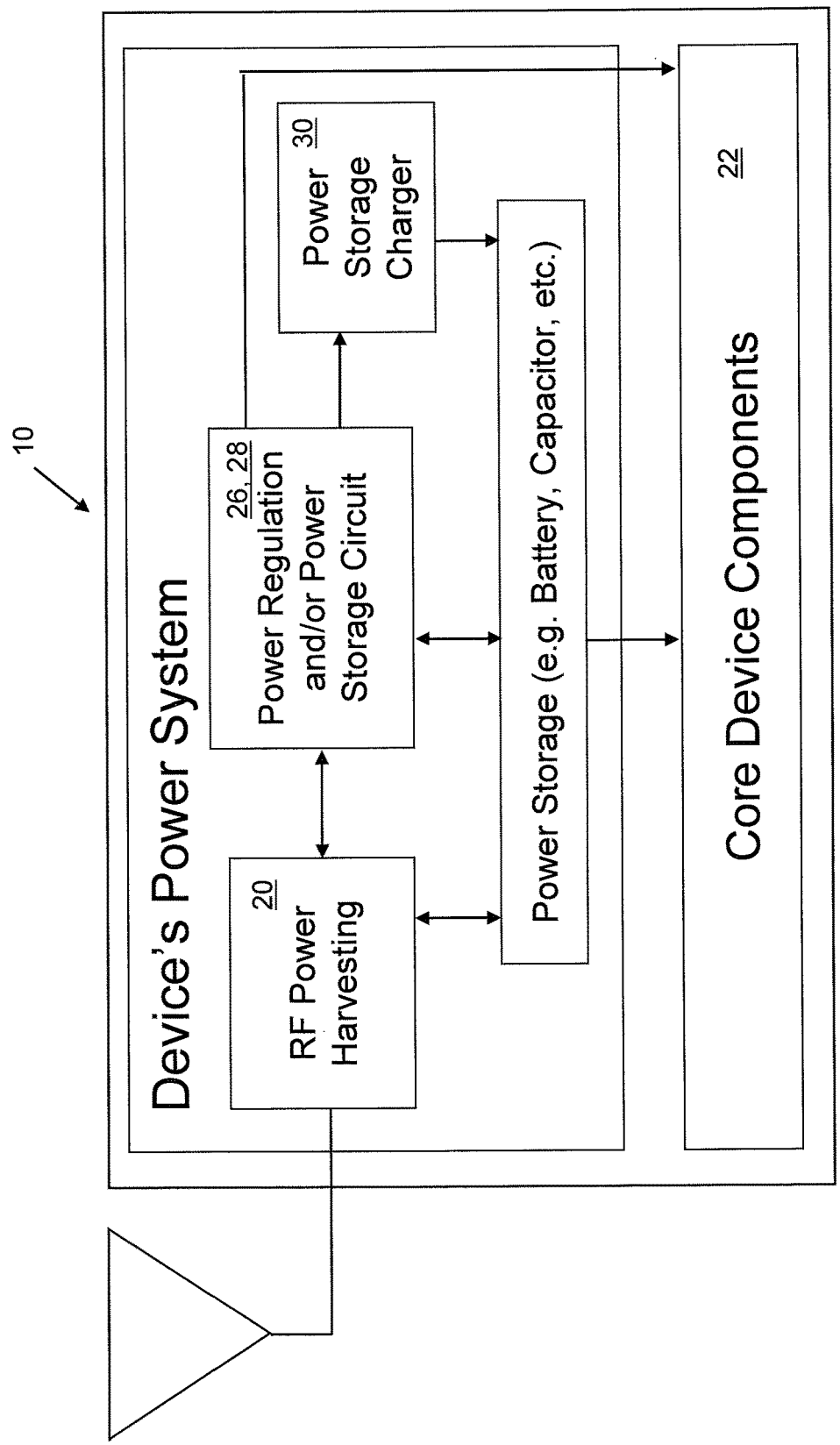
FIG. 34 is a block diagram of an RF Power Harvesting block in communication with a Power Regulation and/or Power Storage Circuit and a Power Storage block.
Figure 35:
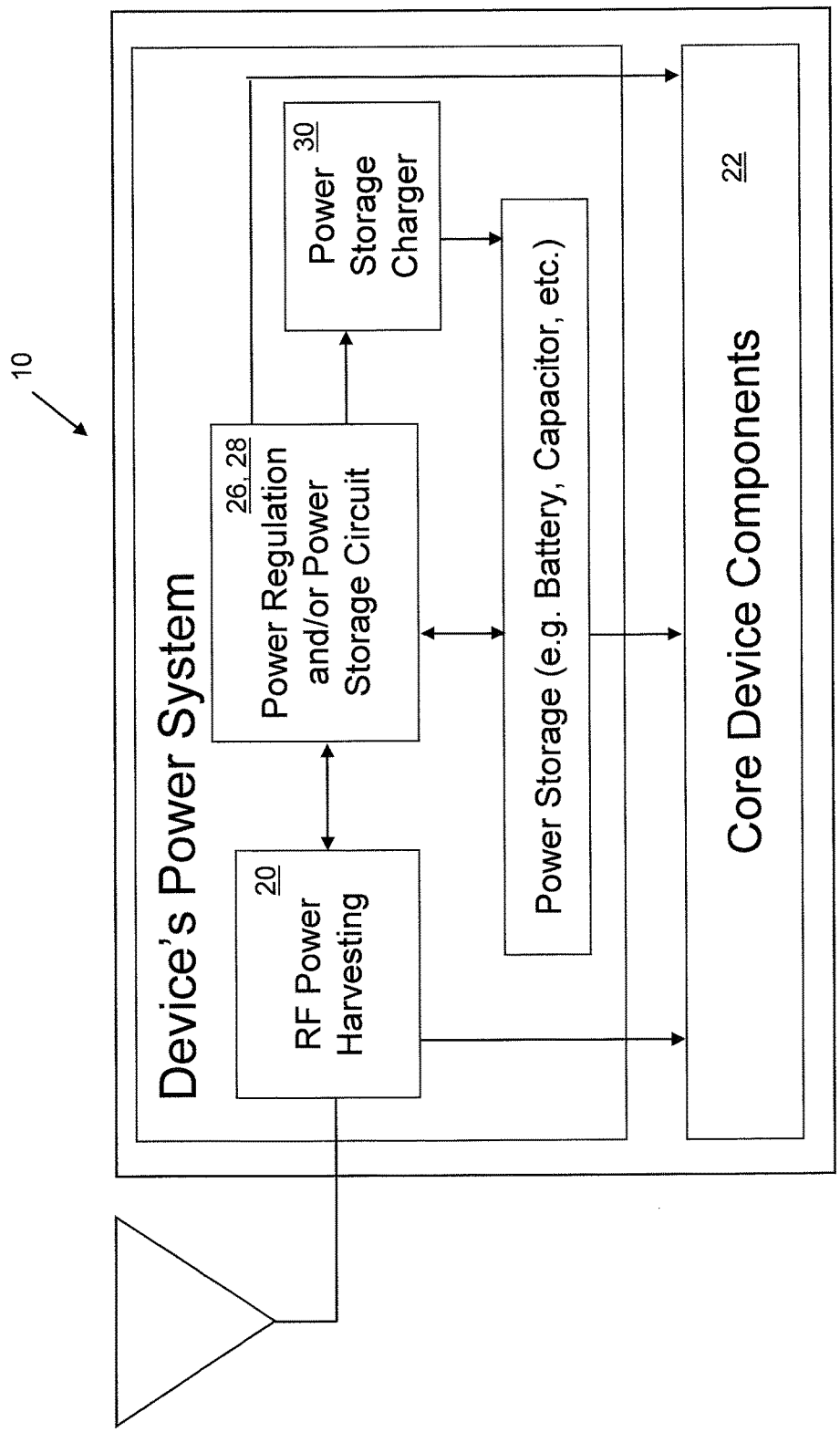
FIG. 35 is a block diagram of an RF Power Harvesting block in communication with a Power Regulation and/or Power Storage Circuit and used to supply power to Core Device Components.
Figure 36:
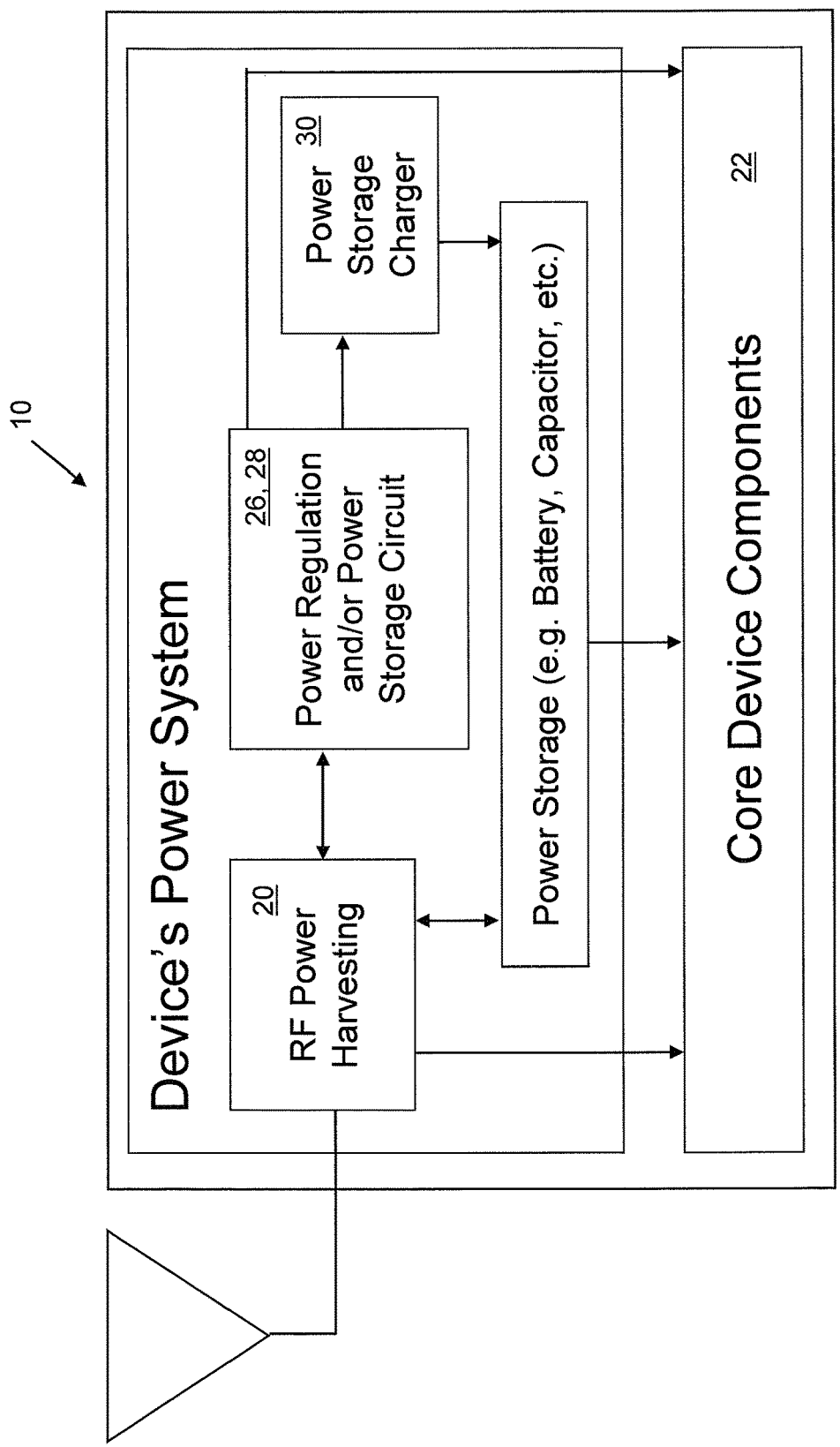
FIG. 36 is a block diagram of an RF Power Harvesting block in communication with a Power Regulation and/or Power Storage Circuit and a Power Storage block and used to supply power to Core Device Components.
Figure 37:
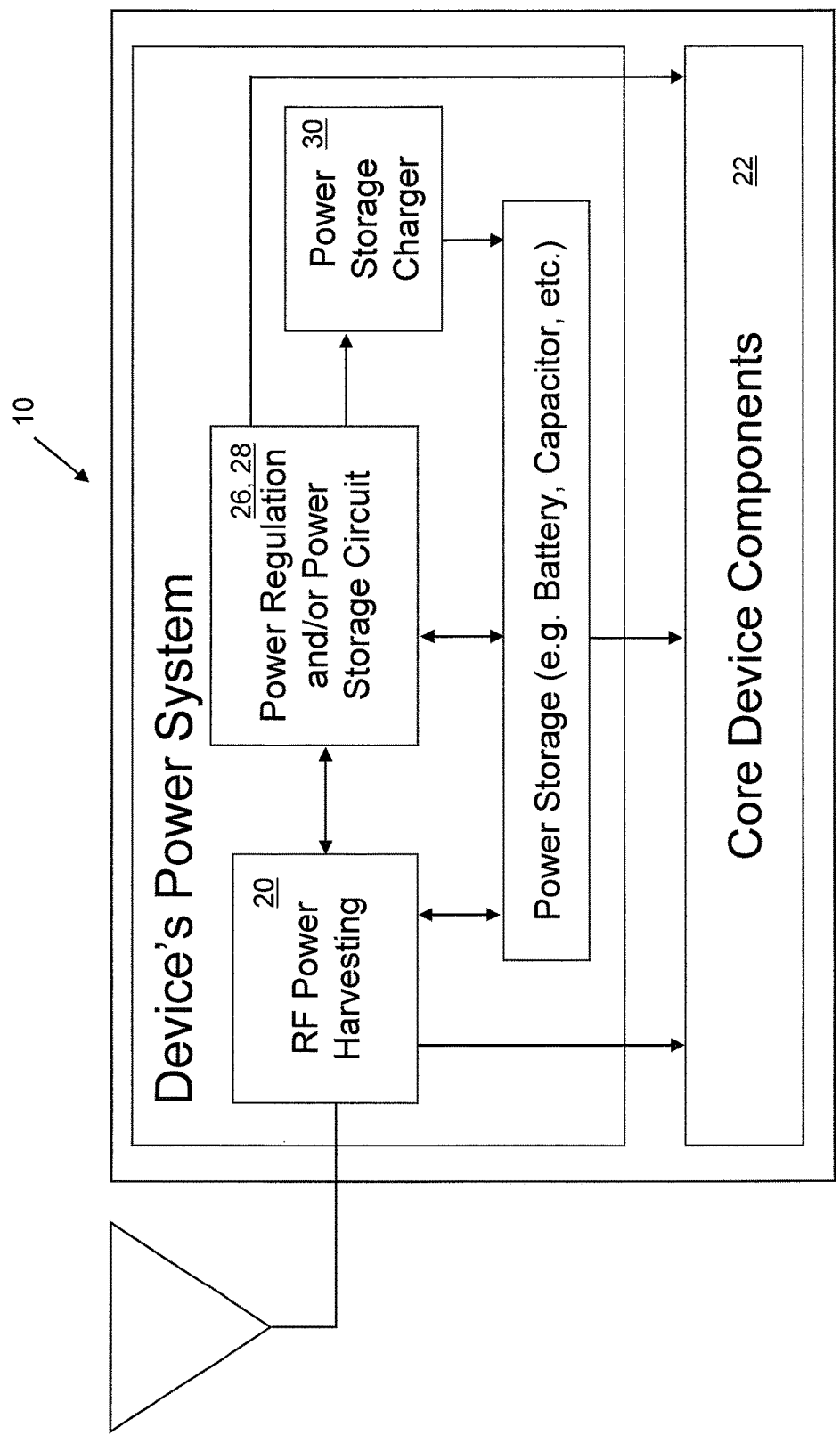
FIG. 37 is a block diagram of an RF Power Harvesting block in communication with a Power Regulation and/or Power Storage Circuit and a Power Storage block and used to supply power to Core Device Components.
Figure 38:
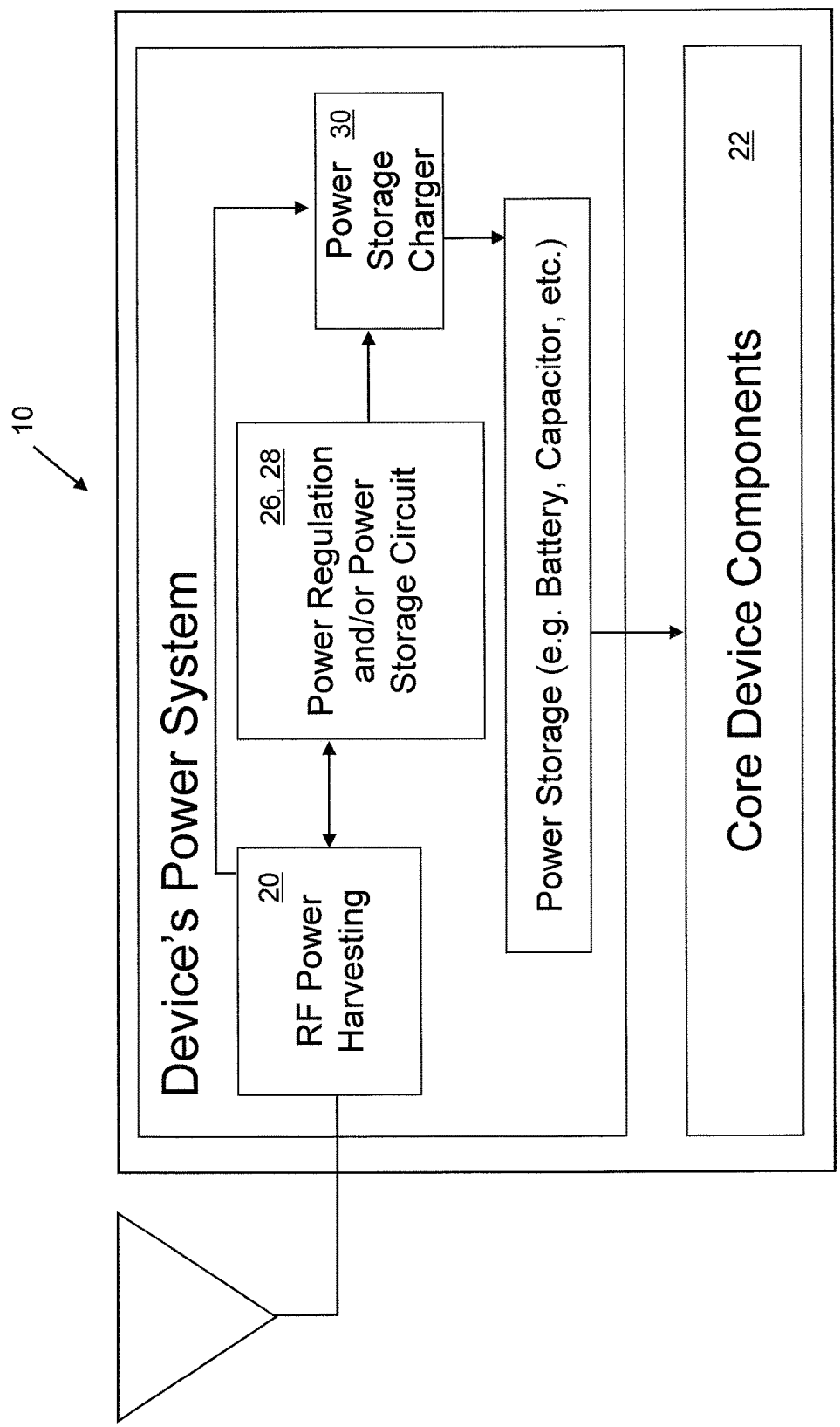
FIG. 38 is a block diagram of an RF Power Harvesting block in communication with a Power Regulation and/or Power Storage Circuit and used to supply power to a Power Storage Charger.
Figure 39:
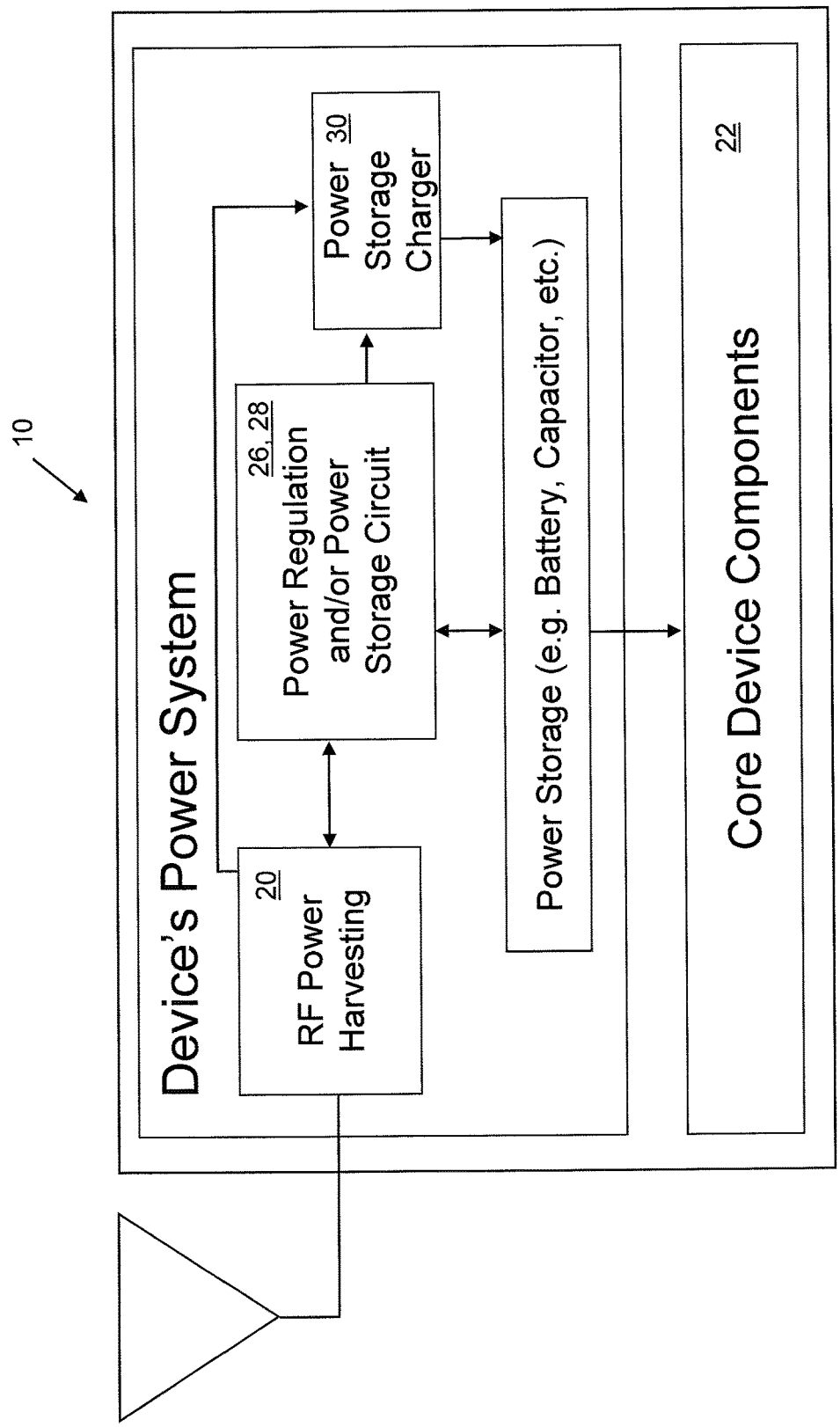
FIG. 39 is a block diagram of an RF Power Harvesting block in communication with a Power Regulation and/or Power Storage Circuit and used to supply power to a Power Storage Charger.
Figure 40:
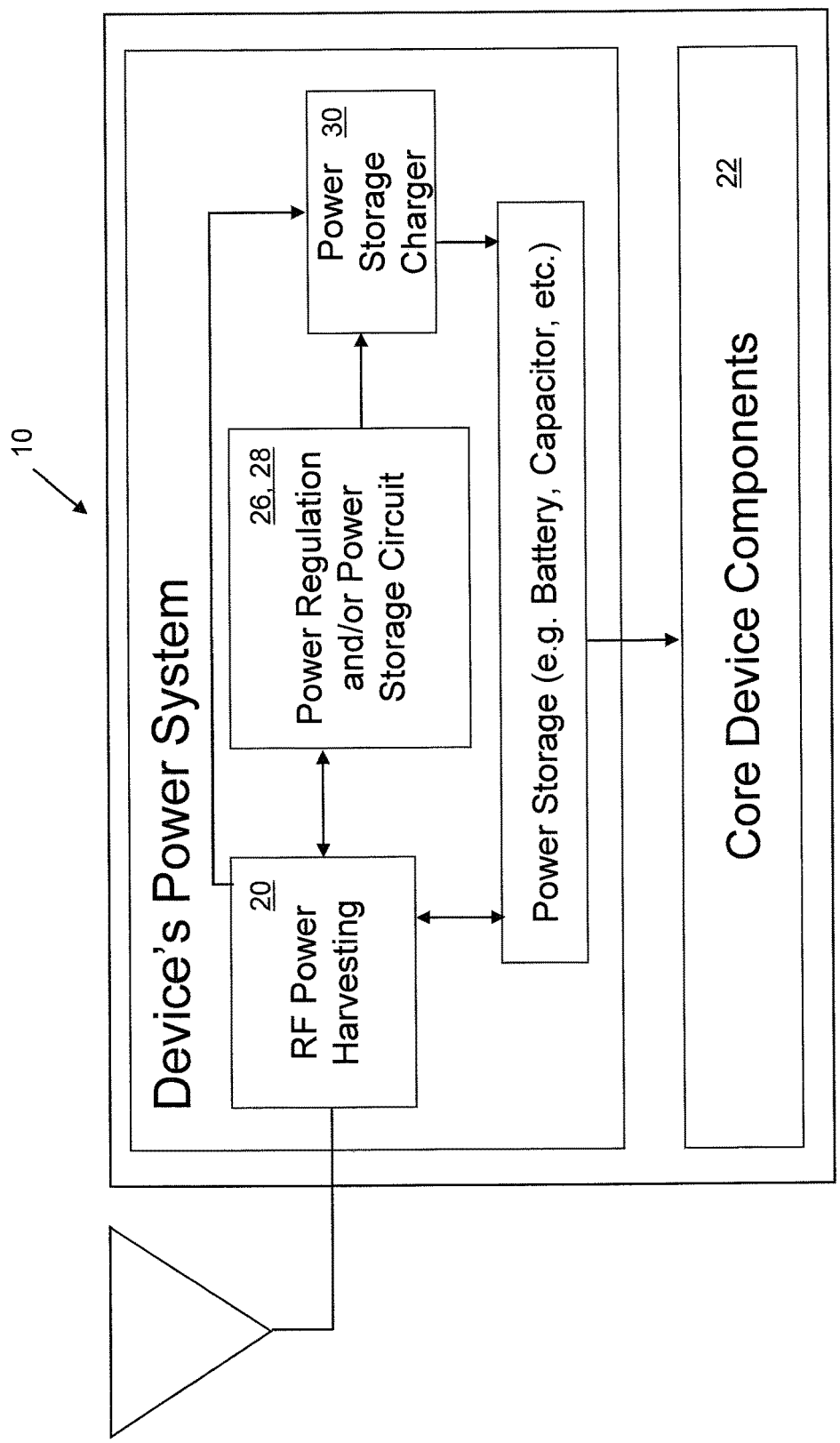
FIG. 40 is a block diagram of an RF Power Harvesting block in communication with a Power Regulation and/or Power Storage Circuit and a Power Storage block and used to supply power to the Power Storage Charger.
Figure 41:
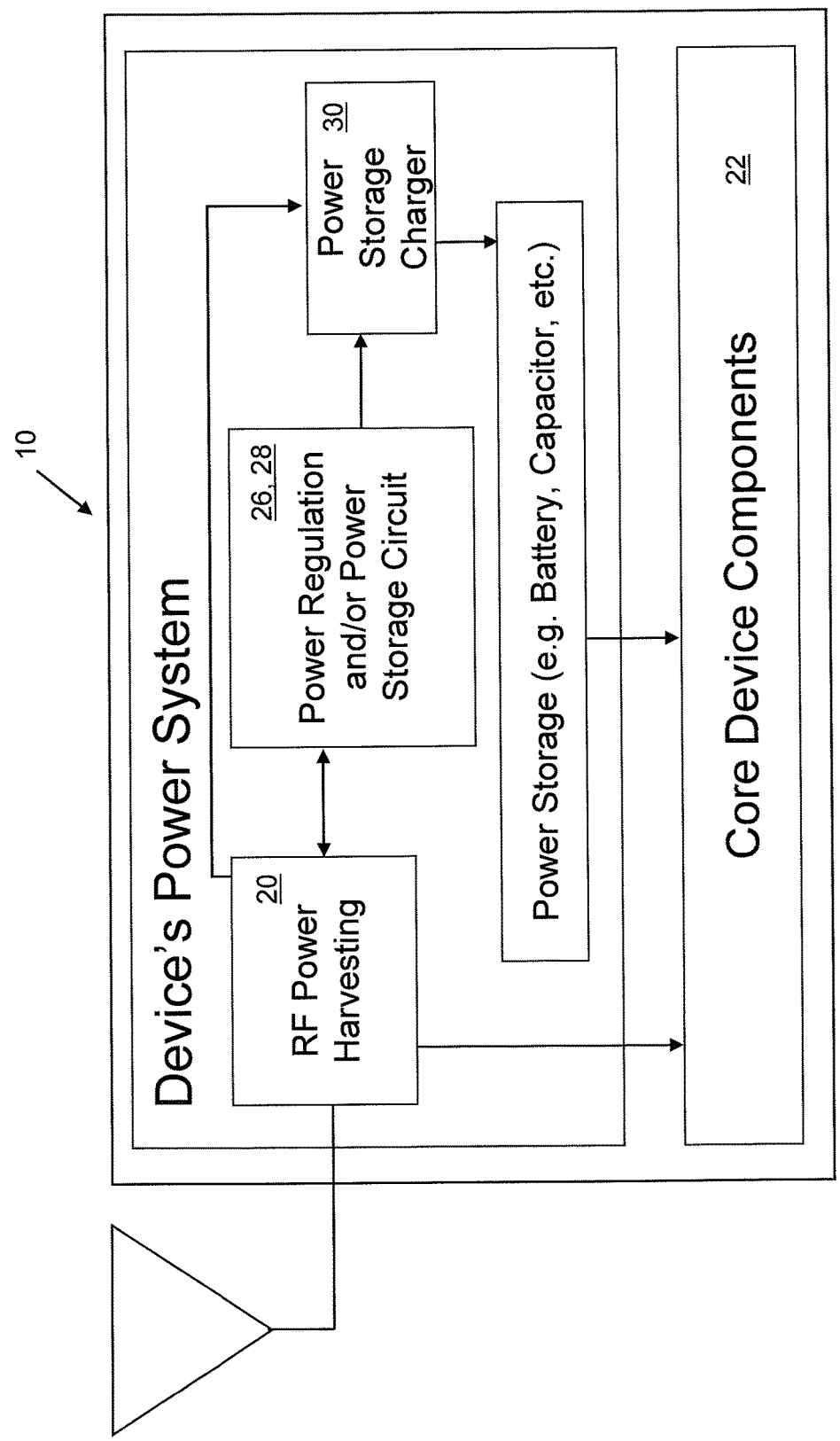
FIG. 41 is a block diagram of an RF Power Harvesting block in communication with a Power Regulation and/or Power Storage Circuit and used to supply power to Core Device Components and used to supply power to a Power Storage Charger.
Figure 42:
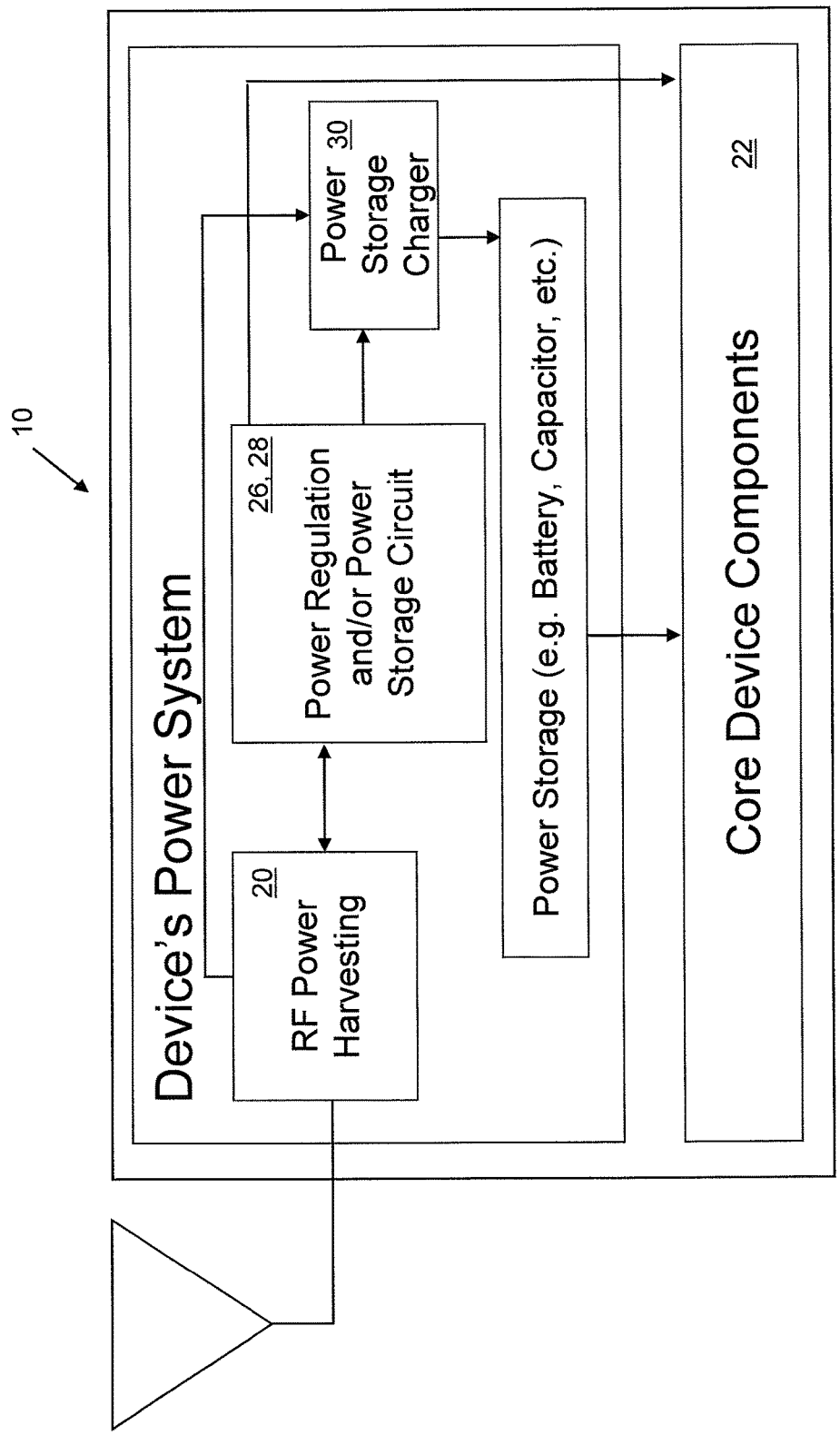
FIG. 42 is a block diagram of an RF Power Harvesting block in communication with a Power Regulation and/or Power Storage Circuit and used to supply power to a Power Storage Charger.
Figure 43:
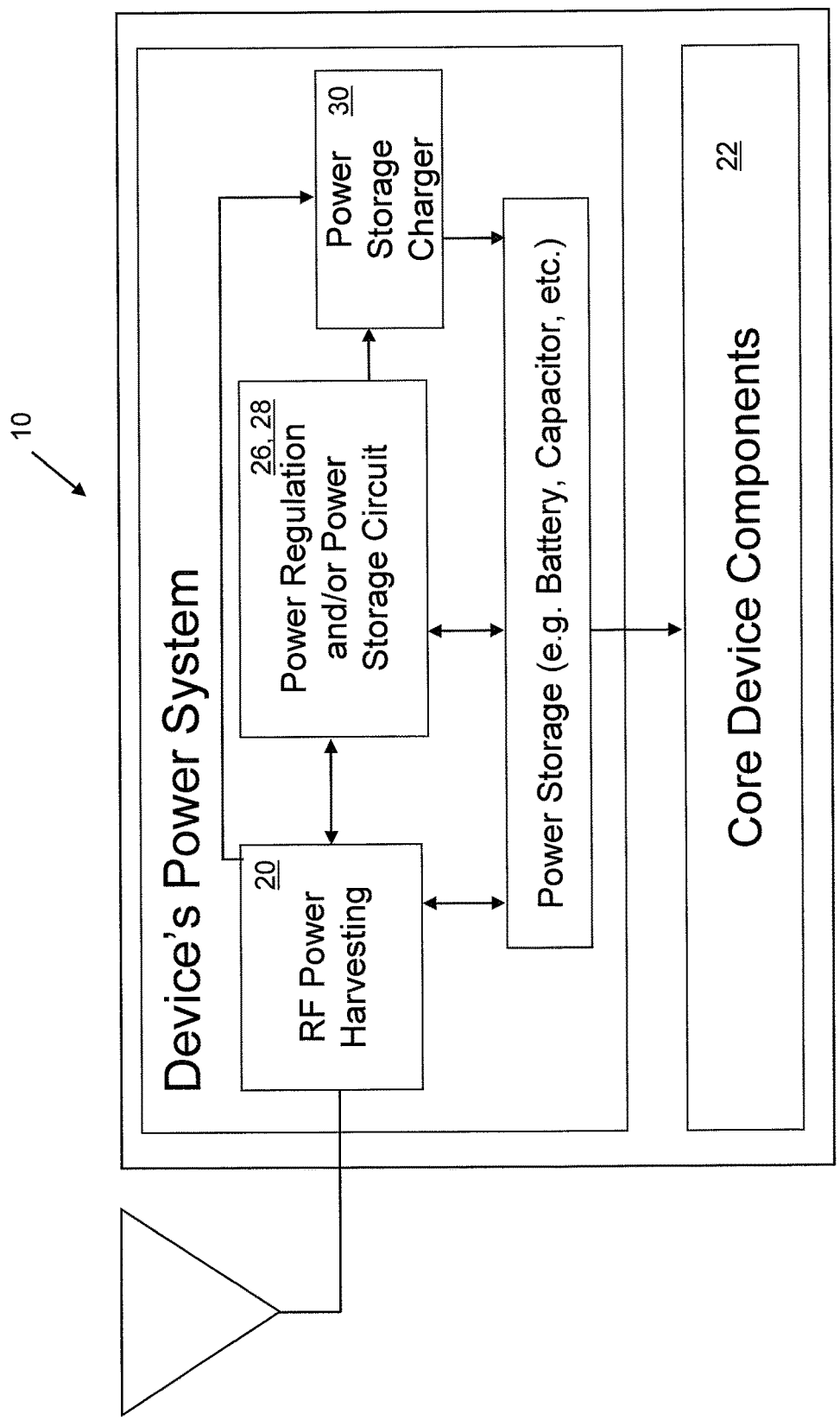
FIG. 43 is a block diagram of an RF Power Harvesting block in communication with a Power Regulation and/or Power Storage Circuit and a Power Storage block and used to supply power to a Power Storage Charger.
Figure 44:
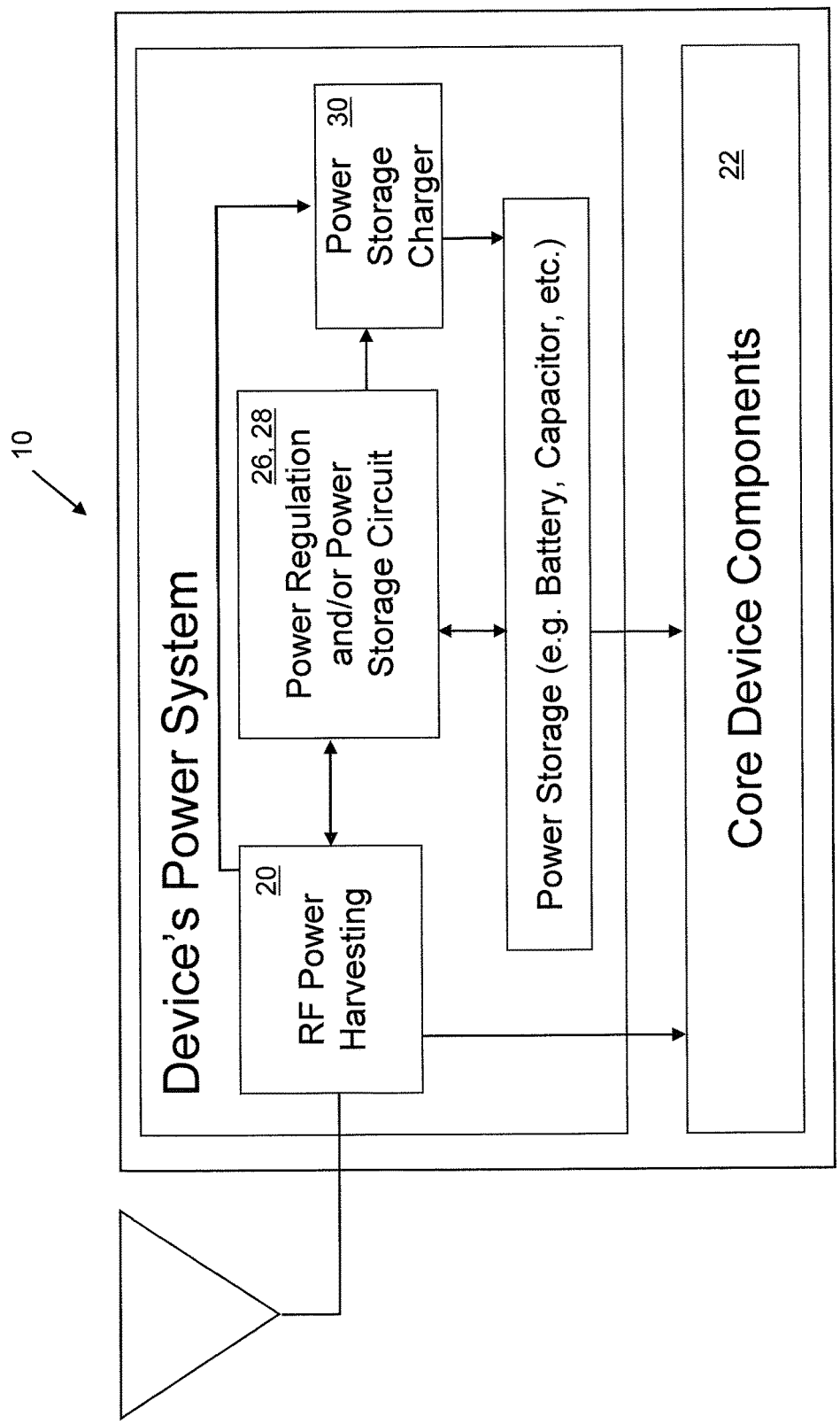
FIG. 44 is a block diagram of an RF Power Harvesting block in communication with a Power Regulation and/or Power Storage Circuit and the RF Power Harvesting block supplying power to Core Device Components and used to supply power to a Power Storage Charger.
Figure 45:
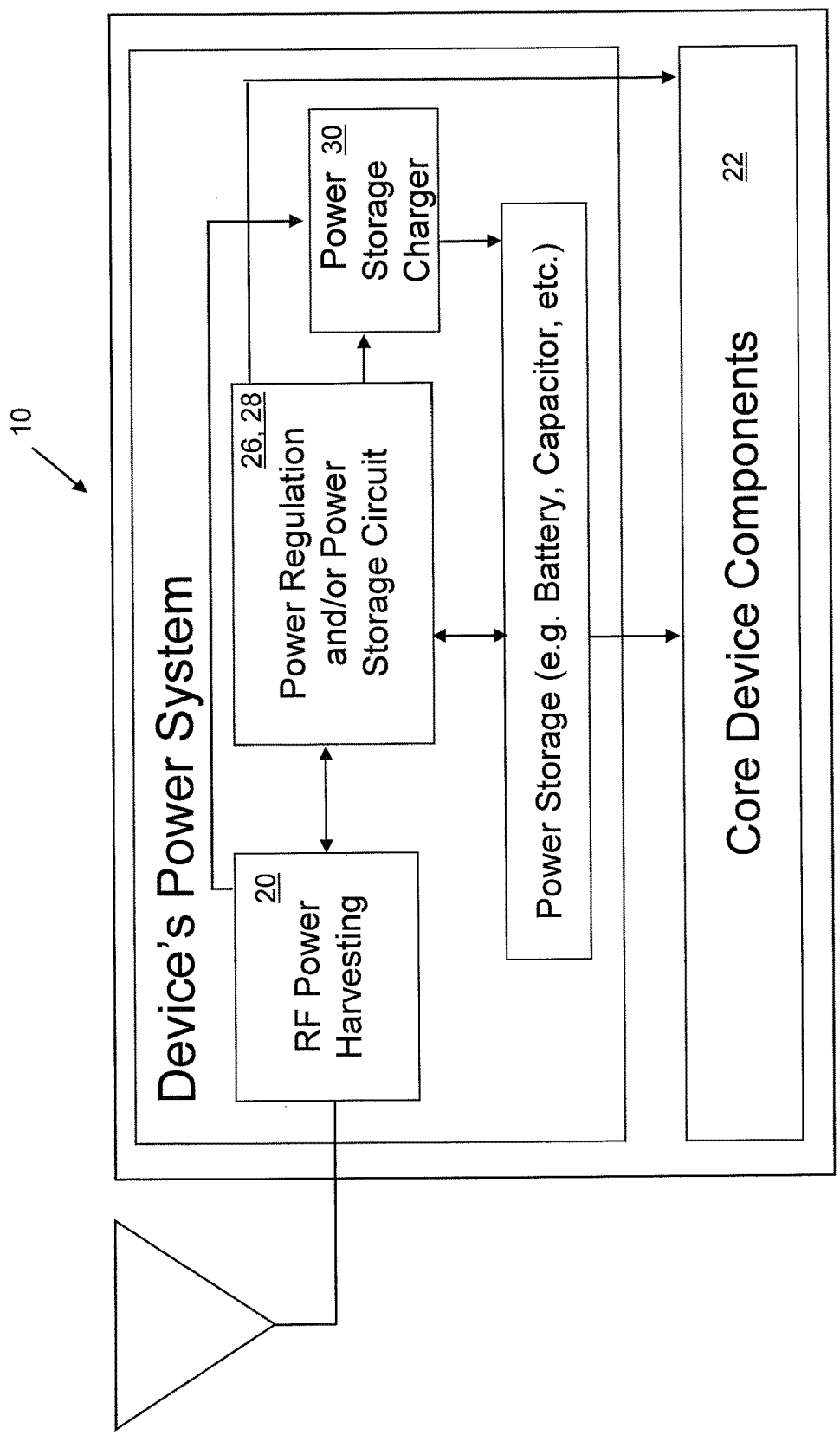
FIG. 45 is a block diagram of an RF Power Harvesting block in communication with a Power Regulation and/or Power Storage Circuit and used to supply power to a Power Storage Charger.
Figure 46:
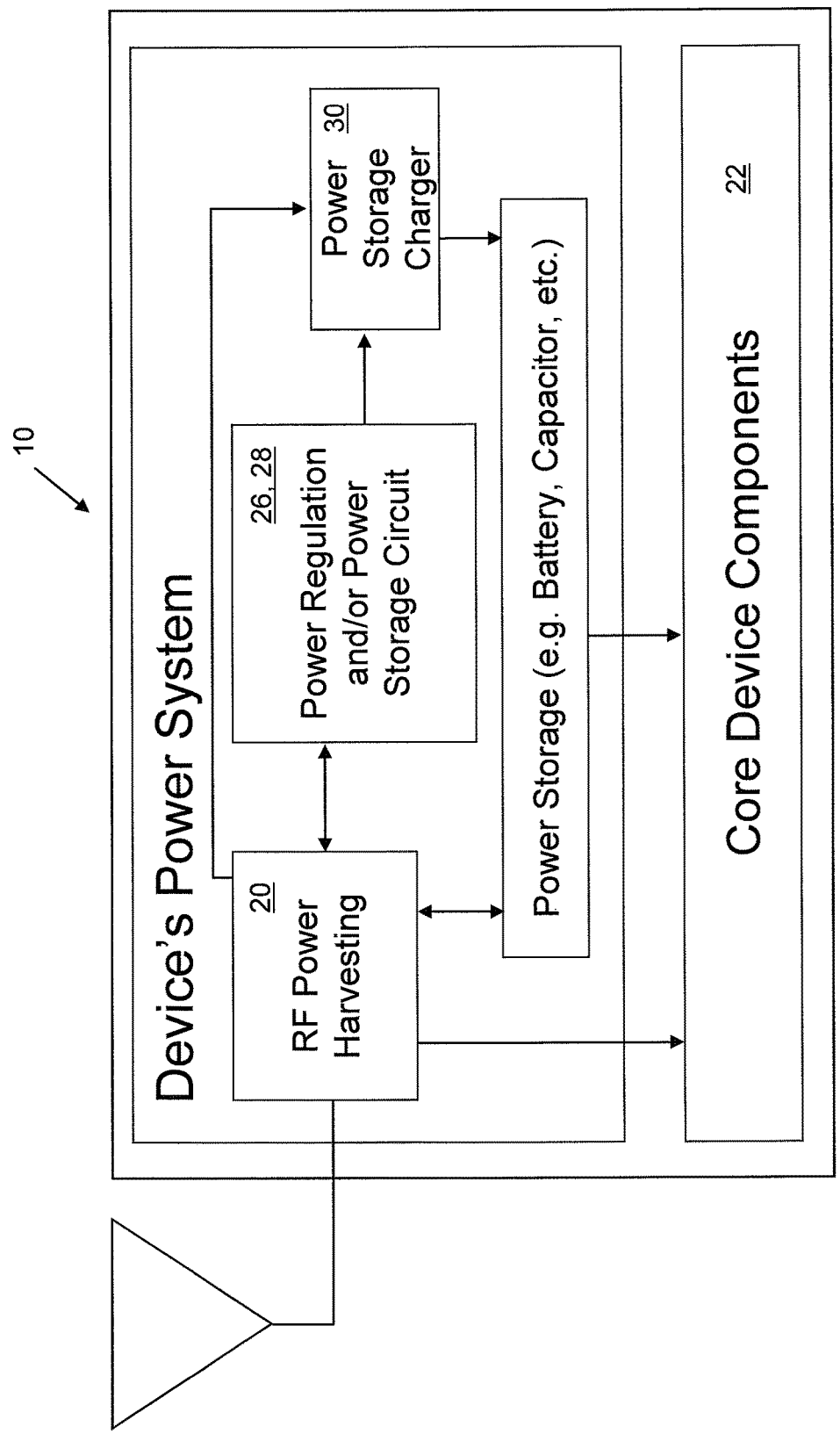
FIG. 46 is a block diagram of an RF Power Harvesting block in communication with a Power Regulation and/or Power Storage Circuit and a Power Storage block and used to supply power to Core Device Components and used to supply power to a Power Storage Charger.
Figure 47:
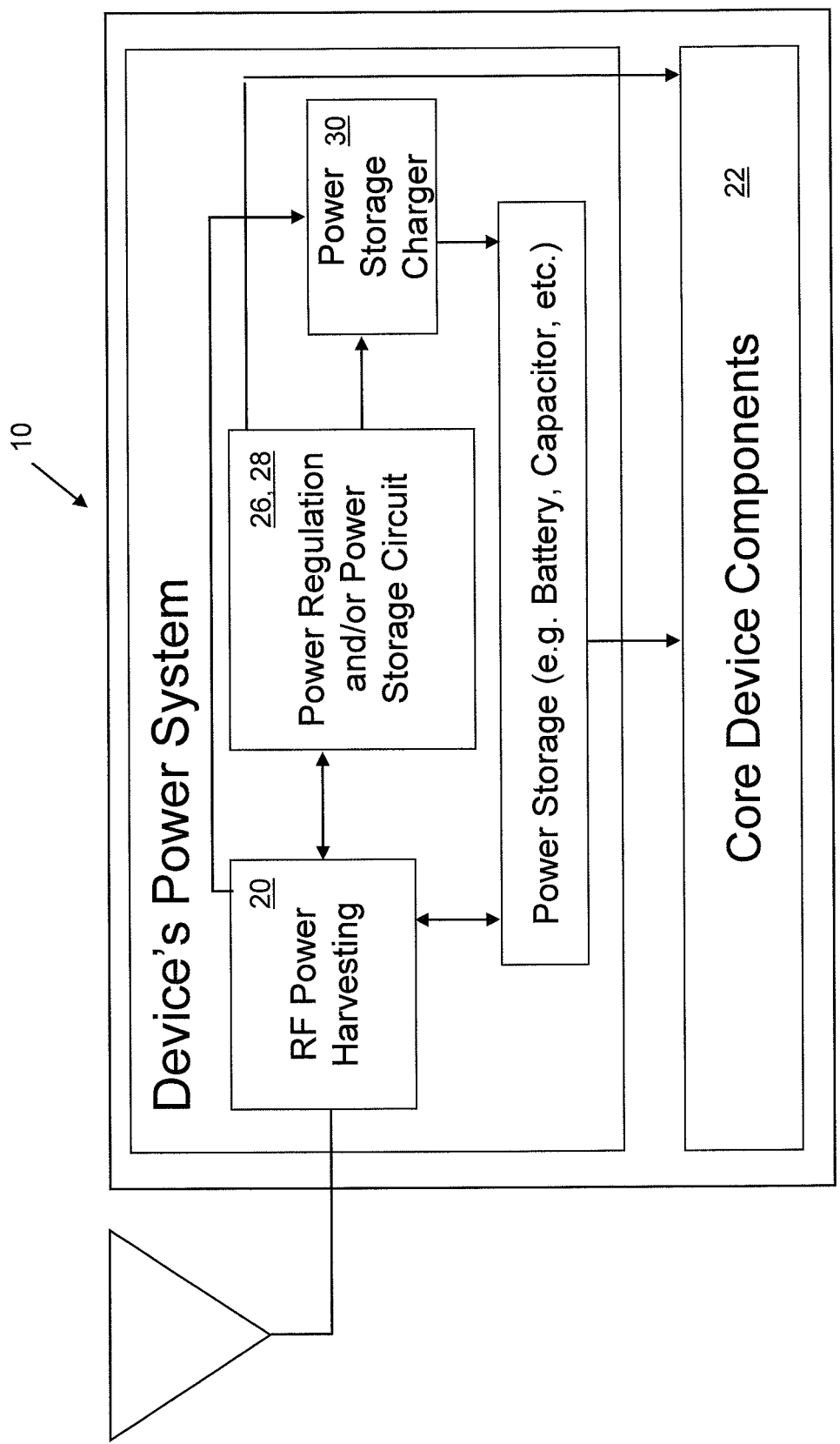
FIG. 47 is a block diagram of an RF Power Harvesting block in communication with a Power Regulation and/or Power Storage Circuit and a Power Storage block and used to supply power to a Power Storage Charger.
Figure 48:
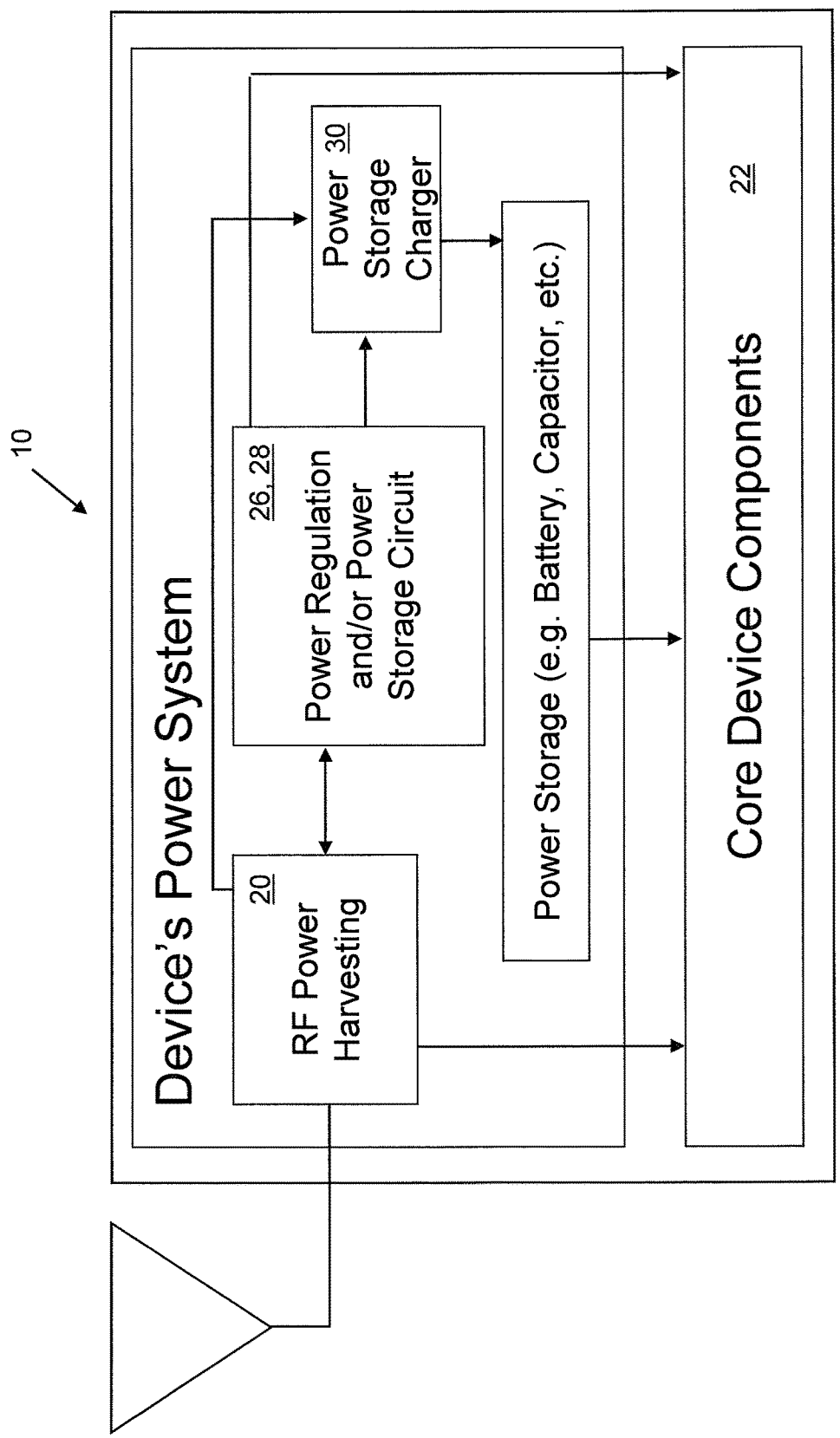
FIG. 48 is a block diagram of an RF Power Harvesting block in communication with a Power Regulation and/or Power Storage Circuit and used to supply power Core Device Components and used to supply power to a Power Storage Charger.
Figure 49:
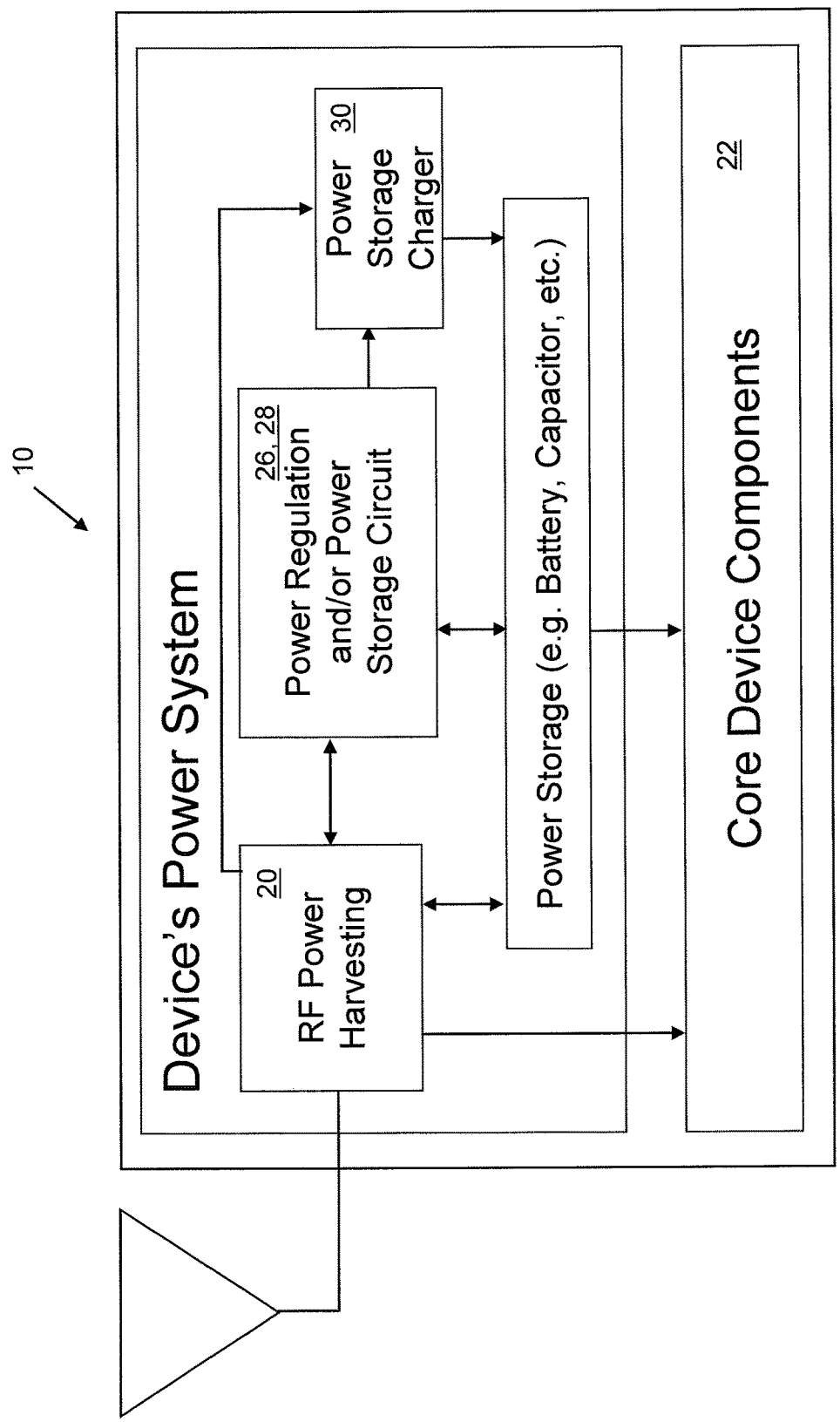
FIG. 49 is a block diagram of an RF Power Harvesting block in communication with a Power Regulation and/or Power Storage Circuit and a Power Storage block and used to supply power to Core Device Components and used to supply power to a Power Storage Charger.
Figure 50:
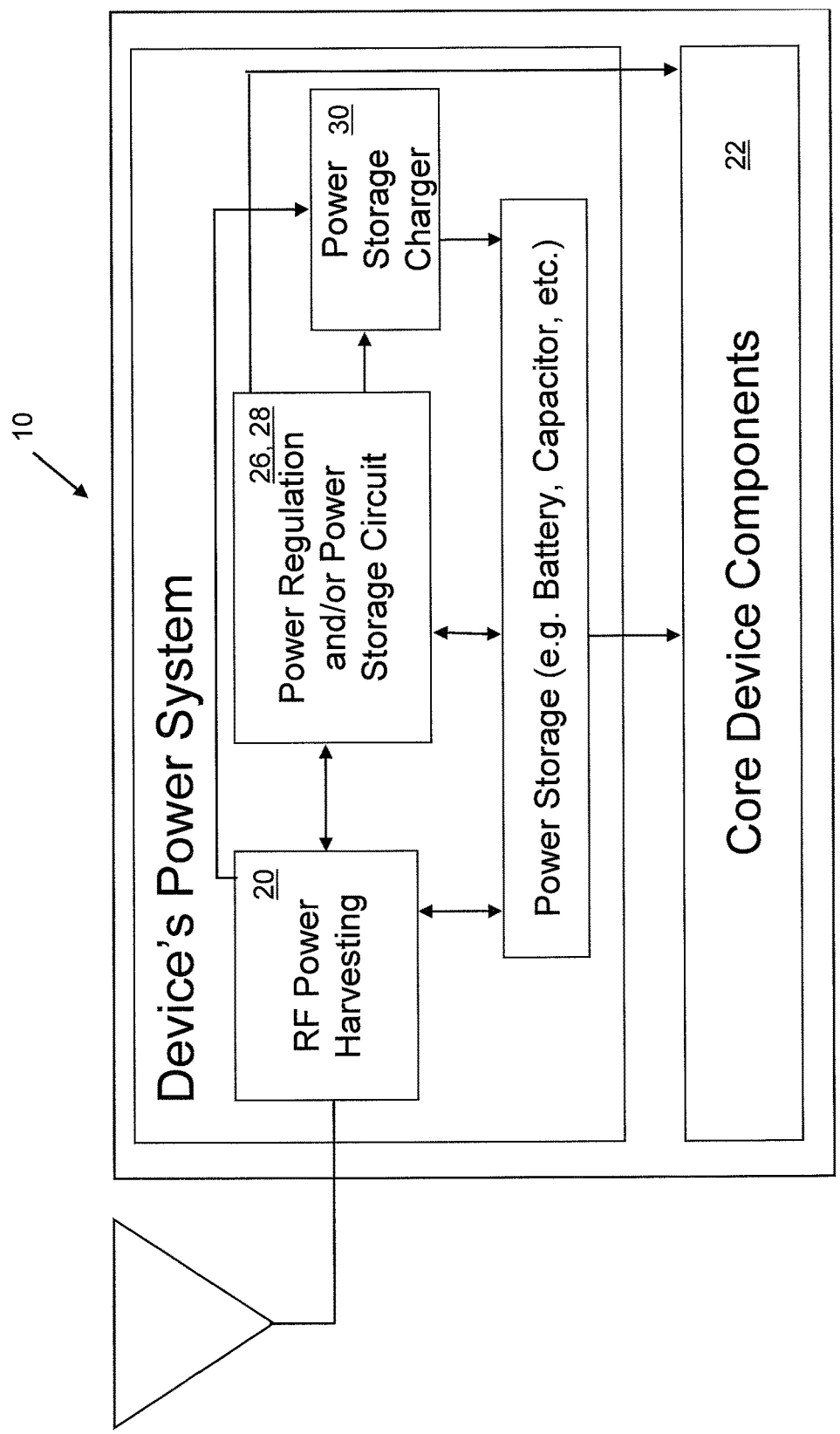
FIG. 50 is a block diagram of an RF Power Harvesting block in communication with a Power Regulation and/or Power Storage Circuit and a Power Storage block and used to supply power to a Power Storage Charger.
Figure 51:
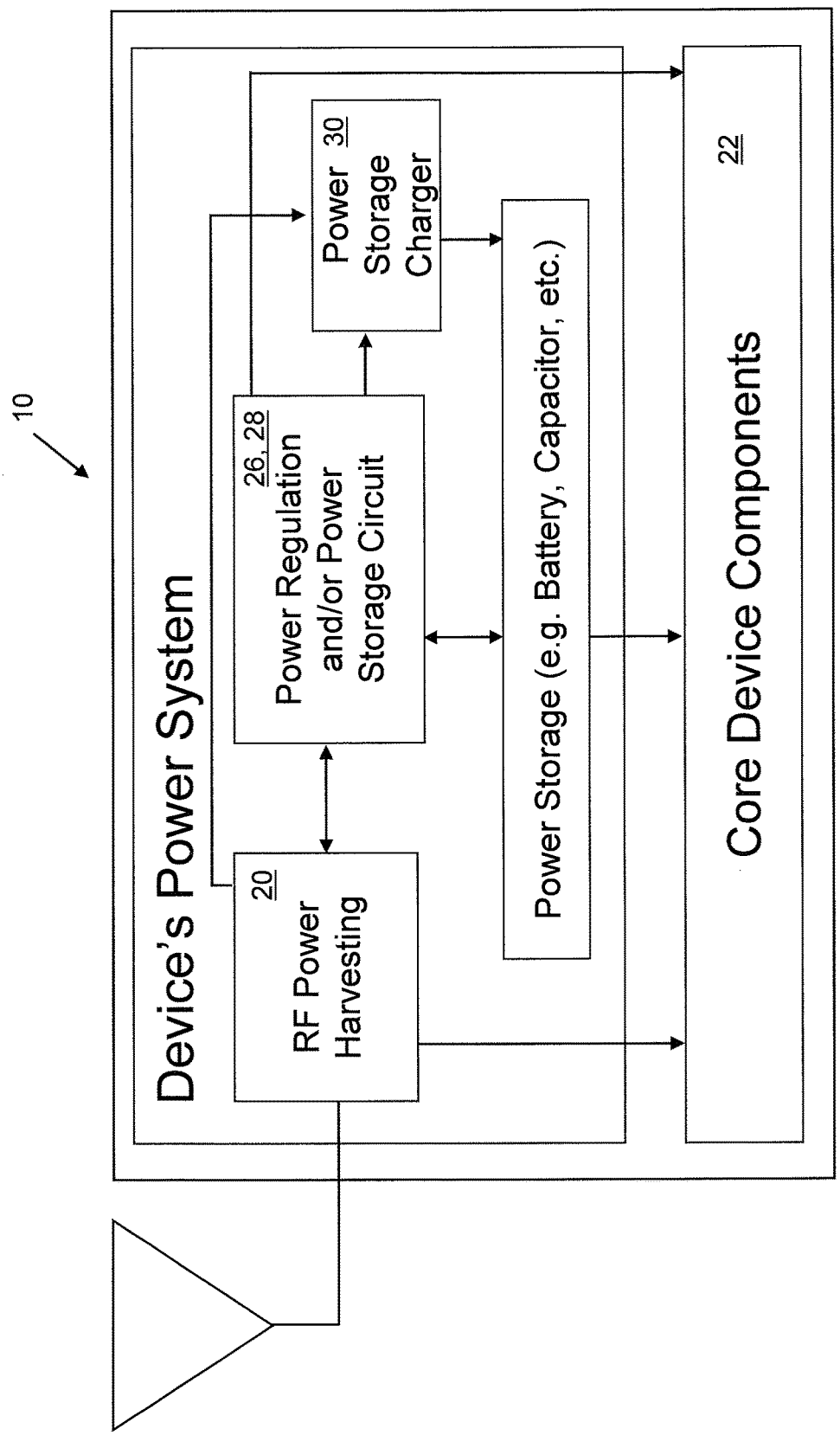
FIG. 51 is a block diagram of an RF Power Harvesting block in communication with a Power Regulation and/or Power Storage Circuit and used to supply power to Core Device Components and used to supply power to a Power Storage Charger.
Figure 52:
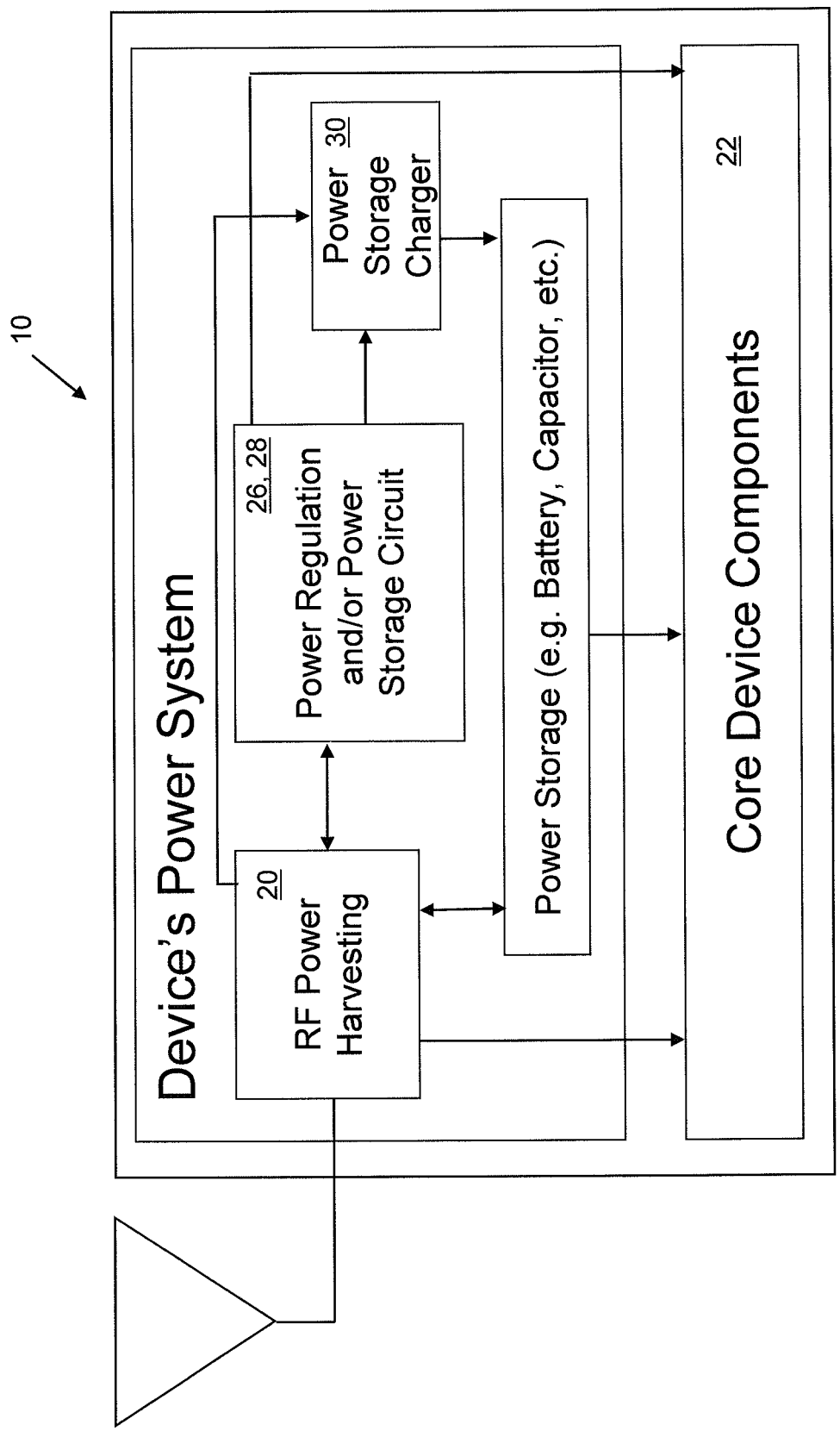
FIG. 52 is a block diagram of an RF Power Harvesting block in communication with a Power Regulation and/or Power Storage Circuit and a Power Storage block and used to supply power to Core Device Components and used to supply power to a Power Storage Charger.

The wireless keyboard is an example of recharging and augmenting a battery to supply power to a device. This system is shown in FIG. 13. The output from the regulation circuitry recharges the battery and supplies power to the keyboard. The battery is also used to supply power to the keyboard. The keyboard also includes a separate antenna for receiving power and for data communications. The antenna configuration can be seen in FIG. 55.

The wall clock is an example of a direct powering system. The wall clock was retrofitted to include an RF power harvester 20 and the internal AA battery was removed. This system is shown in FIG. 2. The wall clock did not need regulation, but did require a capacitor for storage to supply the pulse of power to move the second hand.

Figure 60:
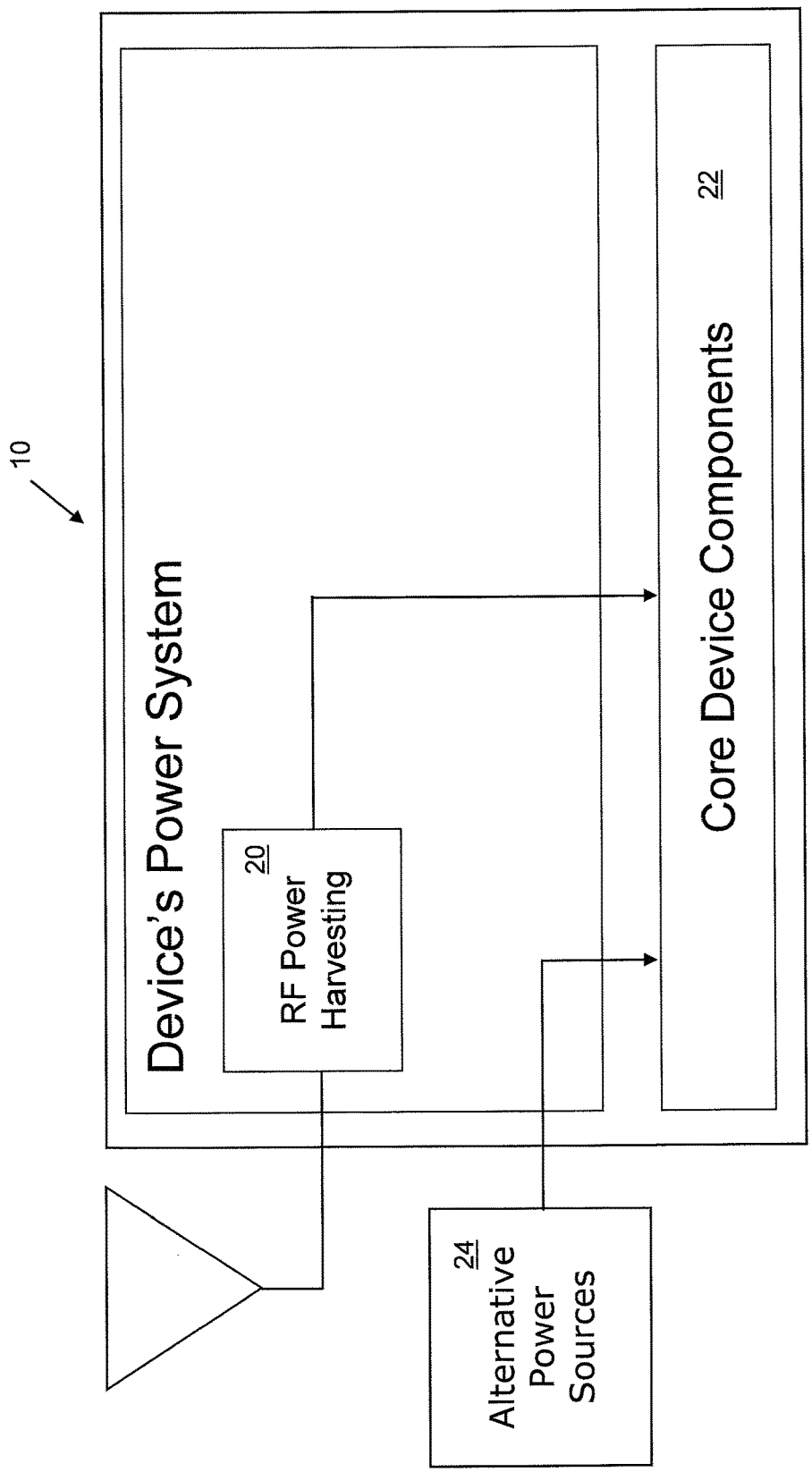
FIG. 60 is a block diagram of an RF Power Harvesting block used to directly supply power to Core Device Components.
Figure 61:
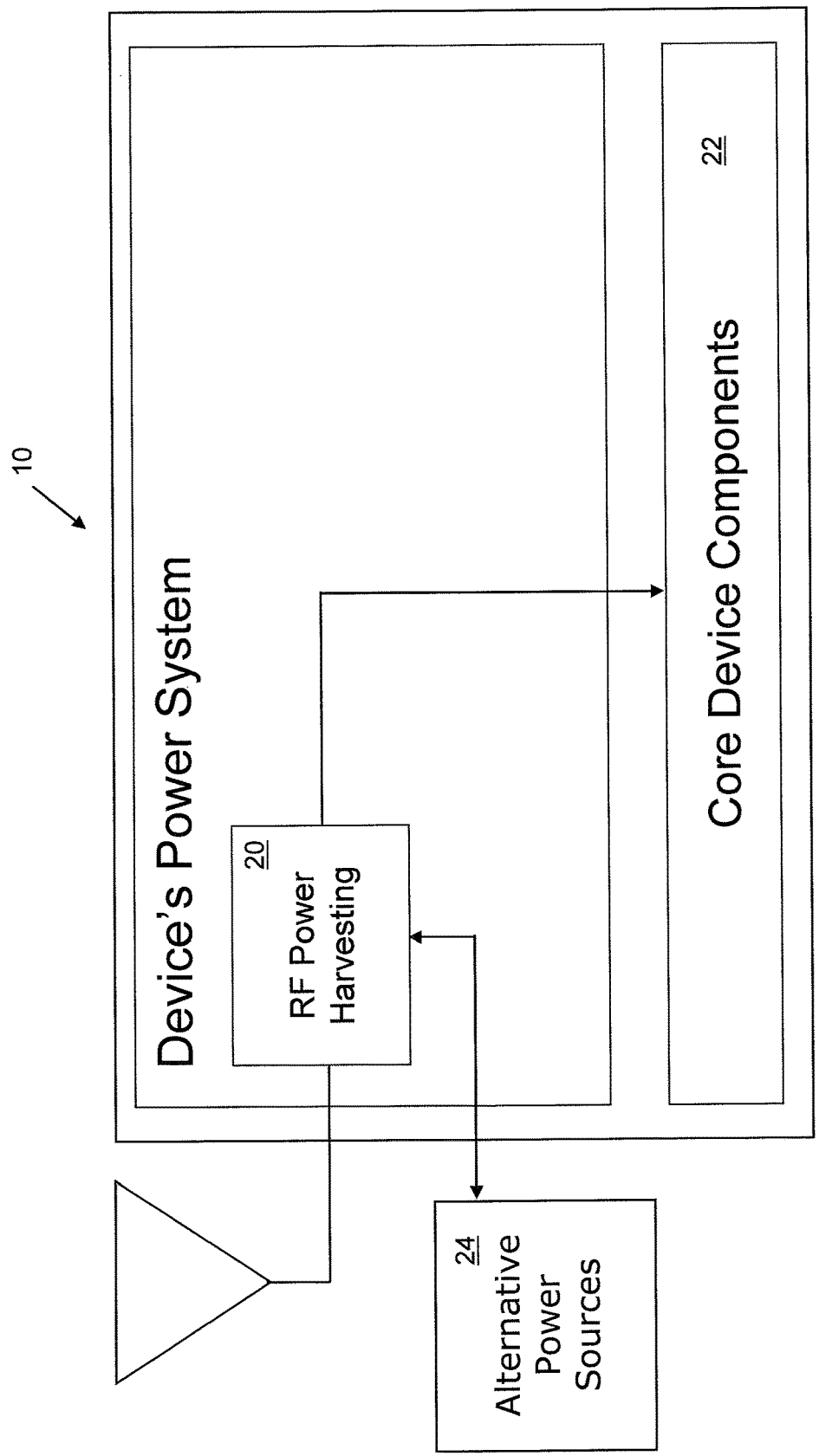
FIG. 61 is a block diagram of an RF Power Harvesting block used to directly supply power to Core Device Components and in communication with an Alternative Power Sources block.
Figure 62:
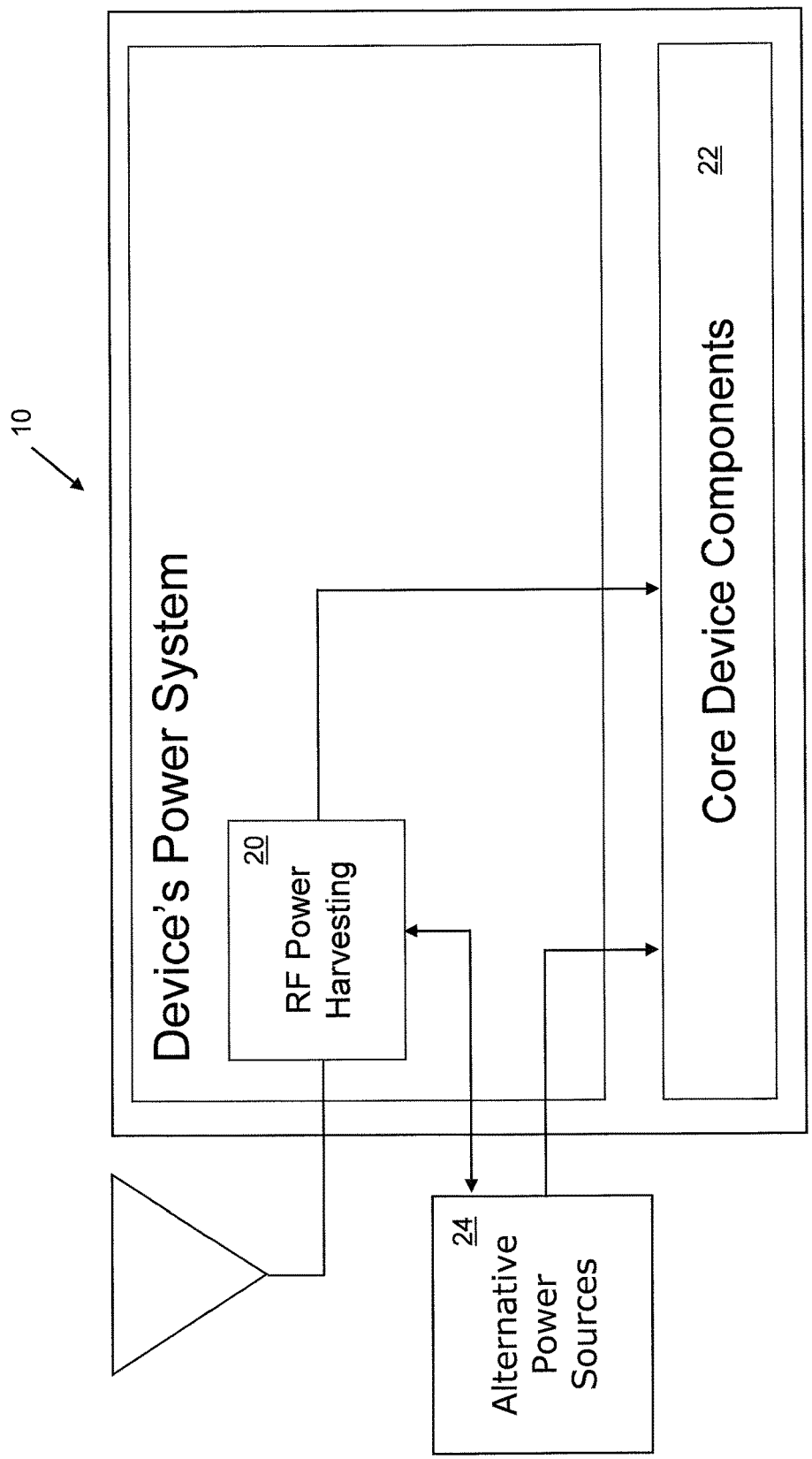
FIG. 62 is a block diagram of an RF Power Harvesting block in communication with an Alternative Power Sources block and used to directly supply power to Core Device Components.

The calculator is an example of using RF energy harvesting with another energy harvesting technology. The calculator had an internal 1.5V coin cell battery and a small solar panel. The internal battery was removed, however, the solar panel was left intact. This system is shown in FIG. 60. In this system, the calculator can receive power from both the solar panel and the RF power harvester 20 to eliminate the need for a battery.

Figure 63:
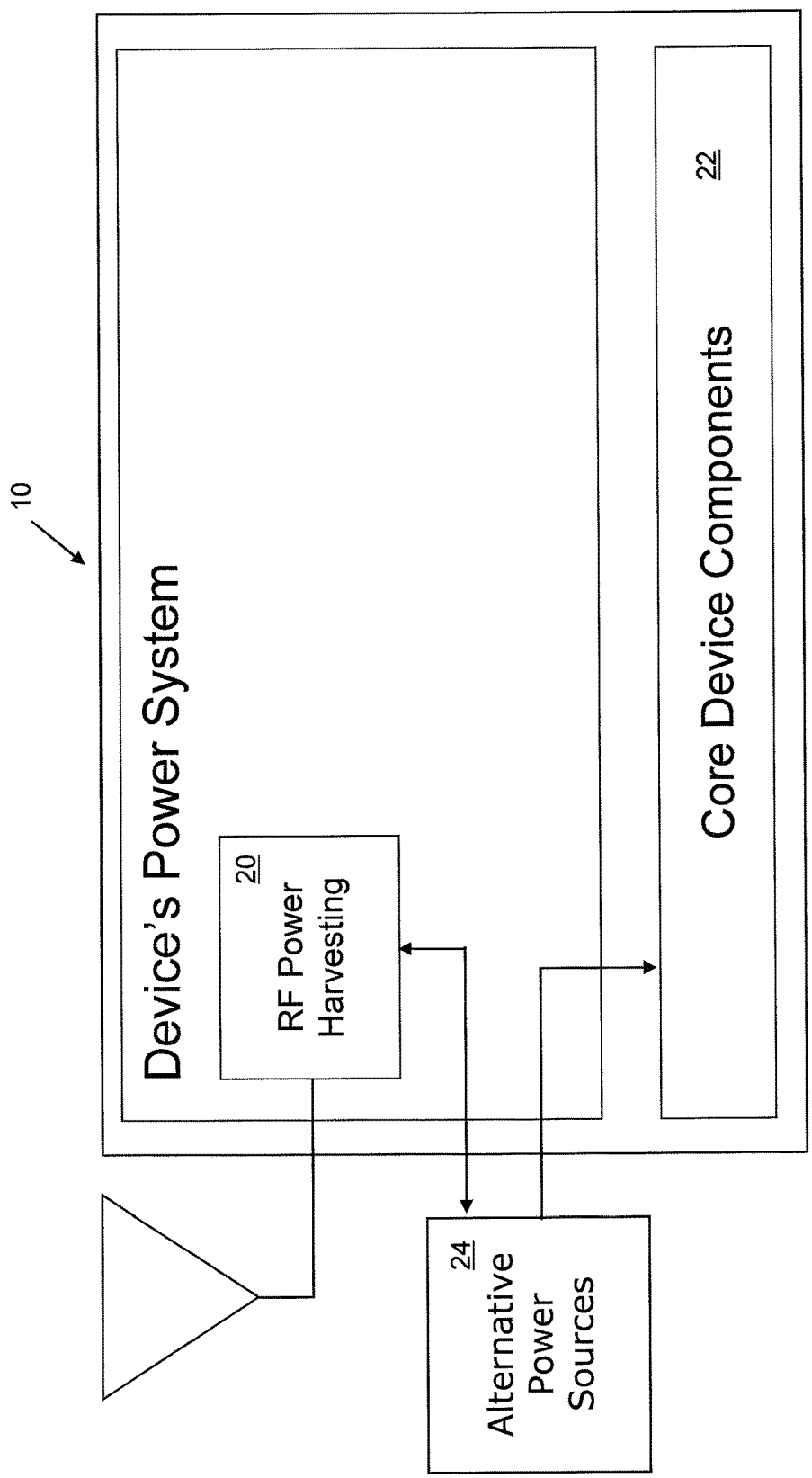
FIG. 63 is a block diagram of an RF Power Harvesting block in communication with an Alternative Power Sources block.
Figure 64:
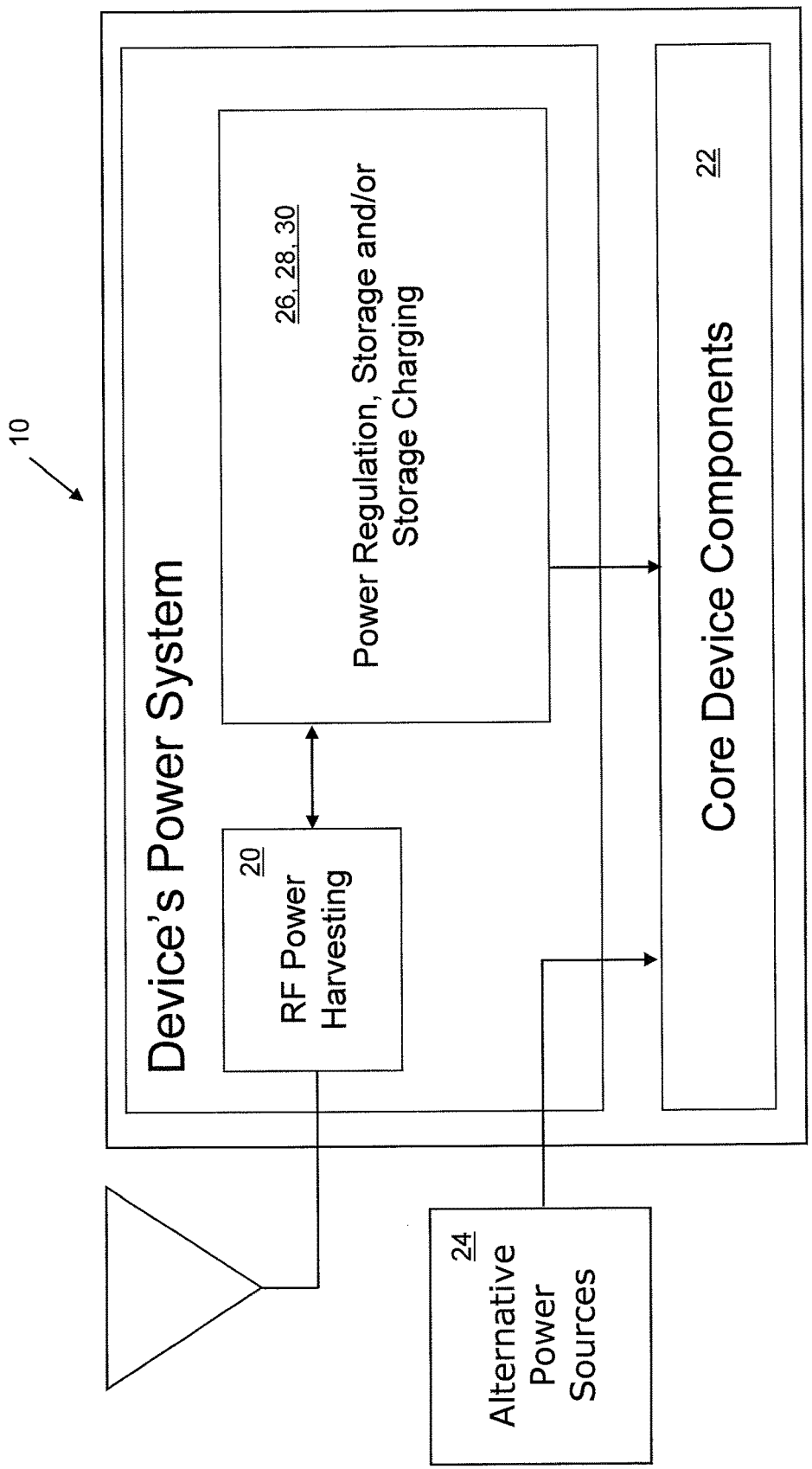
FIG. 64 is a block diagram of an RF Power Harvesting block in communication with a Power Regulation, Storage and/or Storage Charging block.
Figure 65:
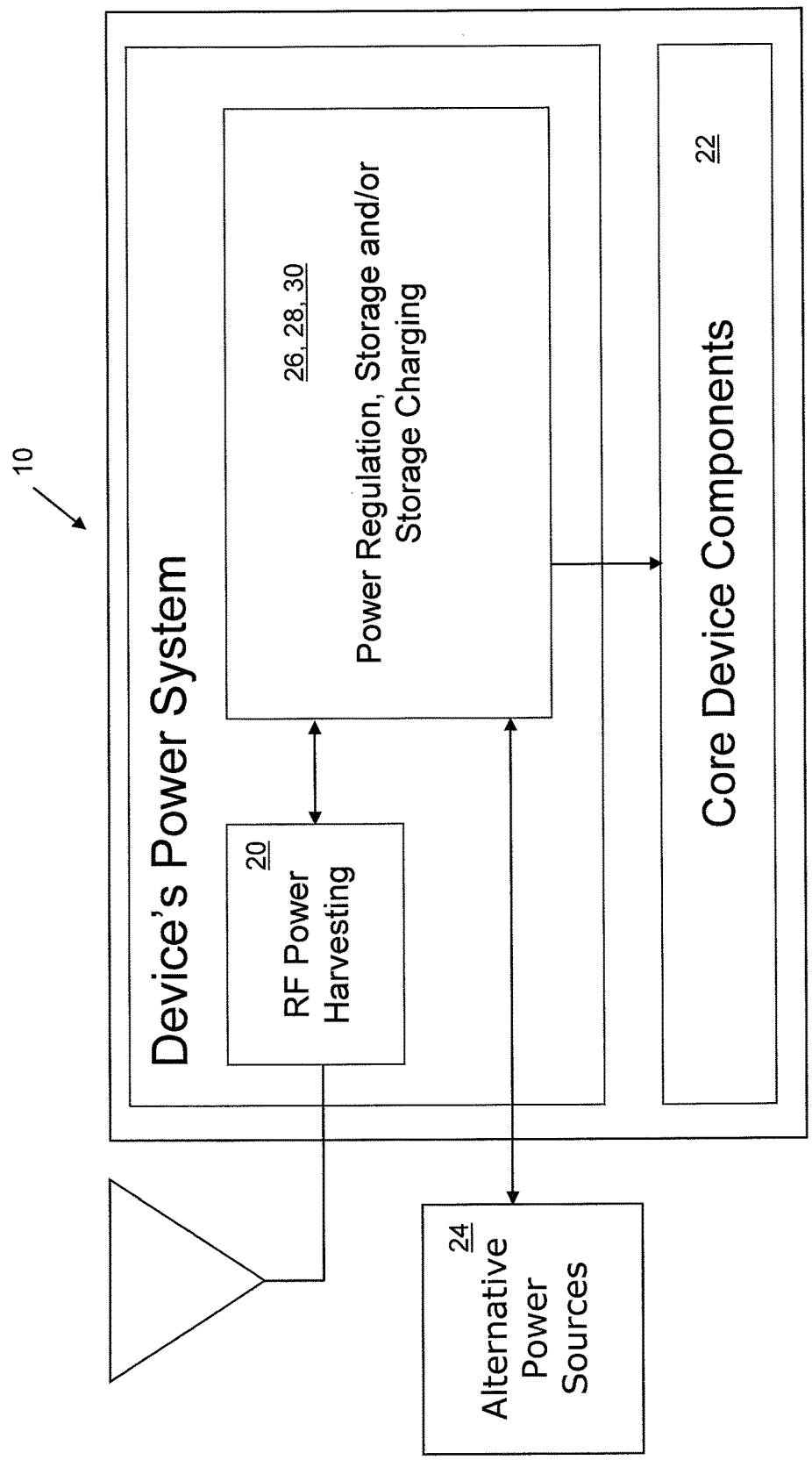
FIG. 65 is a block diagram of an RF Power Harvesting block in communication with a Power Regulation, Storage and/or Storage Charging block.
Figure 66:
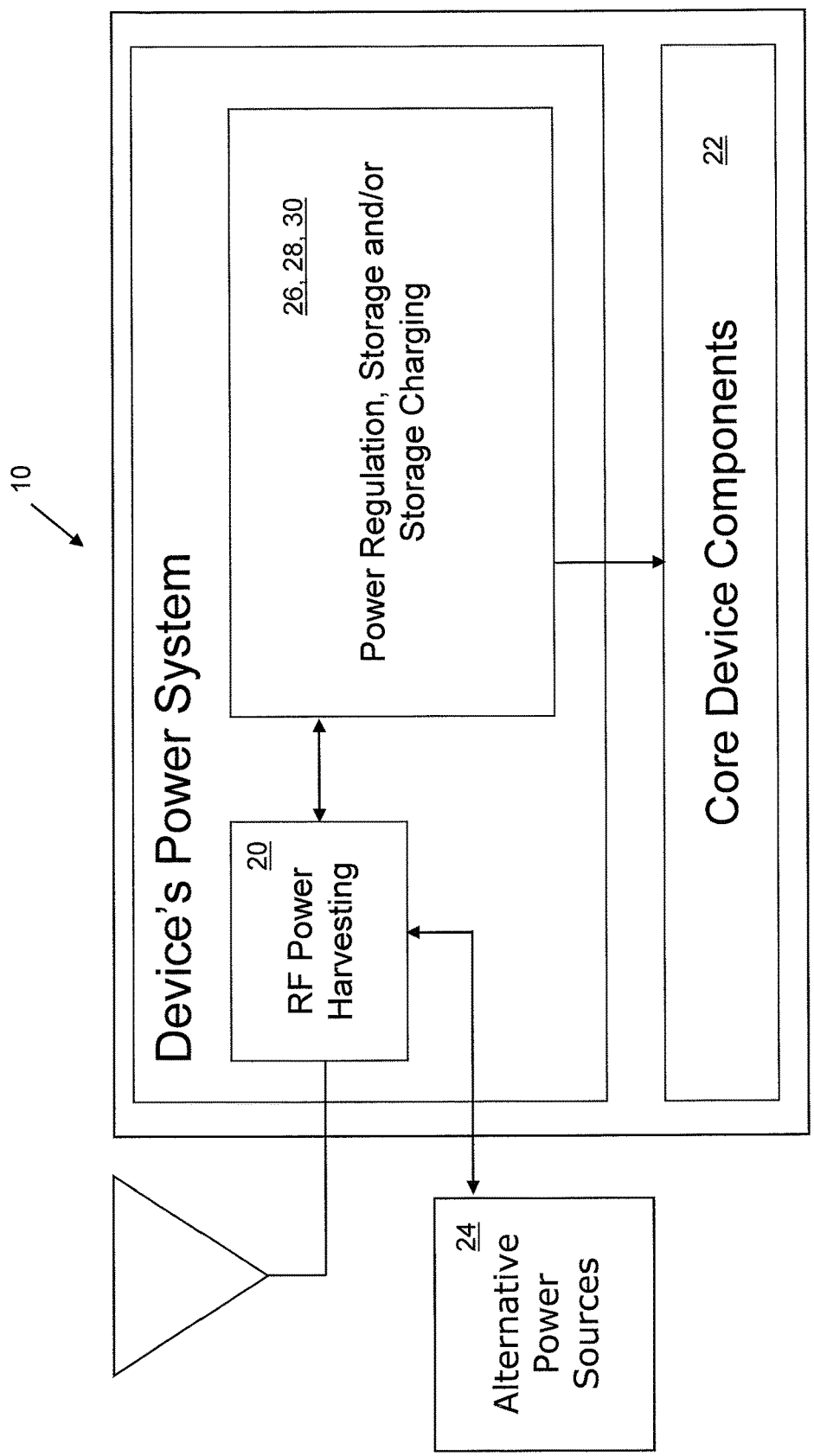
FIG. 66 is a block diagram of an RF Power Harvesting block in communication with a Power Regulation, Storage and/or Storage Charging block and an Alternative Power Sources block.
Figure 67:
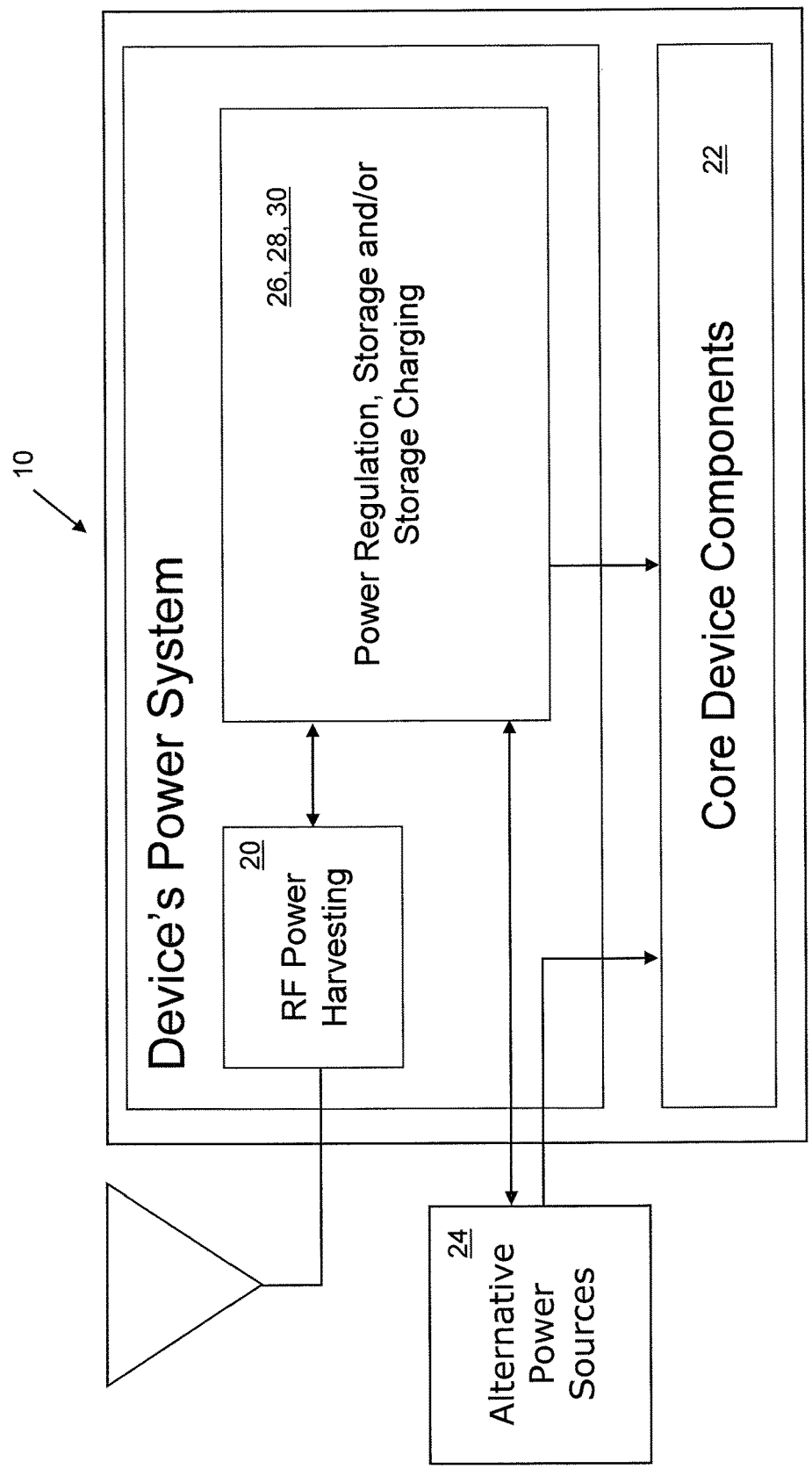
FIG. 67 is a block diagram of an RF Power Harvesting block in communication with a Power Regulation, Storage and/or Storage Charging block.
Figure 68:
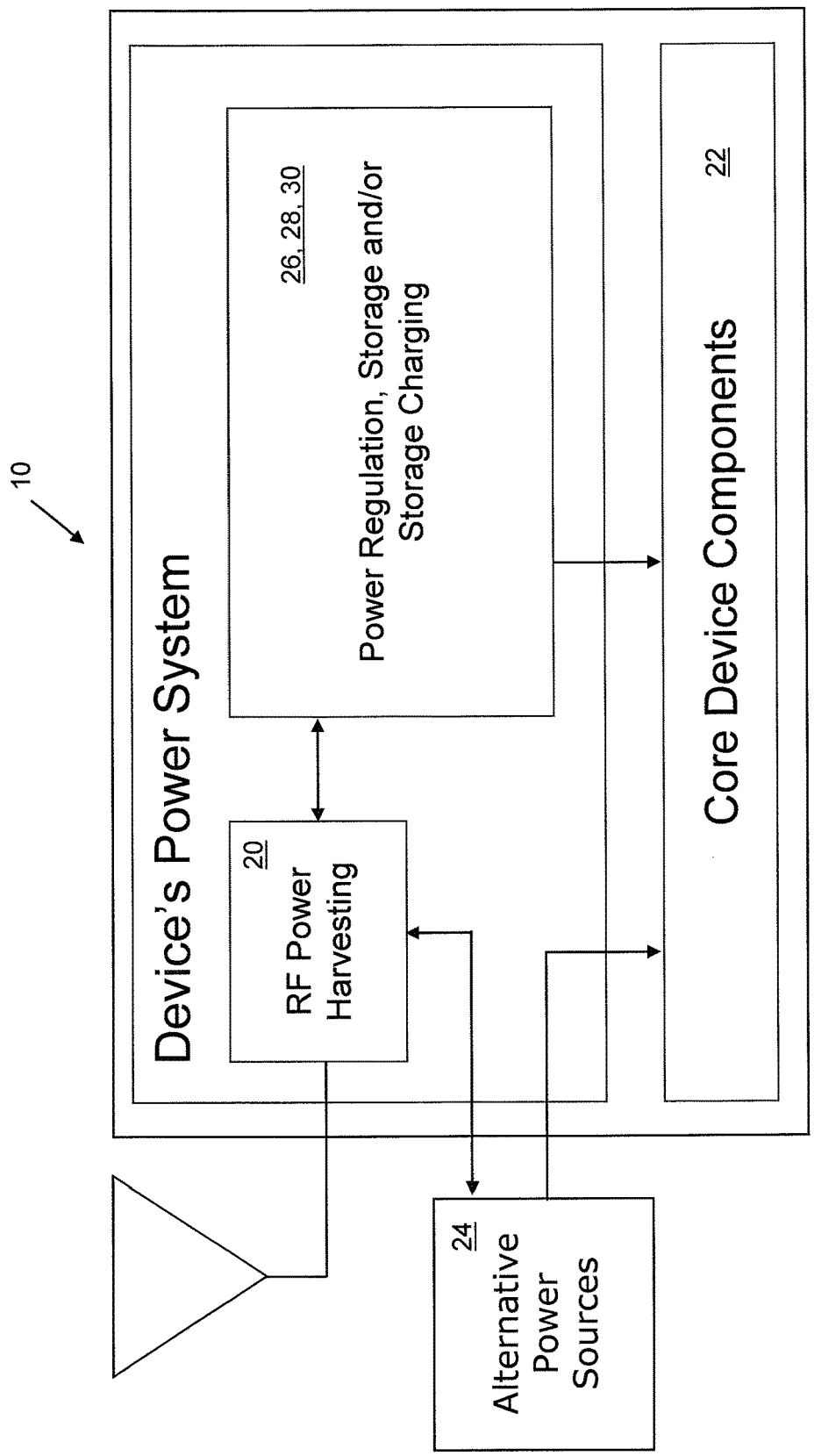
FIG. 68 is a block diagram of an RF Power Harvesting block in communication with a Power Regulation, Storage and/or Storage Charging block and an Alternative Power Sources block.
Figure 69:
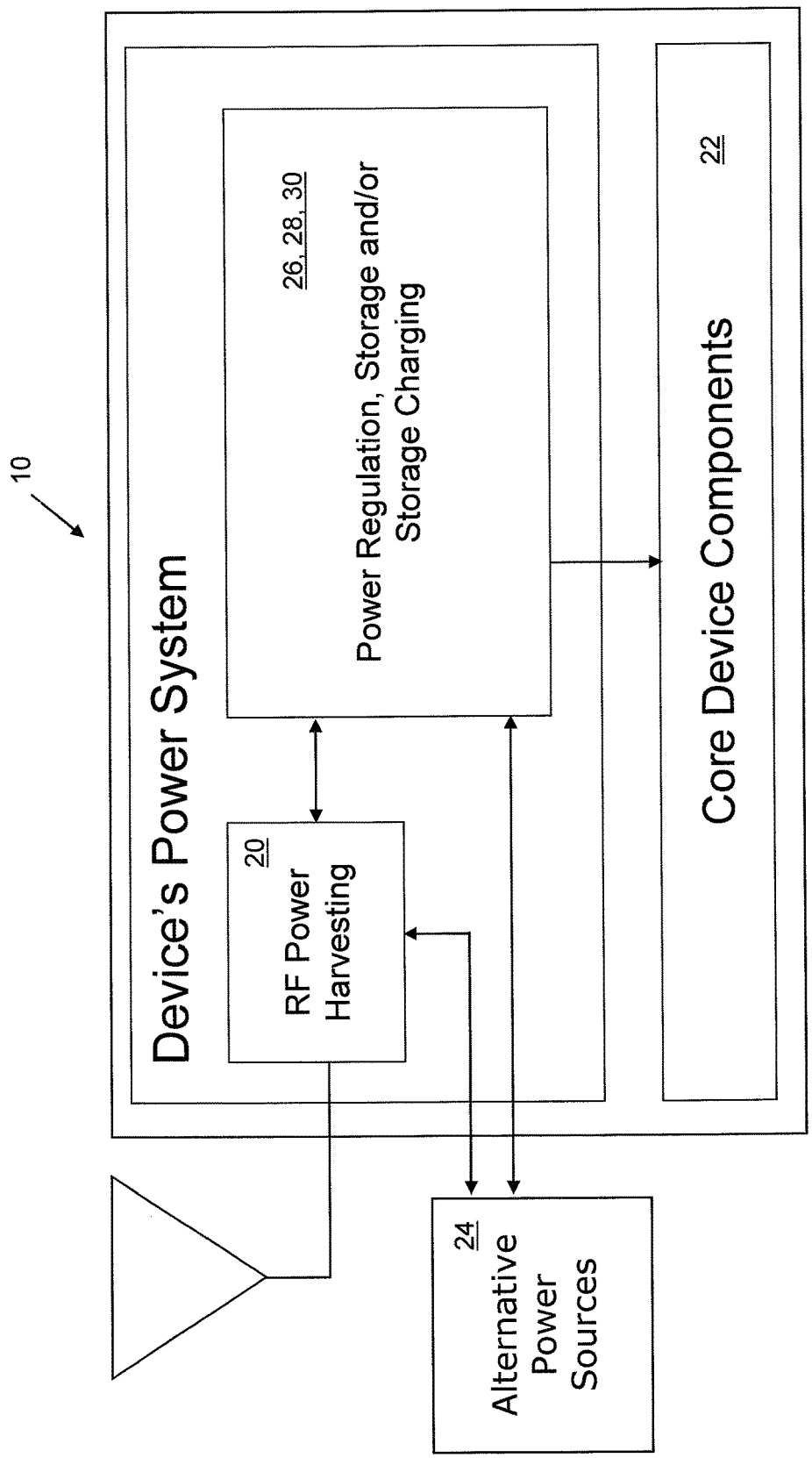
FIG. 69 is a block diagram of an RF Power Harvesting block in communication with an Alternative Power Sources block and a Power Regulation, Storage and/or Storage Charging block.
Figure 70:
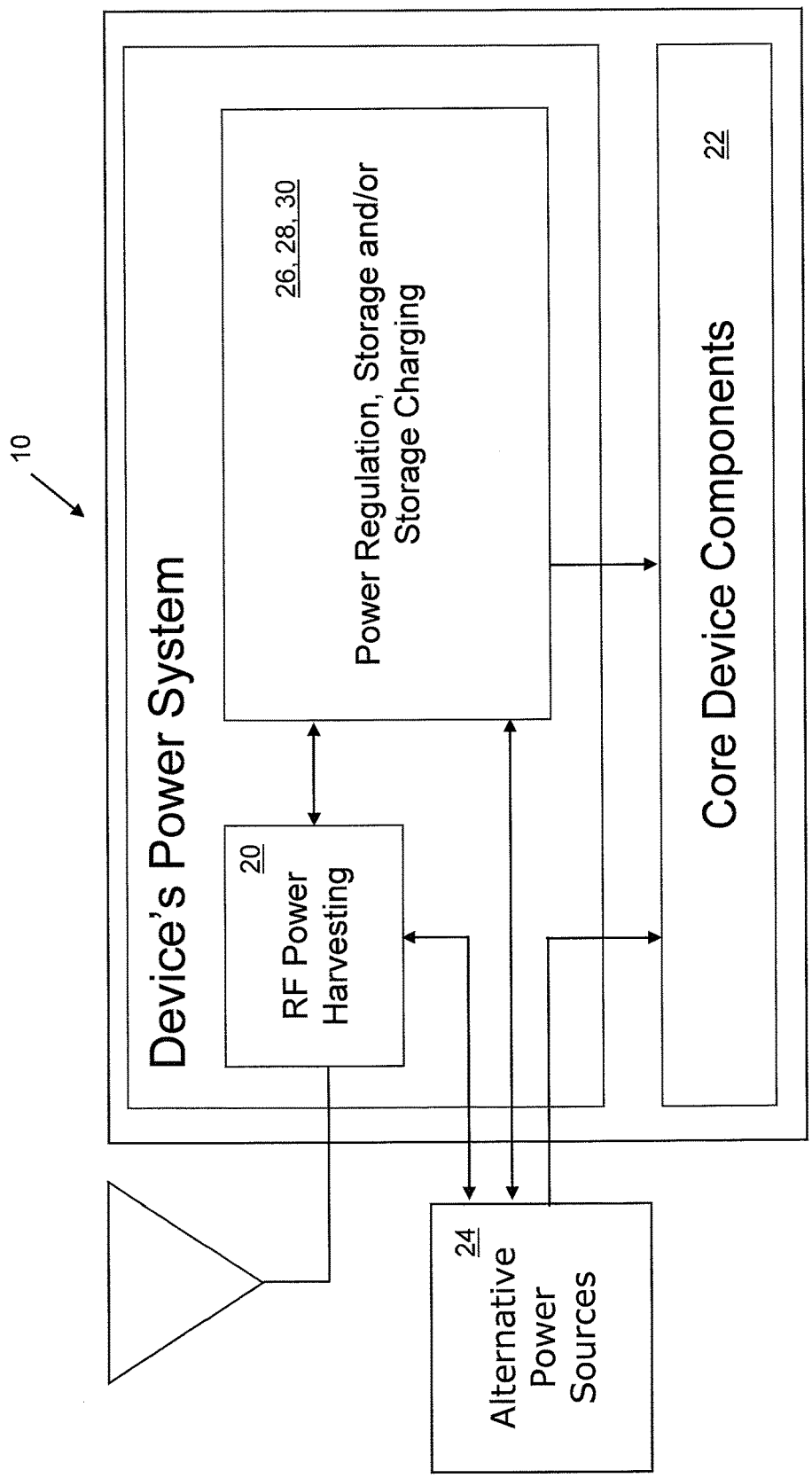
FIG. 70 is a block diagram of an RF Power Harvesting block in communication with an Alternative Power Sources block and a Power Regulation, Storage and/or Storage Charging block.
Figure 71:
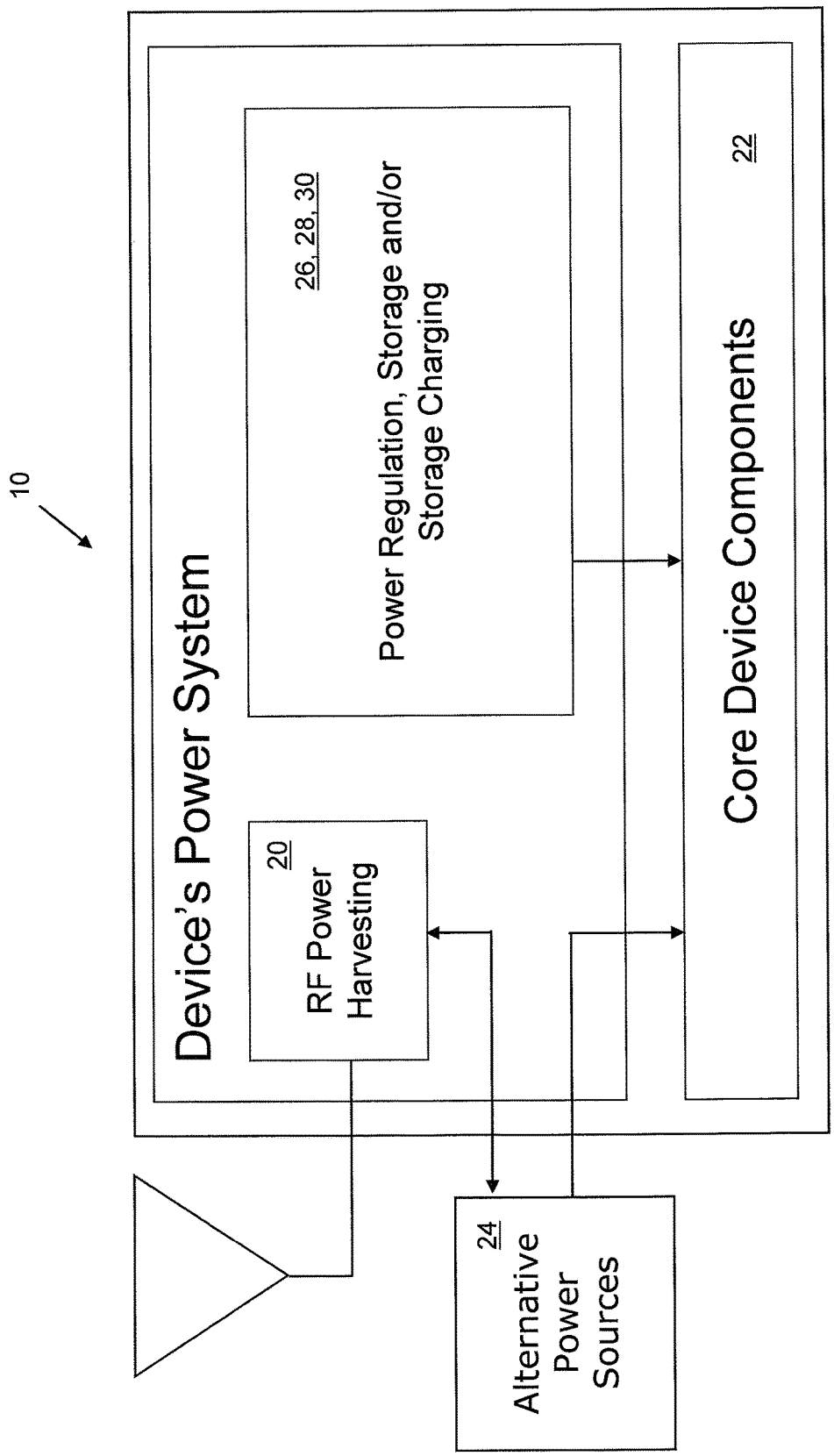
FIG. 71 is a block diagram of an RF Power Harvesting block in communication with an Alternative Power Sources block.
Figure 72:
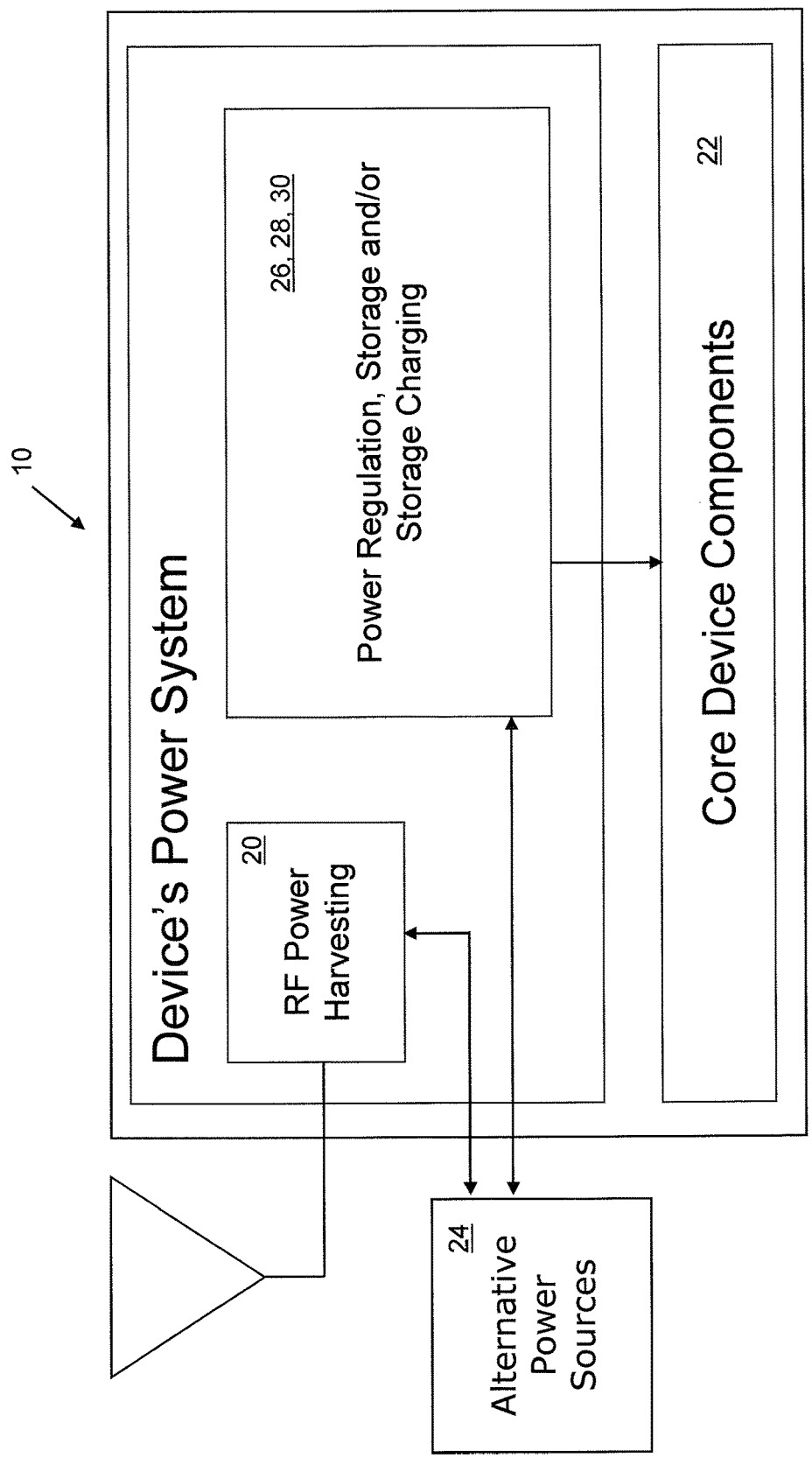
FIG. 72 is a block diagram of an RF Power Harvesting block in communication with an Alternative Power Sources block.
Figure 73:
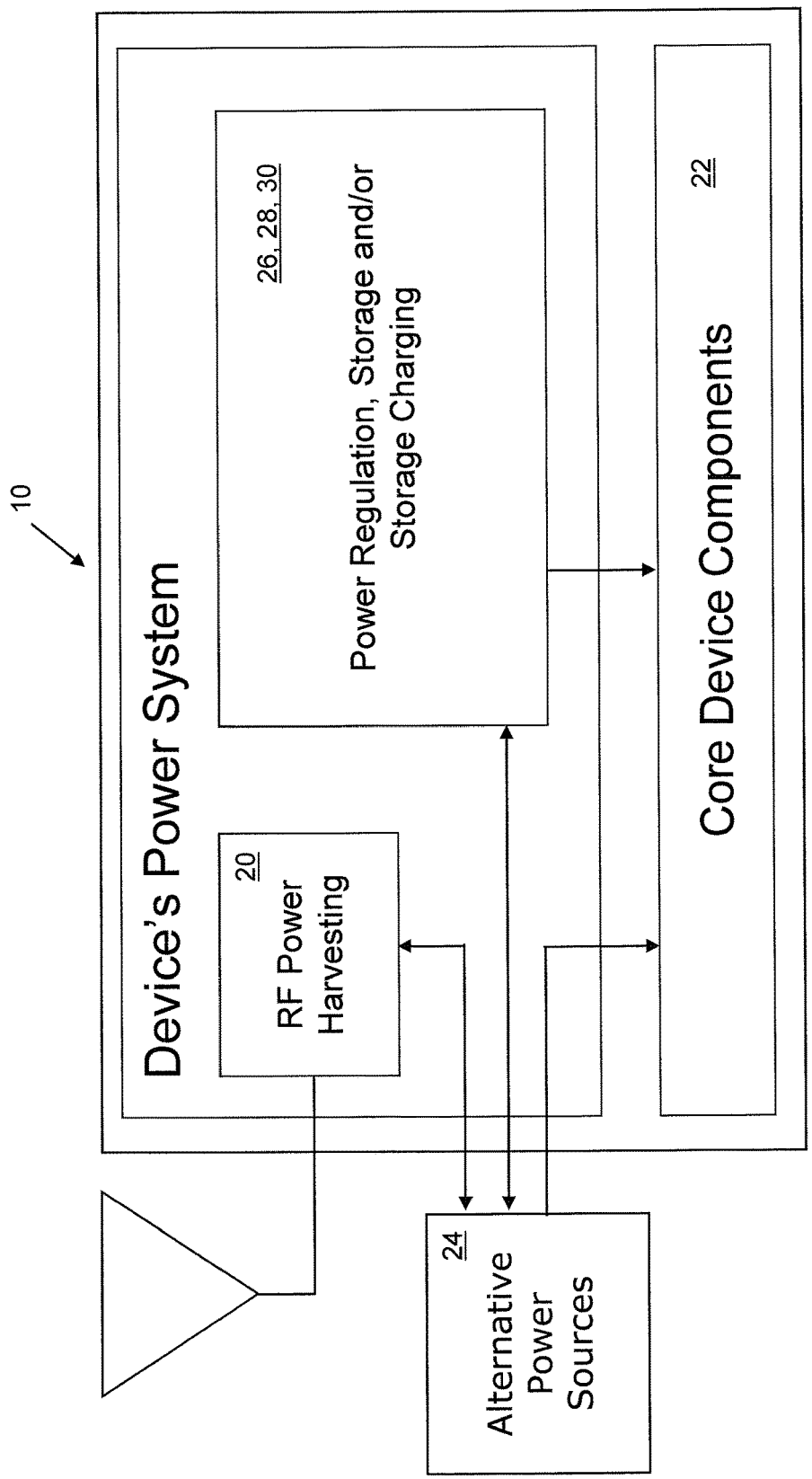
FIG. 73 is a block diagram of an RF Power Harvesting block in communication with an Alternative Power Sources block.
Figure 74:
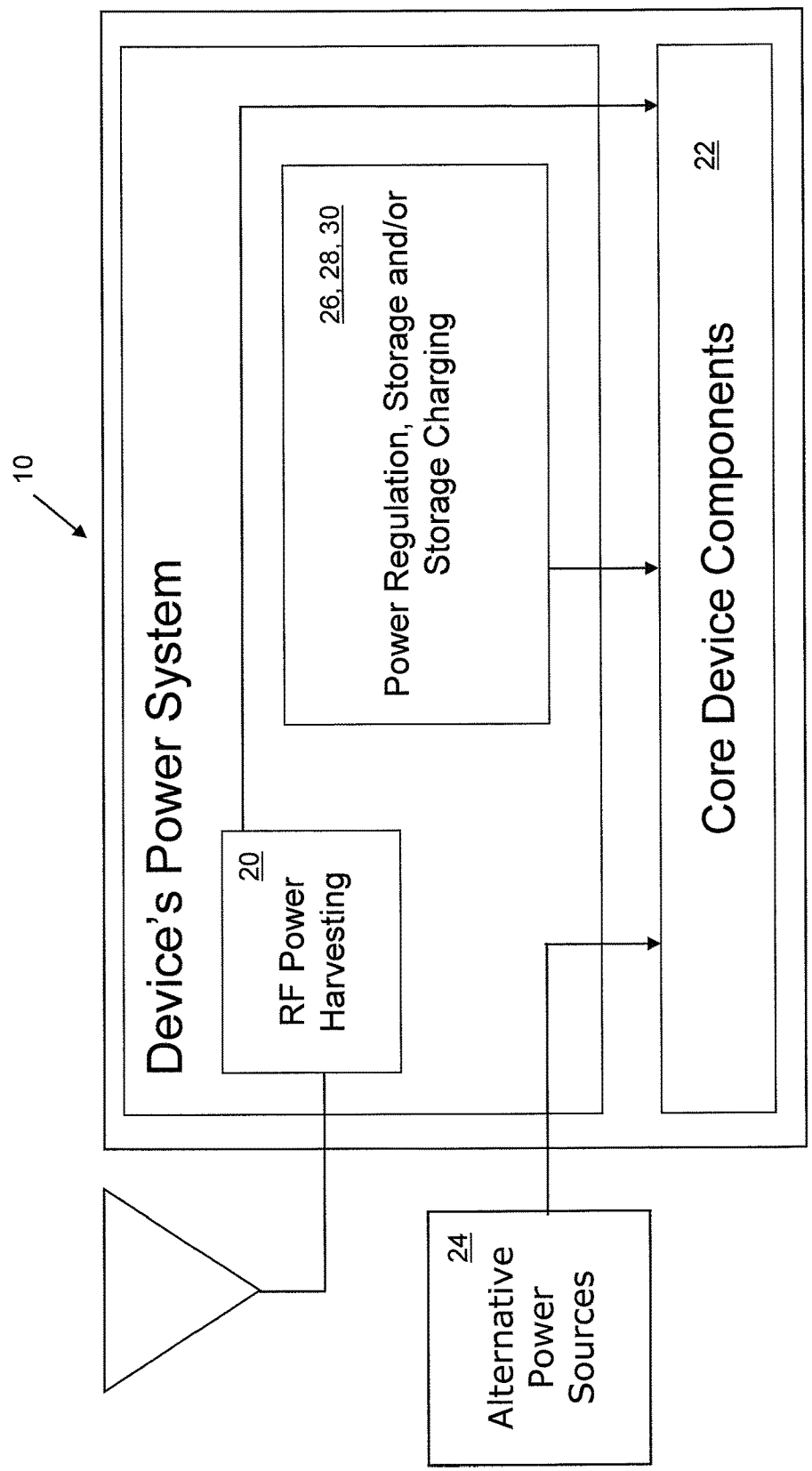
FIG. 74 is a block diagram of an RF Power Harvesting block used to supply power to Core Device Components.
Figure 75:
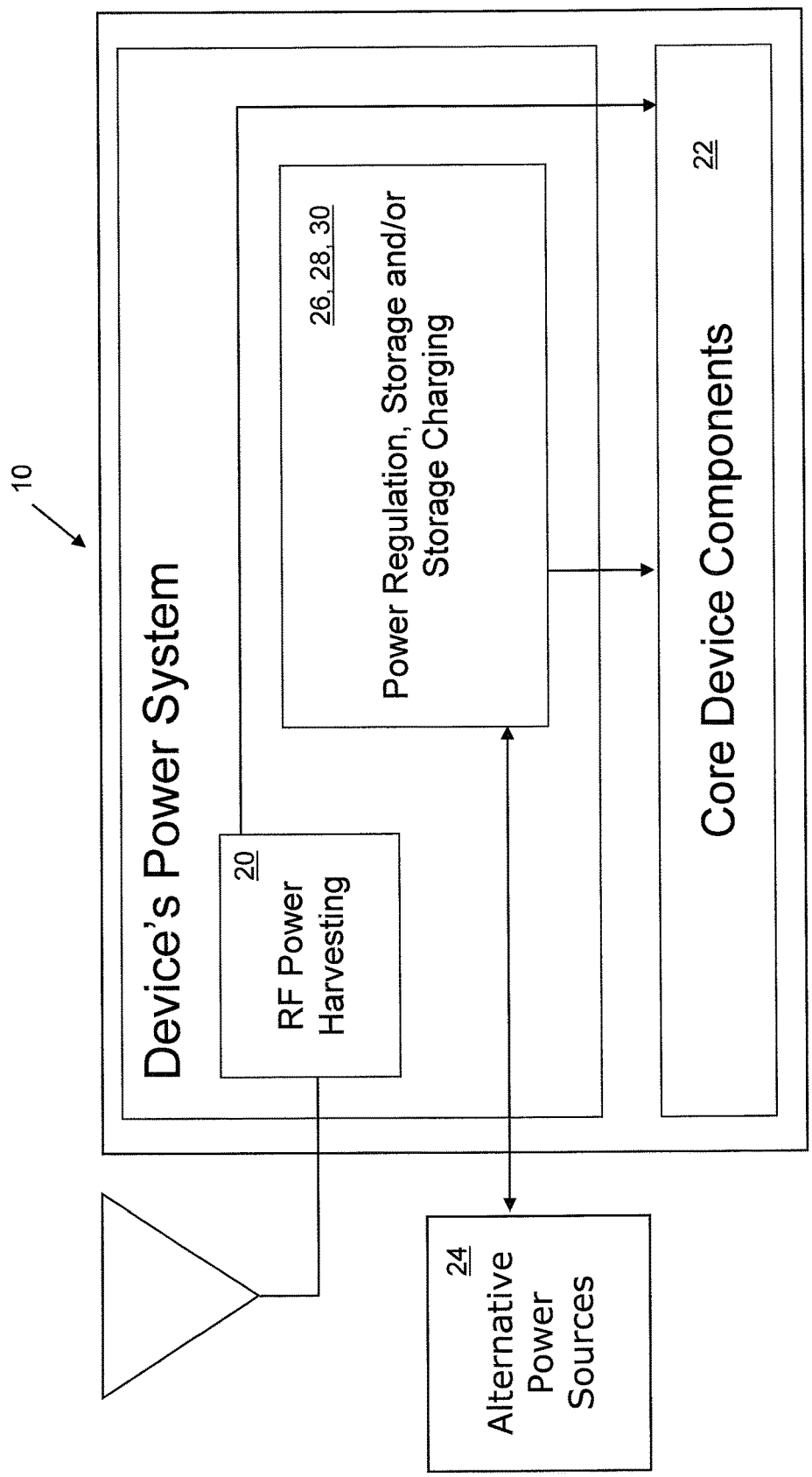
FIG. 75 is a block diagram of an RF Power Harvesting block used to supply power to Core Device Components.
Figure 76:
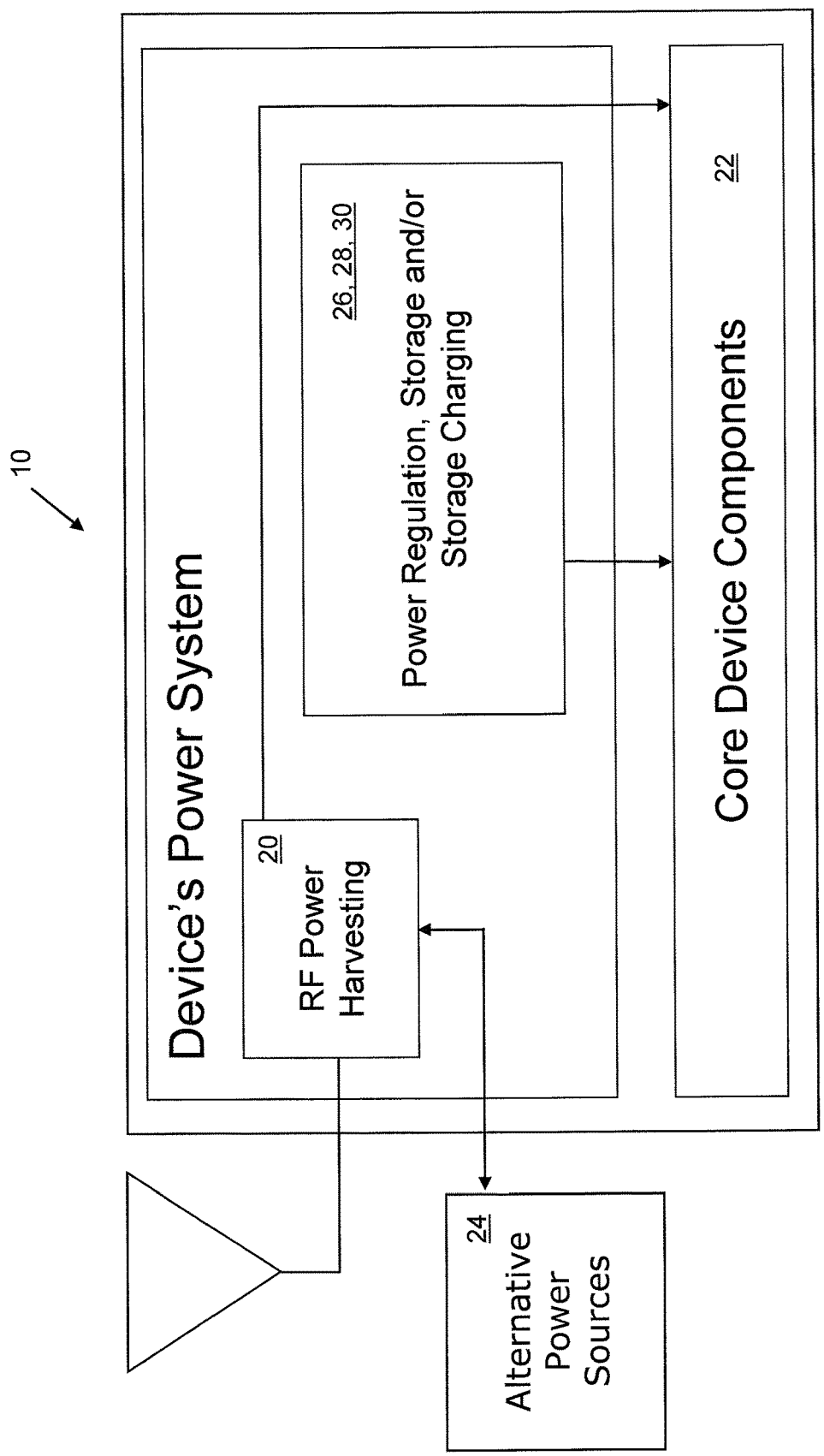
FIG. 76 is a block diagram of an RF Power Harvesting block used to supply power to Core Device Components and in communication with an Alternative Power Sources block.
Figure 77:
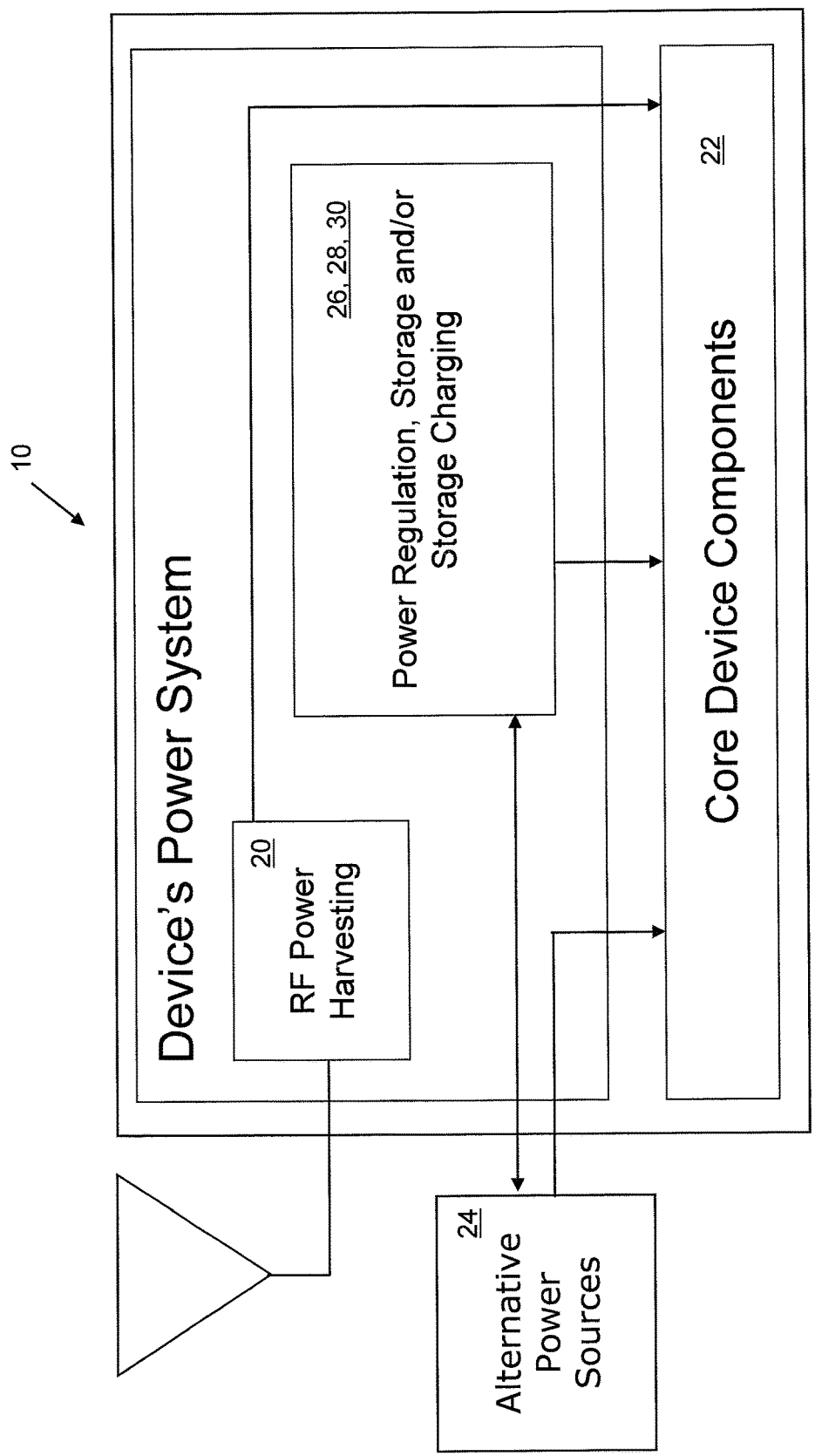
FIG. 77 is a block diagram of an RF Power Harvesting block used to supply power to Core Device Components.
Figure 78:
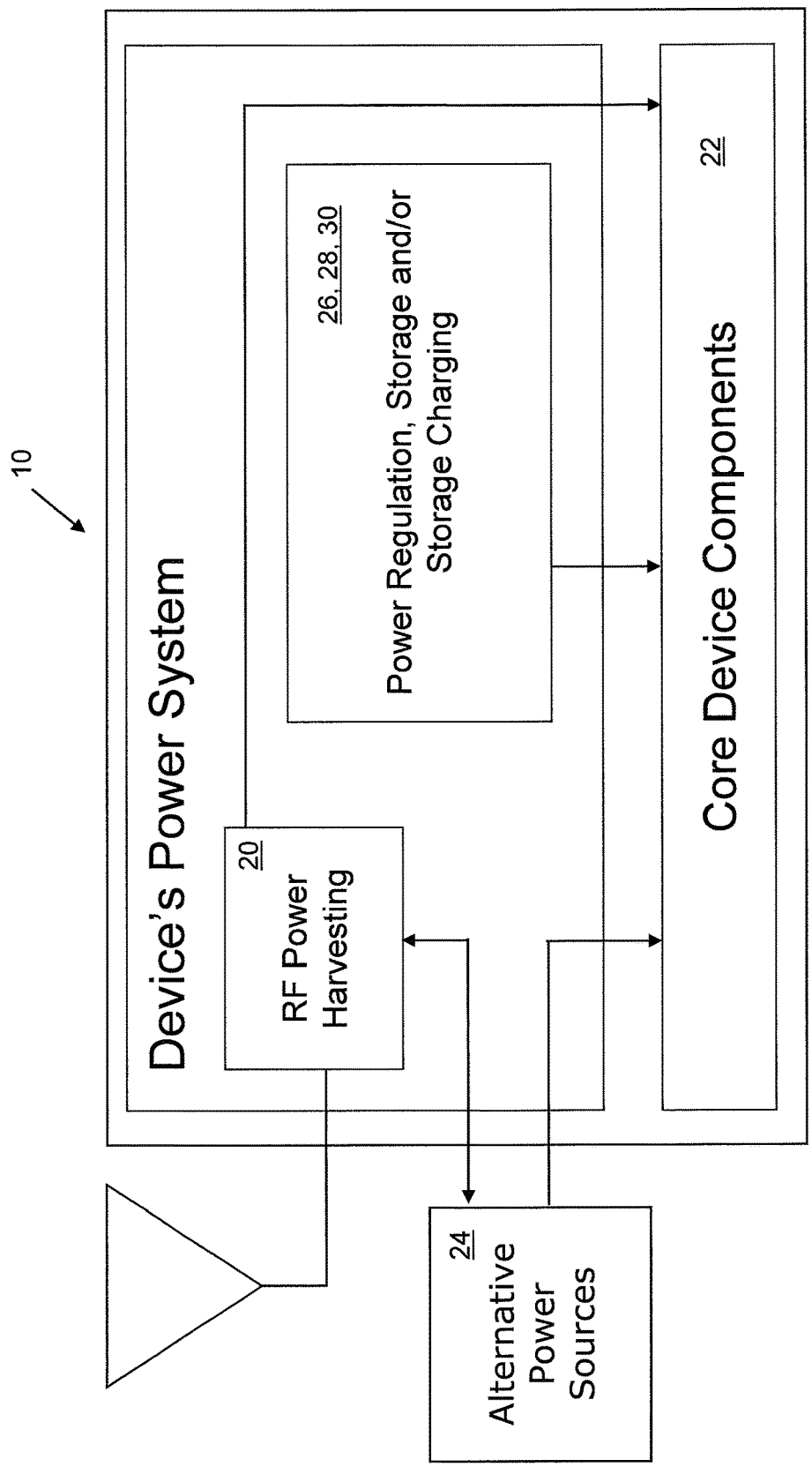
FIG. 78 is a block diagram of an RF Power Harvesting block used to supply power to Core Device Components and in communication with an Alternative Power Sources block.
Figure 79:
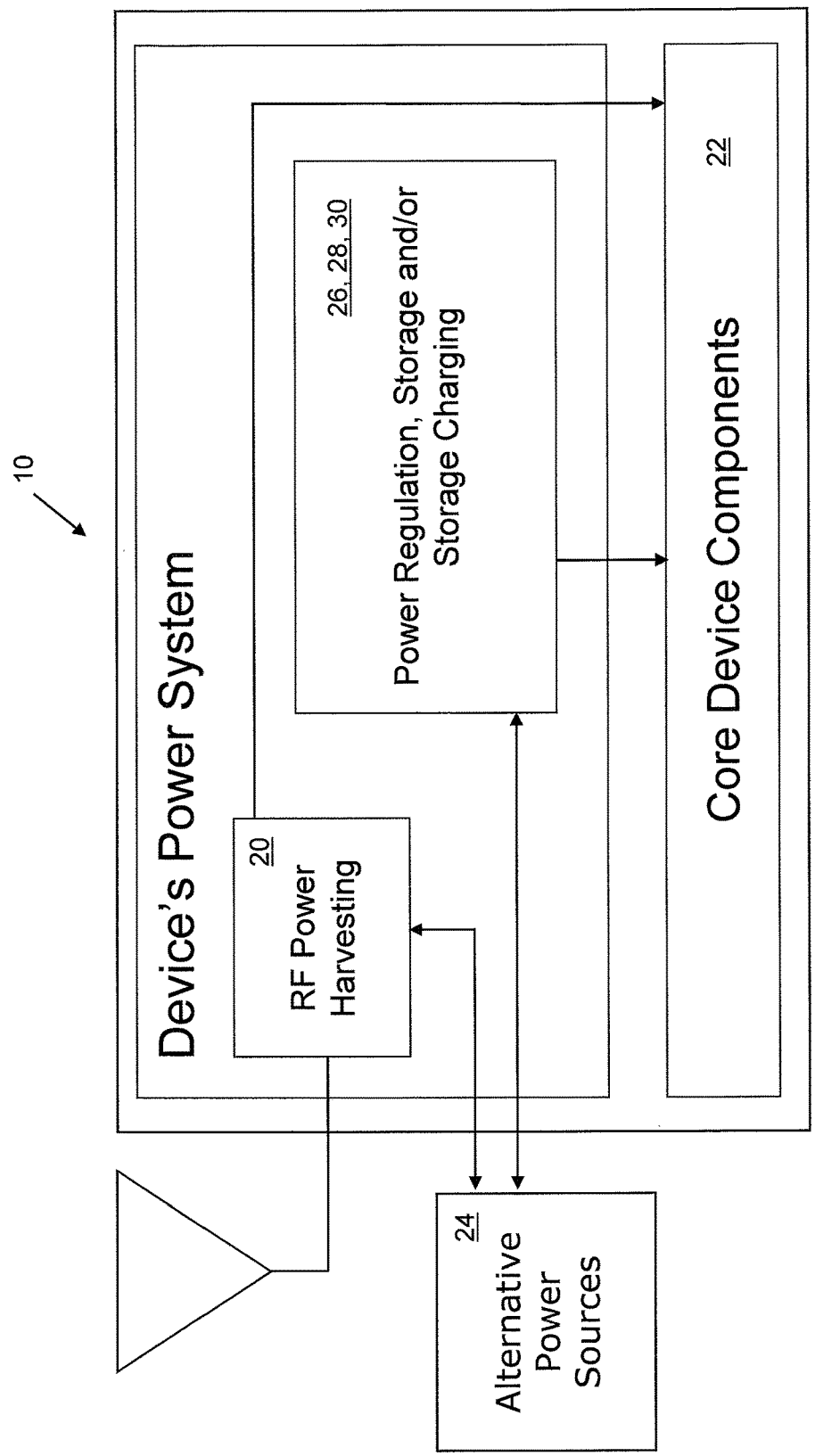
FIG. 79 is a block diagram of an RF Power Harvesting block used to supply power to Core Device Components and in communication with an Alternative Power Sources block.
Figure 80:
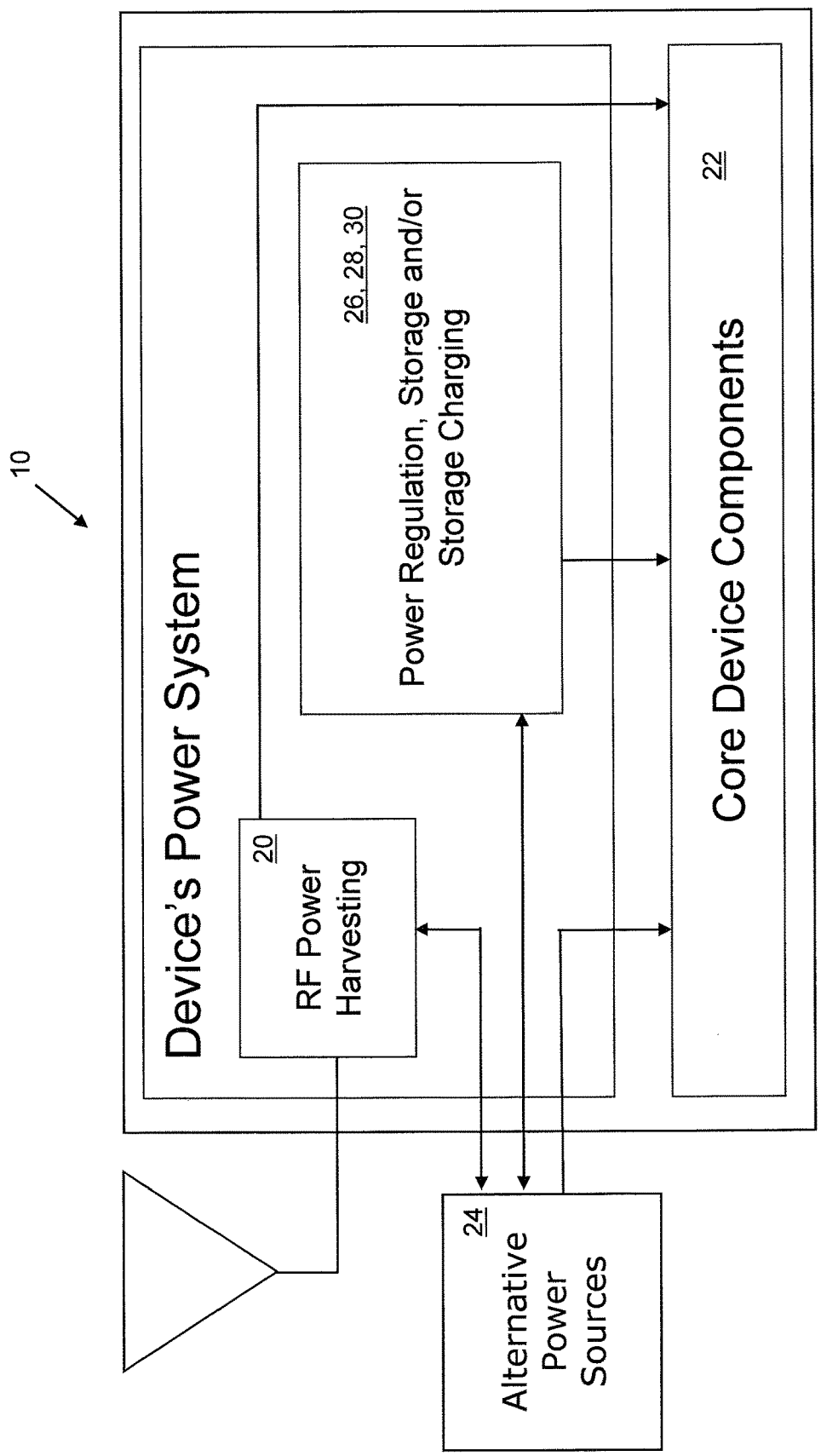
FIG. 80 is a block diagram of an RF Power Harvesting block used to supply power to Core Device Components and in communication with an Alternative Power Sources.
Figure 81:
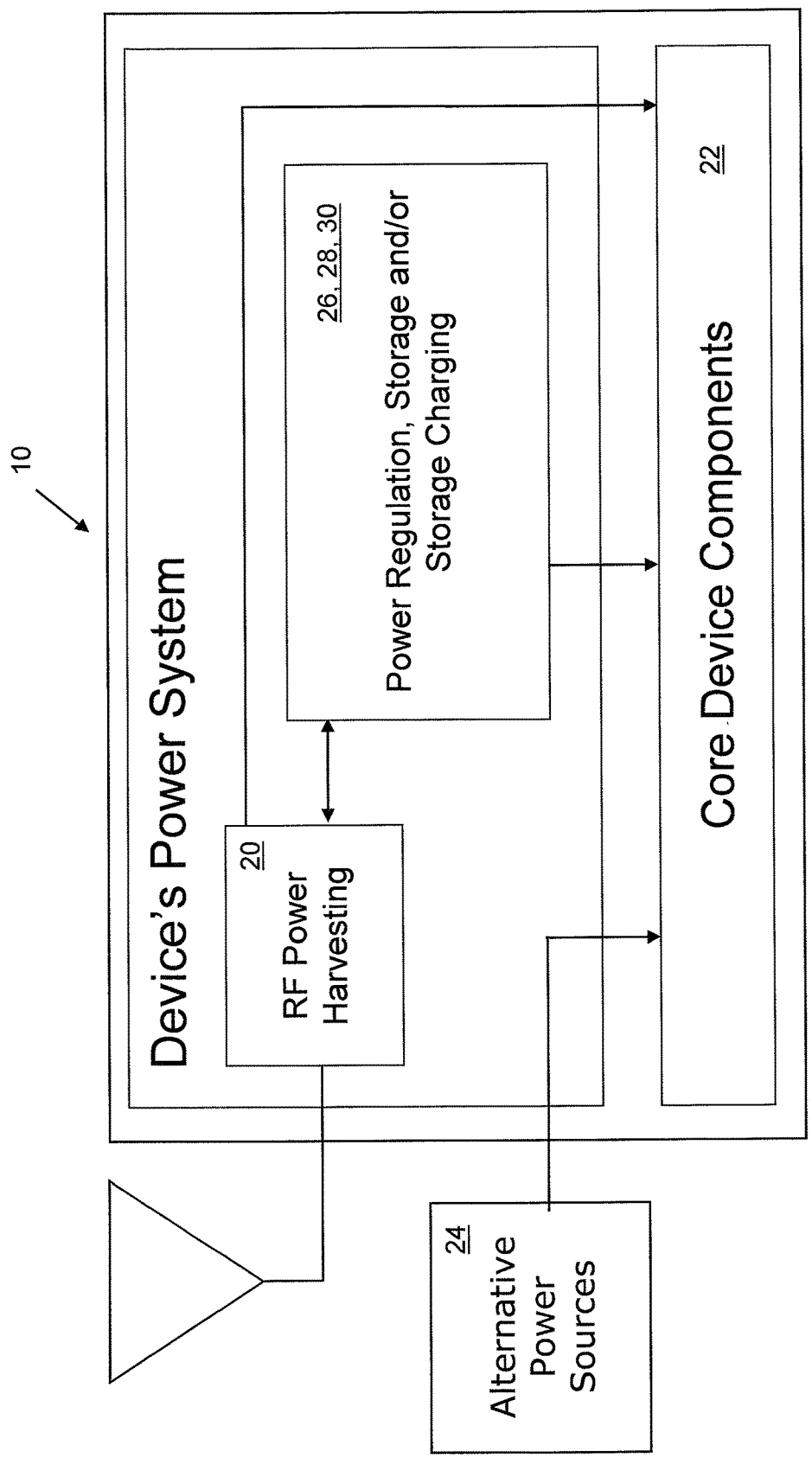
FIG. 81 is a block diagram of an RF Power Harvesting block used to supply power to Core Device Components and in communication with a Power Regulation, Storage and/or Storage Charging block.
Figure 82:
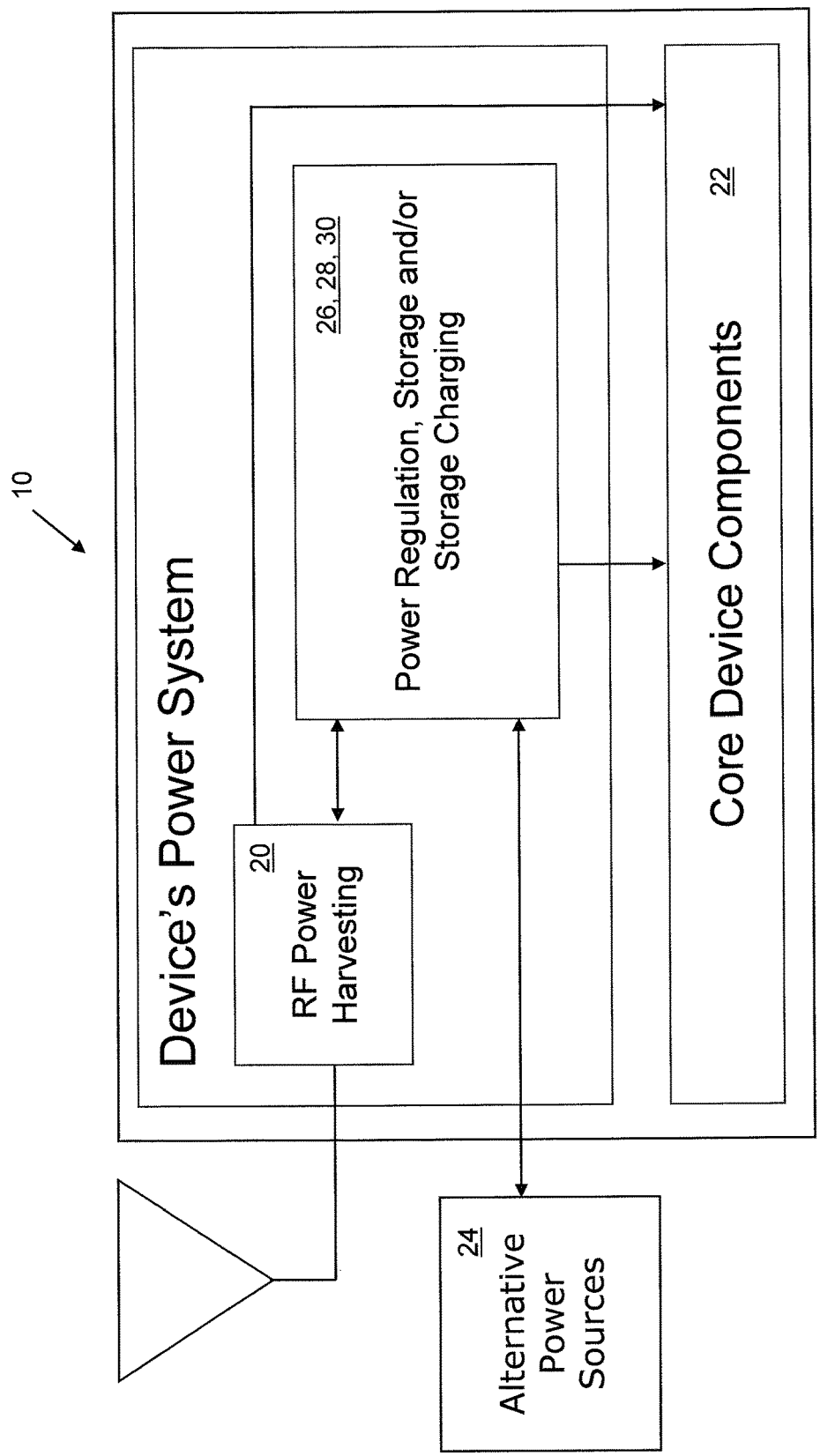
FIG. 82 is a block diagram of an RF Power Harvesting block used to supply power to Core Device Components and in communication with a Power Regulation, Storage and/or Storage Charging block.
Figure 83:
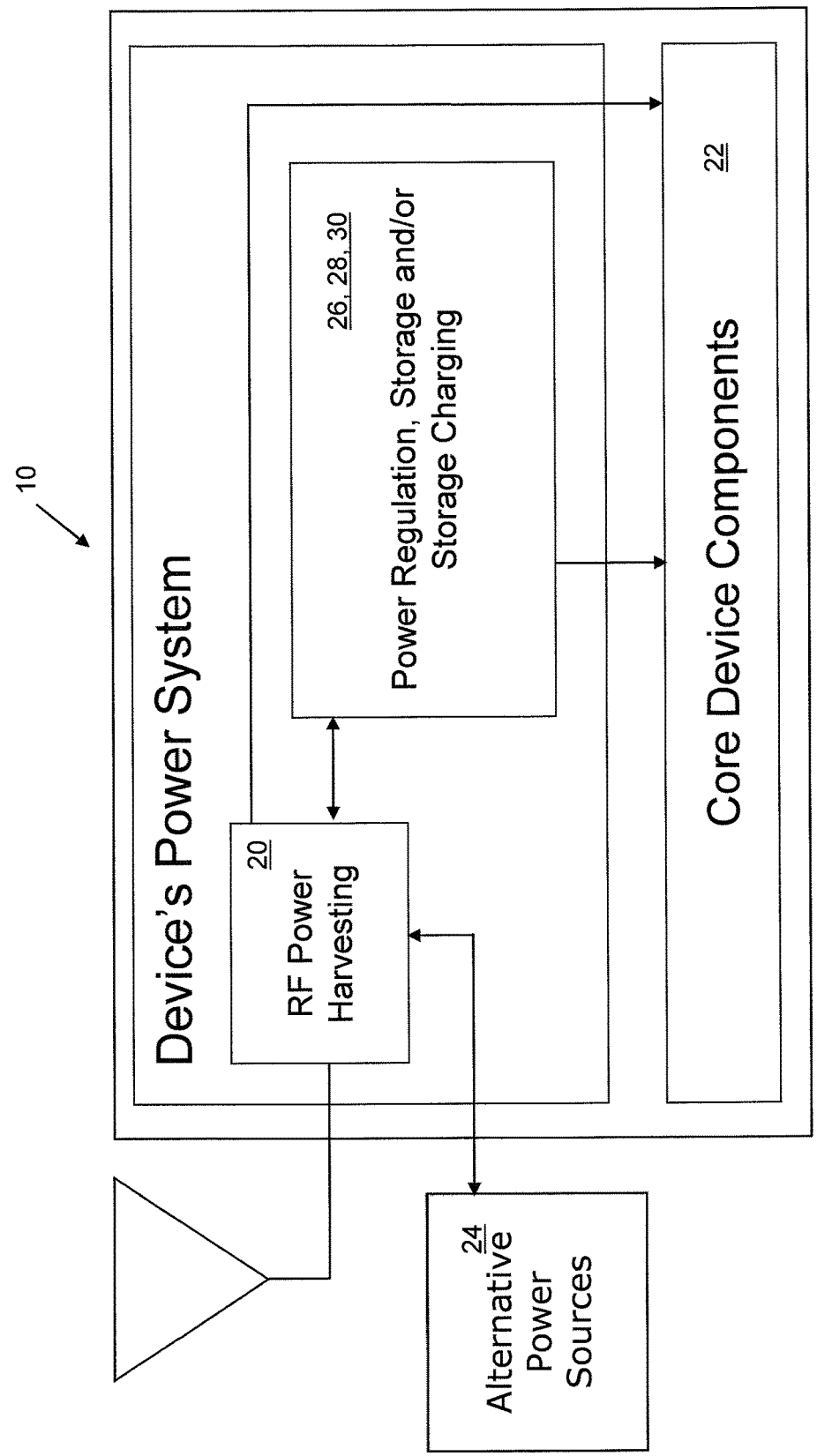
FIG. 83 is a block diagram of an RF Power Harvesting block used to supply power to Core Device Components and in communication with a Power Regulation, Storage and/or Storage Charging block and an Alternative Power Sources block.
Figure 84:
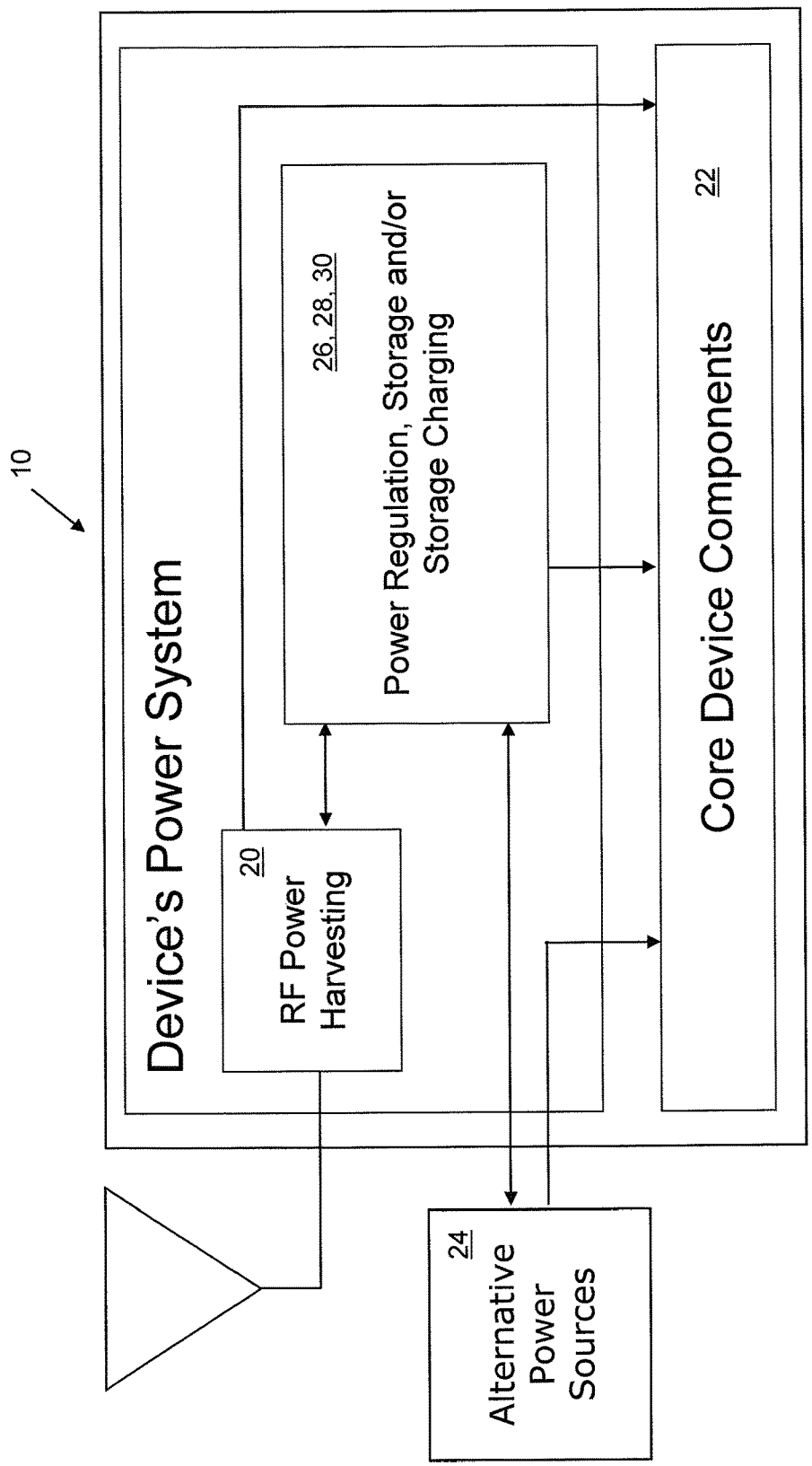
FIG. 84 is a block diagram of an RF Power Harvesting block used to supply power to Core Device Components and in communication with a Power Regulation, Storage and/or Storage Charging block.
Figure 85:
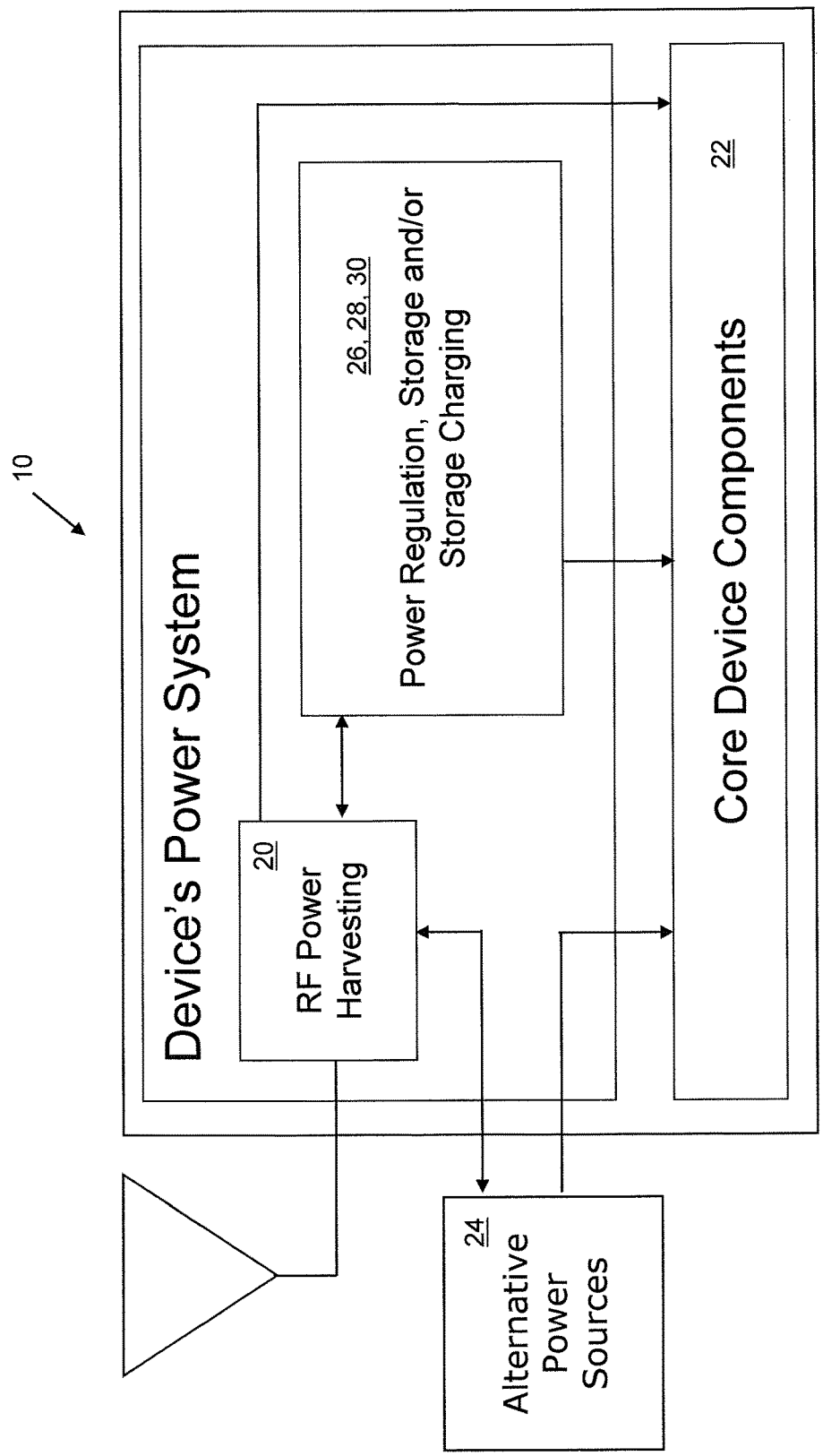
FIG. 85 is a block diagram of an RF Power Harvesting block used to supply power to Core Device Components and in communication with a Power Regulation, Storage and/or Storage Charging block and an Alternative Power Sources block.
Figure 86:
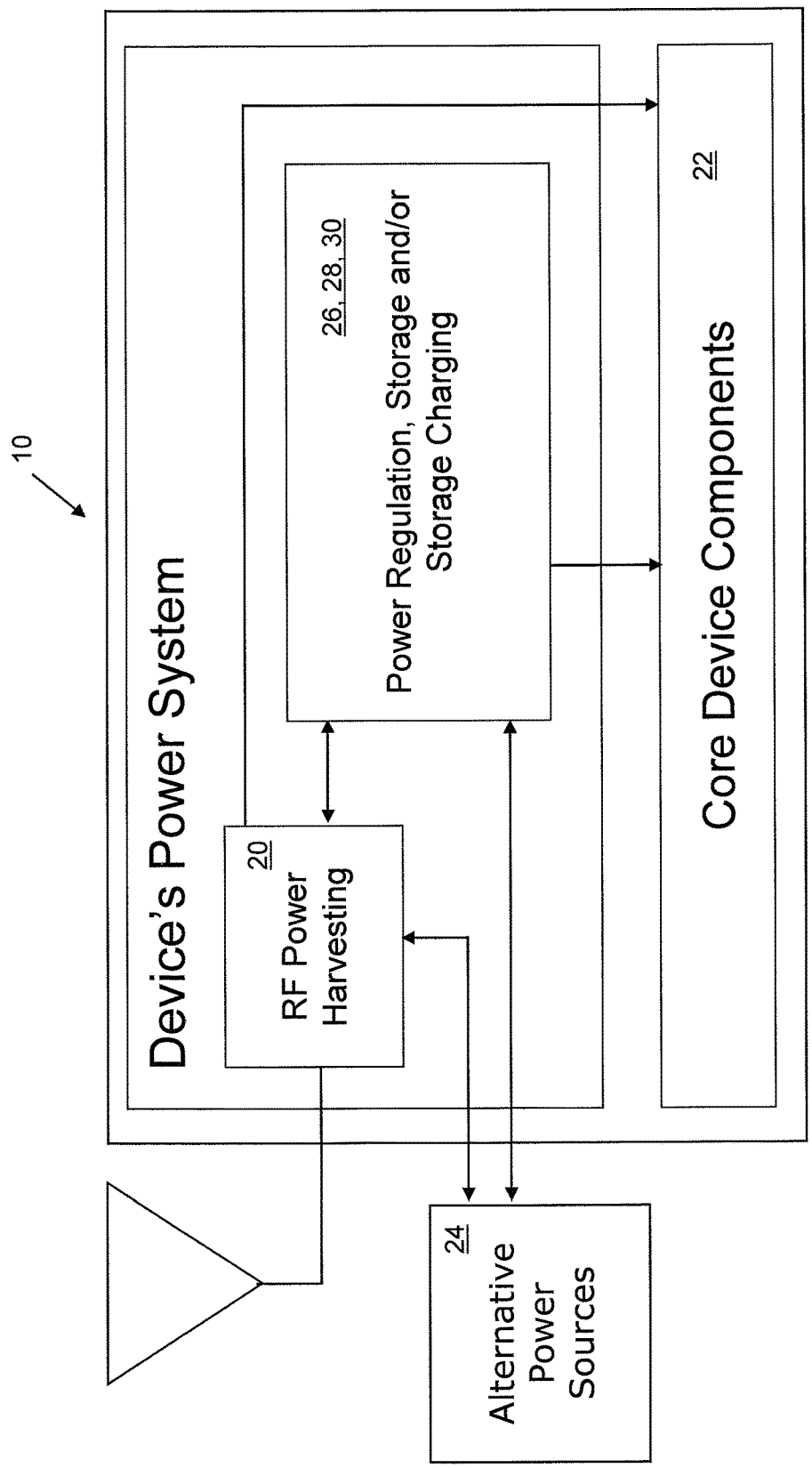
FIG. 86 is a block diagram of an RF Power Harvesting block used to supply power to Core Device Components and in communication with an Alternative Power Sources block and a Power Regulation, Storage and/or Storage Charging block.
Figure 87:
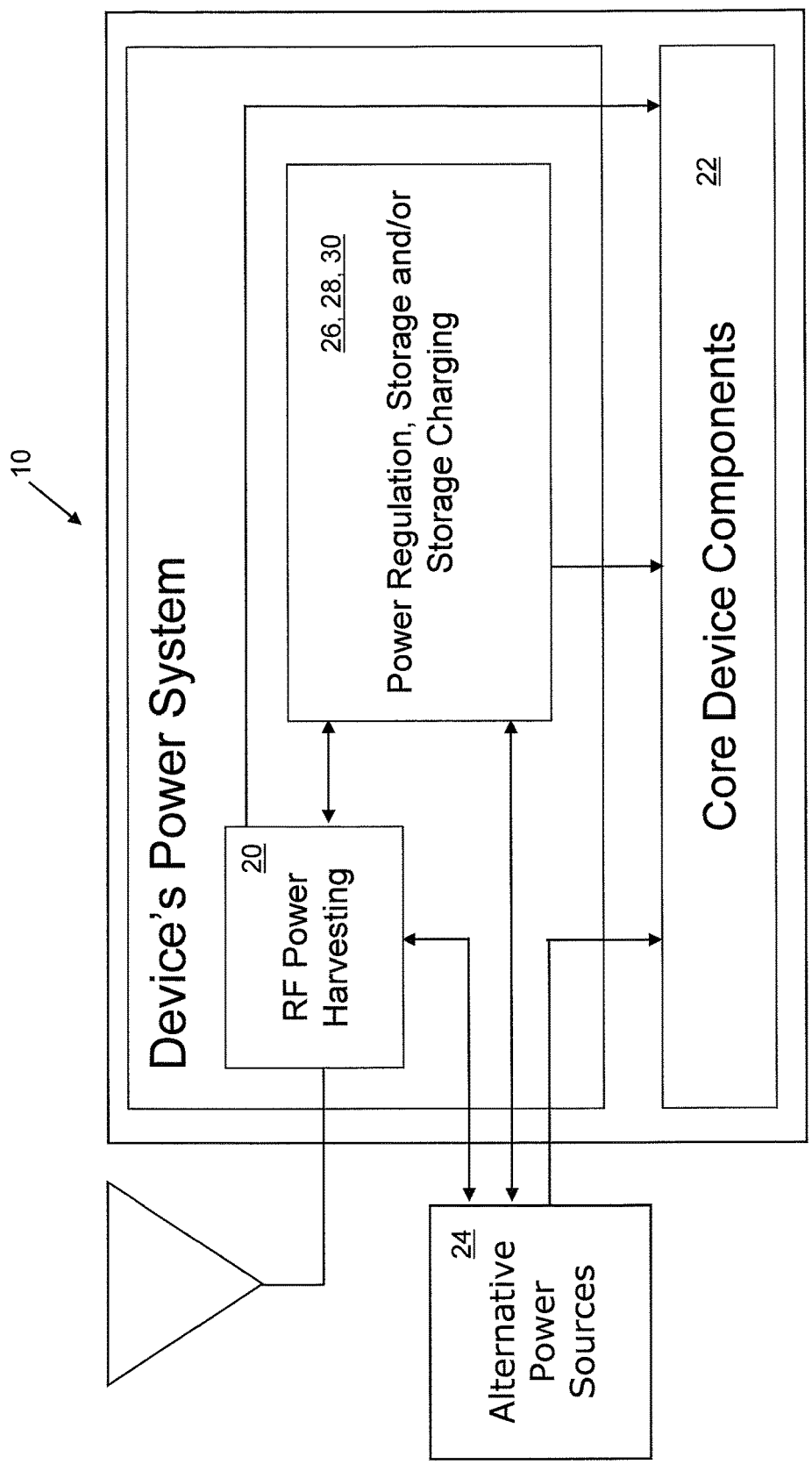
FIG. 87 is a block diagram of an RF Power Harvesting block used to supply power to Core Device Components and in communication with an Alternative Power Sources block and a Power Regulation, Storage and/or Storage Charging block.
Figure 88:
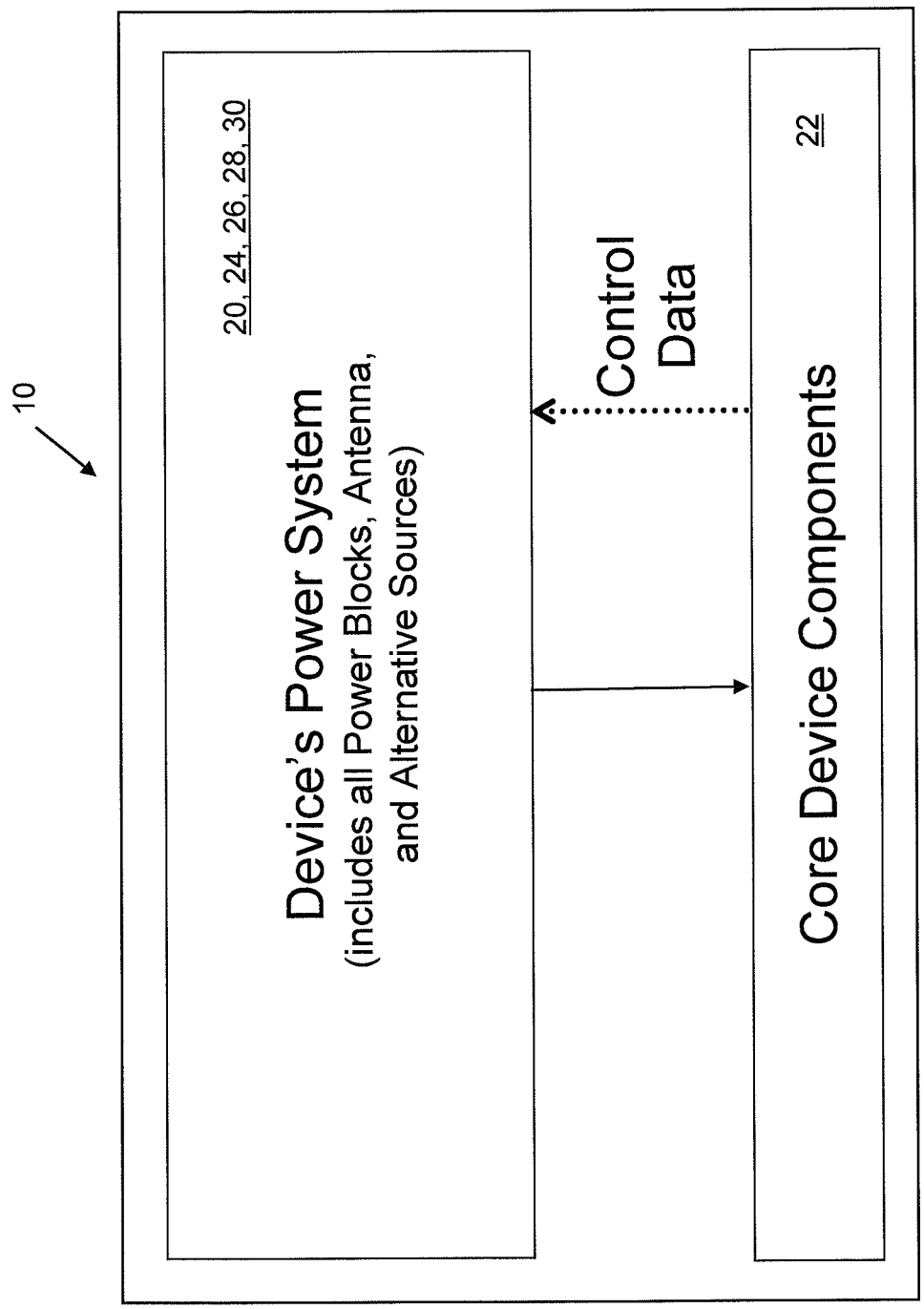
FIG. 88 is a block diagram of an entire power system for the device.

As an additional example, an RF power harvester 20 (energy harvesting circuit) similar to the ones shown in U.S. Pat. No. 6,615,074 (FIGS. 8, 9, 12a, 12b, 13, 14), was connected in series with a 0.5V solar cell. Individually, the solar cell was able to provide 0.480V to a 10 kilo-ohm resistor, which was being used to simulate the core device 22 components. This corresponds to 23 microwatts. The RF power harvesting circuit by itself was able to provide 2.093V across the 10 kilo-ohm resistor when being supplied by 1 milliwatt of RF power. This corresponds to 438 microwatts. The two circuit outputs were then combined in series by connecting the output from the RF energy harvesting circuit to the ground of the solar cell. The output of the solar cell was then connected to the resistor. The other end of the resistor was connected to the ground of the RF energy harvesting circuit. The voltage across the resistor with the circuits connected as shown in FIG. 63 was 2.445V. This corresponds to 598 microwatts.

As can be seen, the combination of the two technologies produces a result higher than the addition of the individual powers. From this, it can be determined that the two technologies can cooperate in a way that produces favorable results.

In the example given, the solar cell produces current to supply the load and helps to bias the RF rectifying diodes, which allows the RF energy harvesting circuit to operate a higher efficiency. The solar cell also changes the impedance seen by the RF energy harvesting circuit, which produces a beneficial result. To be more specific, when examining the power output of the individual circuit (solar and RF power harvesting), the sum of the power captured by the individual circuits was 23 µW+438 µW=461 µW. However, when the two circuits are combined and are allowed to work in conjunction with one another, the output power becomes 598 µW. This result shows that combining the two power-harvesting technologies produces a 30 percent increase in the output power for this example. This same technique can be applied to multiple energy harvesting technologies to produce even greater output power. The equations for this example are shown below.

Individual Circuits $$P_I = P_1 + P_2 + \ldots + P_N$$

Combined Circuits $$P_C > P_I = P_1 + P_2 + \ldots + P_N$$

where $P_I$ is the sum of the individual output powers
$P_C$ is the output of the combined circuit
$P_1$ is the output power from the first power harvesting technology
$P_2$ is the output power from the second power harvesting technology
$P_N$ is the output power from the $N^{th}$ power harvesting technology
N is the number of power harvesting technologies or circuits.

As can be seen by the previous examples, RF energy harvesting can be used alone or in conjunction with alternative power sources to power a wide range of devices. The addition of RF energy harvesting technology to the device allows for increased battery life, increased functionality, or the removal of the primary battery.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus, comprising:
    an antenna configured to wirelessly receive energy from a source that is remote from the apparatus;
    a power harvester electrically coupled to the antenna and configured to convert the energy received at the antenna to a DC voltage to produce a first power associated with the DC voltage;
    a regulator coupled to the power harvester and configured to regulate the first power associated with the DC voltage to produce a regulated power;
    an alternative power source configured to produce a second power different from the first power and the regulated power; and
    a radio-frequency identification (RFID) device electrically coupled to the antenna and configured to wirelessly communicate with the source via the antenna, the RFID device electrically coupled to the alternative power source, the power harvester and the regulator, the RFID device including an integrated circuit configured to operate based on at least one of the first power received from the power harvester, the regulated power received from the regulator, or the second power received from the alternative power source.

2. The apparatus of claim 1, wherein the alternative power source is a rechargeable battery.

3. The apparatus of claim 1, wherein the antenna is configured to wirelessly receive energy from the source, which is located in a far-field region of the antenna.

4. The apparatus of claim 1, wherein the alternative power source is electrically coupled to the power harvester and is configured to supply at least a portion of the second power to the power harvester to operate the power harvester.

5. The apparatus of claim 1, wherein the alternative power source is configured to supply the second power to the RFID device when at least one of the first power or regulated power being supplied to the RFID device is below a threshold level.

6. The apparatus of claim 1, wherein the alternative power source is a non-rechargeable battery, the apparatus further comprising:
    a protection mechanism electrically coupled to the non-rechargeable battery and configured to prevent charging of the non-rechargeable battery when the RFID device is receiving at least one of the first power from the power harvester or the regulated power from the regulator.

7. The apparatus of claim 6, wherein the protection mechanism is a diode electrically connected to a positive terminal of the non-rechargeable battery.

8. An apparatus, comprising:
    an antenna configured to wirelessly receive energy from a source that is remote from the apparatus;
    a power harvester electrically coupled to the antenna and including a rectifier configured to convert the energy received at the antenna to a DC voltage such that the power harvester is configured to produce a first power associated with the DC voltage;
    an alternative power source electrically coupled to the power harvester and configured to produce a second power different from the first power, the alternative power source configured to supply the second power to the power harvester such that the rectifier operates, at least in part, based on the second power; and
    an integrated circuit electrically coupled to the power harvester and configured to operate based, at least in part, on the first power received from the power harvester.

9. The apparatus of claim 8, further comprising:
    a regulator electrically coupled to the power harvester and the integrated circuit, and configured to regulate the first power from the power harvester to produce a regulated power, the integrated circuit configured to operate based on the regulated power received from the regulator.

10. The apparatus of claim 8, wherein the alternative power source is electrically coupled to the integrated circuit such that at least a portion of the second power produced by the alternative power source is supplied to the integrated circuit to operate the integrated circuit.

11. The apparatus of claim 10, wherein the alternative power source supplies a first portion of the second power to the power harvester, and a second portion of the second power to the integrated circuit when the first power received from the power harvester at the integrated circuit is below a threshold level.

12. The apparatus of claim 8, wherein the alternative power source is a non-rechargeable battery, the apparatus further comprising:
a protection mechanism electrically coupled to the non-rechargeable battery and configured to prevent charging of the non-rechargeable battery when the integrated circuit is receiving the first power from the power harvester.

13. The apparatus of claim 12, wherein the protection mechanism is a diode electrically connected to a positive terminal of the non-rechargeable battery.

14. The apparatus of claim 8, wherein the alternative power source is a rechargeable battery.

15. The apparatus of claim 8, wherein the antenna is configured to wirelessly receive energy from the source, which is located in a far-field region of the antenna.

16. The apparatus of claim 8, wherein the alternative power source is a solar cell connected in series with the power harvester.

17. The apparatus of claim 8, wherein the alternative power source is a solar cell configured to bias the power harvester.

18. The apparatus of claim 8, wherein the alternative power source is configured to produce a fifth power independent of the third power,
the fourth power produced by the alternative power source being greater than the sum of the third power and the fifth power.

19. The apparatus of claim 8, further comprising:
a power storage component electrically coupled to the power harvester and configured to receive the first power from the power harvester and to provide a third power to the integrated circuit such that the integrated circuit operates, at least in part, on the third power from the power storage component,
the third power based, at least in part, on the first power.

20. An apparatus, comprising:
an antenna configured to wirelessly receive energy from a source that is remote from the apparatus;
a power harvester electrically coupled to the antenna and configured to convert the energy received at the antenna to a DC voltage to produce a first power associated with the DC voltage;
an alternative power source electrically coupled to the power harvester and configured to produce a second power different from the first power, the alternative power source configured to supply the second power to the power harvester such that the power harvester operates, at least in part, based on the second power, the alternative power source is configured to receive a third power from the power harvester, the alternative power source configured to produce a fourth power that includes the third power; and
an integrated circuit electrically coupled to the power harvester and configured to operate based, at least in part, on the first power received from the power harvester, the integrated circuit electrically coupled to the alternative power source and configured to operate based at least in part on the fourth power received from the alternative power source.

* * * * *